(12) United States Patent
Ando et al.

(10) Patent No.: US 8,594,427 B2
(45) Date of Patent: Nov. 26, 2013

(54) METHOD AND APPARATUS FOR REDUCING MEMORY CAPACITY IN ENCODING IMAGE DATA

(75) Inventors: Katsutoshi Ando, Kanagawa (JP); Takahiro Fukuhara, Kanagawa (JP)

(73) Assignee: Sony Corporation, Tokyo (JP)

(*) Notice: Subject to any disclaimer, the term of this patent is extended or adjusted under 35 U.S.C. 154(b) by 1247 days.

(21) Appl. No.: 12/109,857

(22) Filed: Apr. 25, 2008

(65) Prior Publication Data

US 2008/0285873 A1   Nov. 20, 2008

(30) Foreign Application Priority Data

May 17, 2007  (JP) .................................. 2007-131382

(51) Int. Cl.
*G06K 9/00* (2006.01)

(52) U.S. Cl.
USPC .......................................... 382/177; 382/274

(58) Field of Classification Search
USPC ...................... 382/260, 233, 171; 348/384.1
See application file for complete search history.

(56) References Cited

U.S. PATENT DOCUMENTS

| | | | | | |
|---|---|---|---|---|---|
| 5,309,232 | A | * | 5/1994 | Hartung et al. | 348/384.1 |
| 5,835,129 | A | * | 11/1998 | Kumar | 348/14.09 |
| 5,929,912 | A | * | 7/1999 | Aono et al. | 375/240.11 |
| 6,560,369 | B1 | * | 5/2003 | Sato | 382/239 |
| 6,625,321 | B1 | * | 9/2003 | Li et al. | 382/239 |
| 2003/0007561 | A1 | * | 1/2003 | Kajiwara | 375/240.11 |
| 2003/0031370 | A1 | * | 2/2003 | Andrew | 382/233 |
| 2003/0169936 | A1 | * | 9/2003 | Zandi et al. | 382/240 |
| 2004/0208364 | A1 | * | 10/2004 | Haque et al. | 382/171 |
| 2007/0269122 | A1 | | 11/2007 | Fukuhara et al. | |
| 2007/0286510 | A1 | | 12/2007 | Fukuhara et al. | |
| 2008/0013845 | A1 | | 1/2008 | Fukuhara et al. | |
| 2008/0013846 | A1 | | 1/2008 | Fukuhara et al. | |

FOREIGN PATENT DOCUMENTS

| | | |
|---|---|---|
| JP | 10-283342 | 10/1998 |
| JP | 2000-115770 | 4/2000 |
| JP | 2001-218208 | 8/2001 |
| JP | 2001-326936 | 11/2001 |

(Continued)

OTHER PUBLICATIONS

Wim Sweldens, "The Lifting Scheme: A Custom-Design Construction of Biorthogonal Wavelets", Applied and Computational Harmonic Analysis vol. 3, No. 0015, 1996, pp. 186-200.

(Continued)

*Primary Examiner* — Hadi Akhavannik
(74) *Attorney, Agent, or Firm* — Oblon, Spivak, McClelland, Maier & Neustadt, L.L.P.

(57) ABSTRACT

A filter unit performs an analysis filtering operation by segmenting a frequency component to generate a plurality of subbands composed of coefficient data segmented on a per frequency band basis. A coefficient storage unit stores the coefficient data on a subband by subband basis, with each subband corresponding to a respective area of the coefficient storage unit. The filter unit writes the coefficient data onto the coefficient storage unit via a write buffer in response to a determination that the analysis filtering operation has not reached a final segmentation level. An entropy encoding unit entropy encodes the coefficient data. The filter unit writes the coefficient data on an area of the coefficient storage unit corresponding to the subband to which the coefficient data belongs. The entropy encoding unit reads the coefficient data, stored on different areas on a subband by subband basis, from the coefficient storage unit.

8 Claims, 33 Drawing Sheets

(56) References Cited

FOREIGN PATENT DOCUMENTS

| | | |
|---|---|---|
| JP | 2003-319185 | 11/2003 |
| JP | 2004-242287 | 8/2004 |
| JP | 2005-217872 | 8/2005 |
| JP | 2006-287485 | 10/2006 |
| JP | 2007-49485 | 2/2007 |
| JP | 2008-288832 | 11/2008 |
| WO | WO 2005/081539 A1 | 9/2005 |

OTHER PUBLICATIONS

Christos Chrysafis, et al. "Line-Based, Reduced Memory, Wavelet Image Compression", IEEE, Transactions on Image Processing, vol. 9, No. 3, Mar. 2000, pp. 378-389.

U.S. Appl. No. 11/814,257, filed Jul. 18, 2007, Takahiro Fukuhara, et al.

\* cited by examiner

SEGMENTATION LEVEL = 1

SEGMENTATION LEVEL = 3

INPUT IMAGE

WAVELET TRANSFORM RESULTS (ANALYSIS)

OUTPUT IMAGE

FIG. 15

9×7 FILTER (FOUR STEP LIFTING)

| SEGMENTATION LEVEL | INTERMEDIATE CALCULATION BUFFER | COEFFICIENT REARRANGING BUFFER |
|---|---|---|
| 1 | 4 | 0 |
| 2 | 5 | 0.75 |
| 3 | 5.25 | 0.938 |
| 4 | 5.31 | 0.984 |

FIG. 16

5×3 FILTER (TWO STEP LIFTING)

| SEGMENTATION LEVEL | INTERMEDIATE CALCULATION BUFFER | COEFFICIENT REARRANGING BUFFER |
|---|---|---|
| 1 | 2 | 0 |
| 2 | 2.5 | 0.75 |
| 3 | 2.62 | 0.938 |
| 4 | 2.65 | 0.984 |

FIG. 17

9×7 FILTER (FOUR STEP LIFTING)

| SEGMENTATION LEVEL | INTERMEDIATE CALCULATION BUFFER | COEFFICIENT REARRANGING BUFFER |
|---|---|---|
| 1 | 6 | 0 |
| 2 | 9 | 12 |
| 3 | 10.5 | 39 |
| 4 | 11.25 | 94.5 |

FIG. 18

5×3 FILTER (TWO STEP LIFTING)

| SEGMENTATION LEVEL | INTERMEDIATE CALCULATION BUFFER | COEFFICIENT REARRANGING BUFFER |
|---|---|---|
| 1 | 4 | 0 |
| 2 | 6 | 6 |
| 3 | 7 | 18 |
| 4 | 7.5 | 42 |

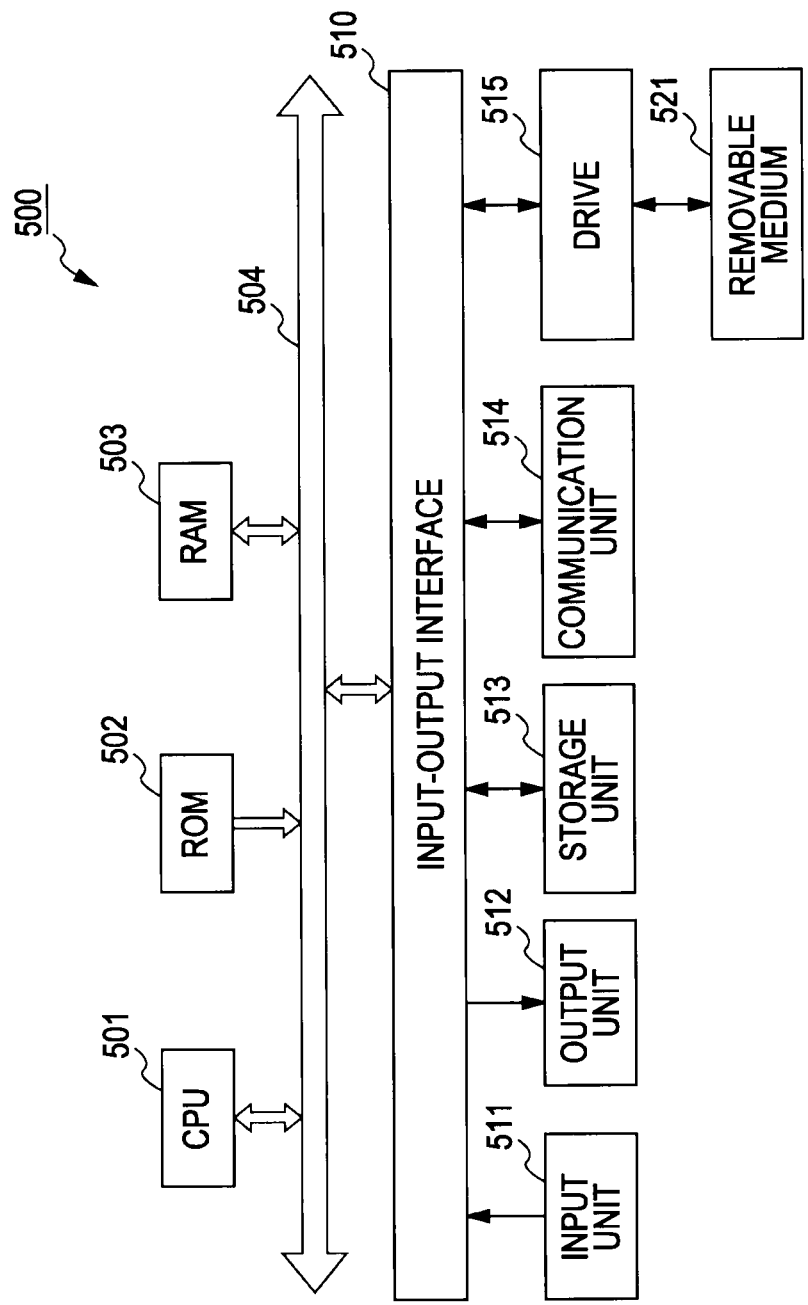

METHOD AND APPARATUS FOR REDUCING MEMORY CAPACITY IN ENCODING IMAGE DATA

CROSS REFERENCES TO RELATED APPLICATIONS

The present invention contains subject matter related to Japanese Patent Application JP 2007-131382 filed in the Japanese Patent Office on May 17, 2007, the entire contents of which are incorporated herein by reference.

BACKGROUND OF THE INVENTION

1. Field of the Invention

The present invention relates to an encoding apparatus and an encoding method and, in particular, to an encoding apparatus and an encoding method for shortening delay time in an encoding process.

2. Description of the Related Art

Joint Photographic Experts Group (JPEG) standardized by the Internal Standard Organization (ISO) is available as a typical image compression method. In accordance with the JPEG standard, discrete cosine transform (DCT) is used and, it is known that if a relatively high number of bits is assigned, good encoded and decoded images result.

Methods of segmenting an image into a plurality of bands using a filter bank including a high-pass filter and a low-pass filter and encoding the image on a per band basis have been currently actively studied. The wavelet transform encoding draws attention as a new technique superseding the DCT because the wavelet transform encoding is free from block noise at high compression rate characteristic of the DCT transform.

JPEG2000 standardized January 2001 adopts a combination of the wavelet transform and highly efficient entropy encoding (bit modeling by bit plane and arithmetic coding) and provides a marked improvement in encoding efficiency in comparison with JPEG.

In a wavelet transform process, such as the one disclosed in Japanese Unexamined Patent Application Publication No. 10-283342, image data is input and a horizontal filtering operation and a vertical filtering operation are performed on the input image data while the image data is stepwise segmented into a low-frequency component.

Image data is wavelet transformed into coefficient data (frequency component). The wavelet transformed coefficient data is inverse wavelet transformed into original image data. The inverse wavelet transform restores finally the original image by performing a synthesis filtering operation on a high-frequency component and a low-frequency component from a topmost segmentation level to the lowest segmentation level.

Such an encoding system using the wavelet transform and the inverse wavelet transform finds applications in an image data transmission system such as a video conference or a video gaming system. More specifically, the image data is wavelet transformed on a transmitter side, and resulting coefficient data is entropy encoded and then transmitted as encoded date to a receiver side. At the receiver side, the received encoded data is entropy decoded. The coefficient data is then inverse wavelet transformed into the original image data. Such a series of processes is widely known.

SUMMARY OF THE INVENTION

Image data transmission is preferably performed with short delay time in an image transmission system such as a video conference system or a video gaming system.

There is also a need to shorten delay time in an encoding process.

It is thus desirable to shorten the delay time (latency) in the encoding process.

In accordance with one embodiment of the present invention, an encoding apparatus, includes a filter unit performing an analysis filtering operation on image data in a layer fashion by segmenting a frequency component of the image data into a high-frequency component and a low-frequency component in order to generate a plurality of subbands composed of coefficient data segmented on a per frequency band basis, an intermediate data storage unit for storing intermediate data generated in the middle of the analysis filtering operation of the filter unit, a coefficient storage unit for storing the coefficient data generated in the analysis filtering operation of the filter unit on a subband by subband basis, with each subband corresponding a respective area of the coefficient storage unit, and an entropy encoding unit for entropy encoding the coefficient data. The filter unit writes the coefficient data on an area of the coefficient storage unit corresponding to the subband to which the coefficient data belongs. The entropy encoding unit reads the coefficient data, stored on the different areas on a subband by subband basis, from the coefficient data storage unit in a predetermined order and then entropy encoding the read coefficient data.

The intermediate data storage unit may be incorporated in a memory that features an access speed higher than a memory incorporating the coefficient data storage unit.

The encoding apparatus may further include a write buffer arranged between the filter unit and the coefficient storage unit, a read buffer arranged between the entropy encoding unit and the coefficient storage unit, and a data transfer control unit for controlling a data transfer performed between the write buffer and the coefficient storage unit and a data transfer performed between the read buffer and the coefficient storage unit. The filter unit writes the coefficient data onto the coefficient storage unit via the write buffer. The entropy encoding unit reads the coefficient data from the coefficient storage unit via the read buffer.

The write buffer may store the coefficient data on the different areas thereof on a subband by subband basis. The read buffer may store the coefficient data on the different areas thereof on a subband by subband basis. The data transfer between the corresponding areas of the subbands of the write buffer and the coefficient storage unit may be performed in parallel with the data transfer between the corresponding areas of the subbands of the read buffer and the coefficient storage unit.

The filter unit may supply the coefficient data generated in the analysis filtering operation at a final segmentation level to the entropy encoding unit without storing the coefficient data onto the coefficient storage unit.

The filter unit may perform the analysis filtering operation on the image data by precinct, each precinct being the image data of the number of lines for generating one line of image data in the lowest frequency subband.

The filter unit may perform the analysis filtering operation using lifting calculation.

In accordance with one embodiment of the present invention, an encoding method includes steps of performing an analysis filtering operation on image data in a layer fashion by segmenting a frequency component of the image data into a high-frequency component and a low-frequency component in order to generate a plurality of subbands composed of coefficient data segmented on a per frequency band basis, storing intermediate data generated in the middle of the analysis filtering operation, storing the coefficient data, generated in the analysis filtering operation, on different areas on a subband by subband basis, with each subband corresponding a respective area, and reading the coefficient data stored on the different areas on a subband by subband basis in a predetermined order and entropy encoding the read coefficient data.

In accordance with embodiments of the present invention, the analysis filtering operation is performed in a layer fashion on the image data by segmenting the frequency component of the image data into the high-frequency component and the low-frequency component. The plurality of subbands composed of coefficient data segmented on a per frequency band basis are thus generated. The intermediate data generated in the middle of the analysis filtering operation is stored on the intermediate storage unit. The coefficient data, generated in the analysis filtering operation, are stored on the coefficient storage unit on different areas on a subband by subband basis, with each subband corresponding a respective area. The coefficient data, stored on the different areas on a subband by subband basis, is read in the predetermined order and then entropy encoded.

In accordance with embodiments of the present invention, the coefficient data segmented on a per frequency band basis is rearranged in a predetermined order. A delay time in a decoding process is thus shortened.

BRIEF DESCRIPTION OF THE DRAWINGS

FIG. 15 illustrates an access count of an intermediate calculation buffer and a coefficient rearranging buffer with the 9×7 filter used in the wavelet transform;

FIG. 16 illustrates an access count of the intermediate calculation buffer and the coefficient rearranging buffer with the 5×3 filter used in the wavelet transform;

FIG. 17 illustrates required memory capacities of the intermediate calculation buffer and the coefficient rearranging buffer with the 9×7 filter used in the wavelet transform;

FIG. 18 illustrates required memory capacities of the intermediate calculation buffer and the coefficient rearranging buffer with the 5×3 filter used in the wavelet transform;

FIG. 35 illustrates a personal computer.

DESCRIPTION OF THE PREFERRED EMBODIMENTS

Figure 1:
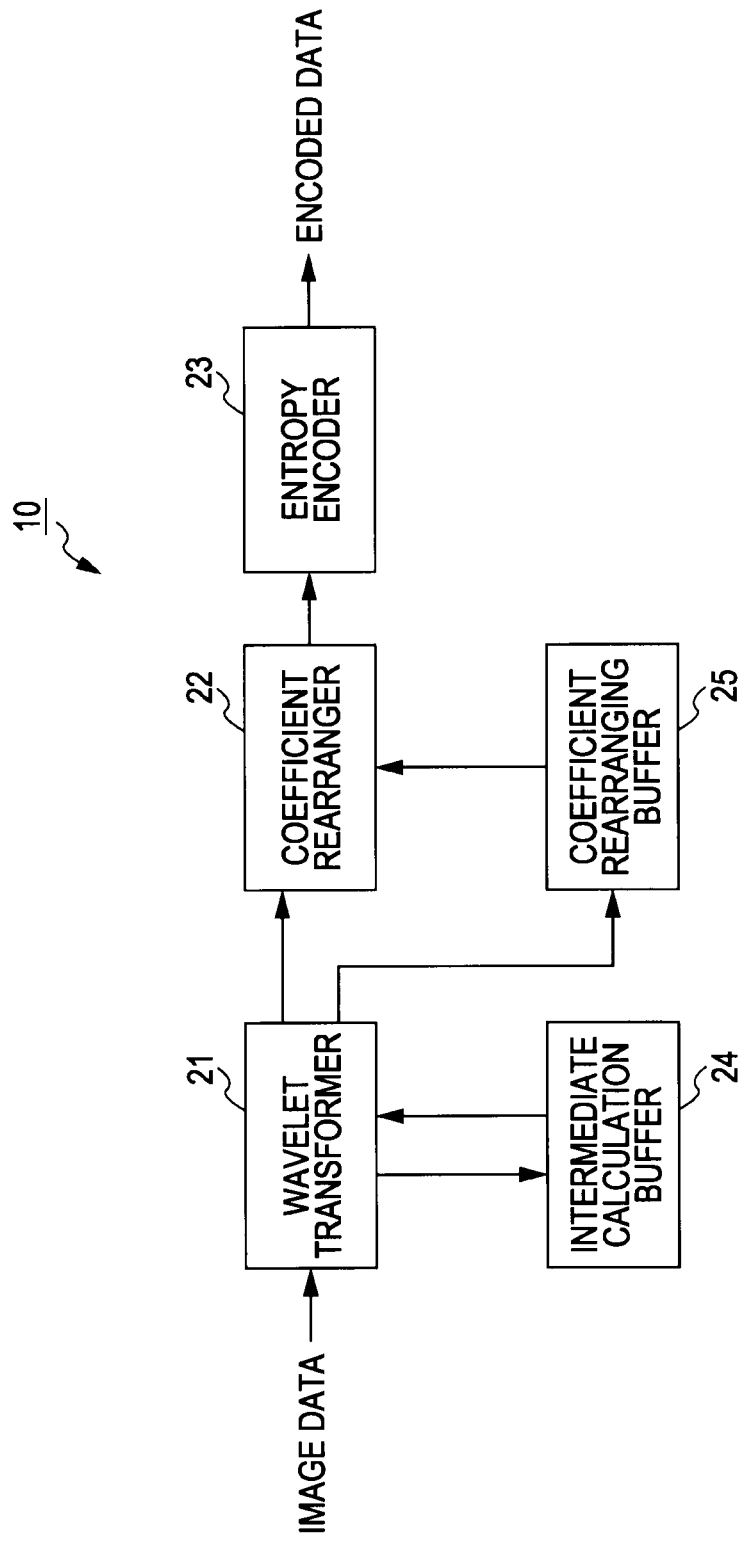
FIG. 1 is a block diagram of an encoder in accordance with one embodiment of the present invention.

FIG. 1 is a block diagram of an encoder 10. The encoder 10 of FIG. 1 is implemented in a software program. More specifically, the encoder 10 is implemented when a software encoder encoding image data is executed by a central processing unit (CPU) or a synergistic processing unit (SPU) of an information processing apparatus. As shown in FIG. 1, the encoder 10 includes a wavelet transformer 21, a coefficient rearranger 22, an entropy encoder 23, an intermediate calculation buffer 24, and a coefficient rearranging buffer 25.

The image data input to the encoder 10 is temporarily stored on the intermediate calculation buffer 24 via the wavelet transformer 21. The wavelet transformer 21 wavelet-transforms the image data stored on the intermediate calculation buffer 24. More specifically, the wavelet transformer 21 reads the image data from the intermediate calculation buffer 24, filters the read image data through analysis filters to generate coefficient data of a high frequency region and a low frequency region, and then stores the generated coefficient data on the intermediate calculation buffer 24. The encoder 10, including a horizontal analysis filter and a vertical analysis filter, filter analyzes image data groups in both an image horizontal direction and an image vertical direction. The wavelet transformer 21 reads again the coefficient data of the low frequency region from the intermediate calculation buffer 24, and performs a filtering operation on the read coefficient data using the analysis filters, thereby generating further data of coefficients in a high frequency region and a low frequency region. The generated coefficient data is stored on the intermediate calculation buffer 24.

Upon reaching a predetermined segmentation level (a final segmentation level) through repeating the above process, the wavelet transformer 21 reads the coefficient data and writes the read coefficient data on the coefficient rearranging buffer 25. The wavelet transformer 21 supplies the coefficient data generated in the filtering operation at the final level to the coefficient rearranger 22 without writing the coefficient data on the coefficient rearranging buffer 25.

The coefficient rearranger 22 supplies the coefficient data supplied from the wavelet transformer 21 to the entropy encoder 23. The coefficient rearranger 22 also reads the coefficient data written on the coefficient rearranging buffer 25 in a predetermined order, and then supplies the read coefficient data to the entropy encoder 23.

The entropy encoder 23 quantizes the supplied coefficient data in a predetermined method, for example, entropy encodes the supplied coefficient data through a predetermined entropy encoding method such as the Huffman coding or arithmetic coding. The entropy encoder 23 outputs the generated encoded data from the encoder 10.

The process of the wavelet transformer 21 of FIG. 1 is described in detail. The wavelet transform is described first. As diagrammatically illustrated in FIG. 2, in the wavelet transform to the image data, the image data is segmented into a high spatial frequency region and a low spatial frequency. Segmentation is recursively repeated to resulting low-frequency data in spatial frequency.

Analysis filters include a horizontal analysis filter for performing a horizontal analysis filtering operation on the image data in a horizontal direction on a screen and a vertical analysis filter for performing a vertical analysis filtering operation on the image data in a vertical direction on the screen. One analysis filtering operation is performed in each direction, thereby segmenting the image data into four subbands. The wavelet transformer 21 repeats recursively the horizontal analysis filtering operation and the vertical analysis filtering operation on the bands lower in spatial frequency in horizontal and vertical directions (i.e., in a layer fashion).

Figure 2:
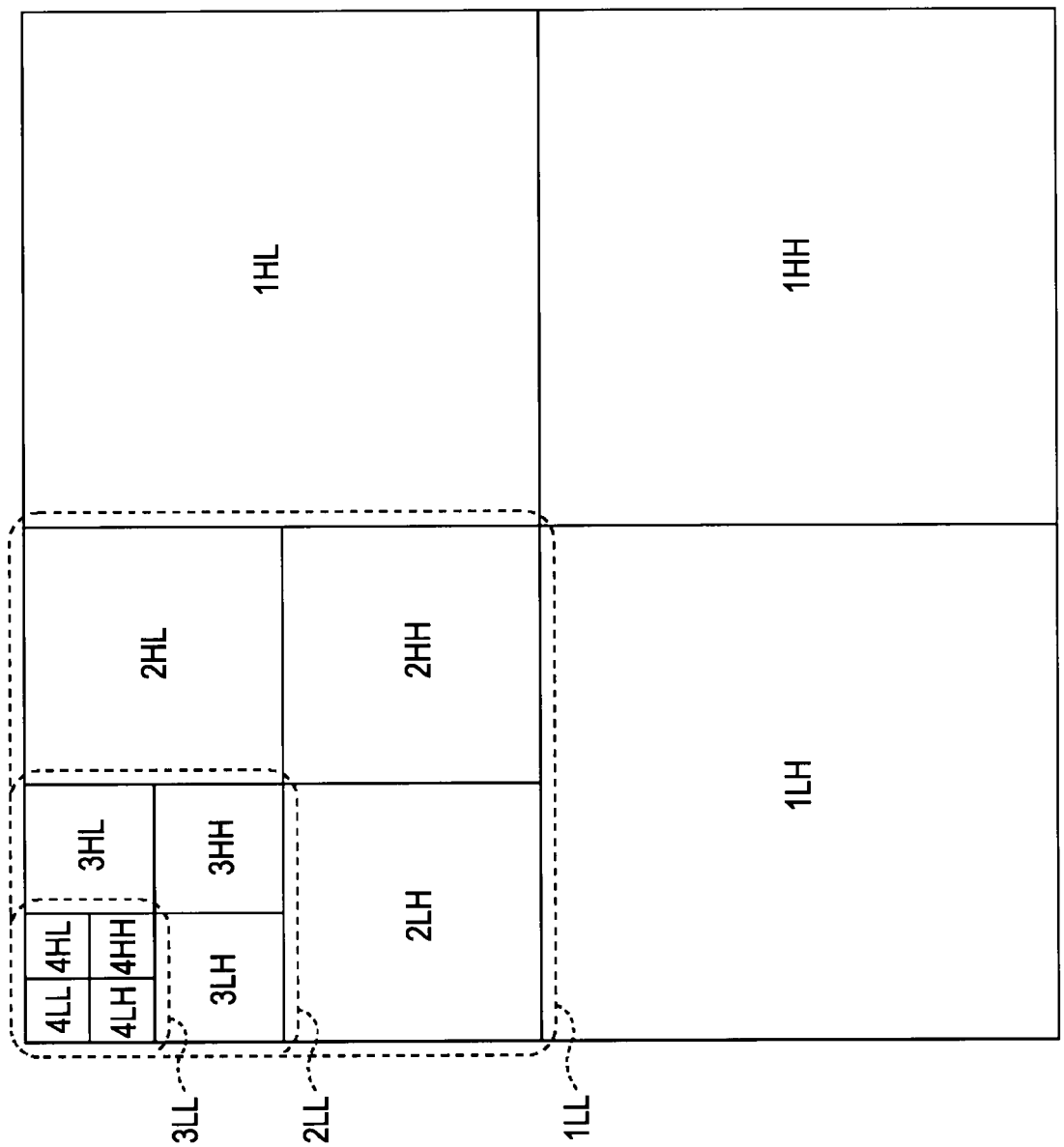
FIG. 2 diagrammatically illustrates wavelet transform.

FIG. 2 diagrammatically illustrates the analysis filtering operation that has been repeated by four times. The horizontal and vertical analysis filtering operations are repeated recursively by four times, a frequency component of the image data of one picture is segmented into thirteen subbands in a layer structure. Data of each subband, i.e., image data of a baseband is segmented into a frequency component on a per frequency band basis. The resulting frequency component is referred to as coefficient data (or simply component).

As shown in FIG. 2, solid squares and broken squares with round corners represent subbands resulting from the analysis filtering operation. A number placed in each subband represents a segmentation level of that subband. More specifically, the number represents how many times the analysis filtering operation has been performed on the image data as the baseband. The subbands labeled the letters "L" and "H" are respectively a low-frequency component and a high-frequency component. The label on the left-hand side represents analysis results of the horizontal analysis filtering operation and the label on the right-hand side represents analysis results of the vertical analysis filtering operation.

As shown in FIG. 2, a first analysis filtering operation is performed on the image data of the baseband, thereby resulting in four subbands (1LL, 1LH, 1HL, and 1HH) at a segmentation level of 1. A second analysis filtering operation is performed on the subband "1LL" having a low-frequency component in both the horizontal direction and the vertical direction. The second analysis filtering operation results in four subbands (2LL, 2LH, 2HL, and 2HH) at a segmentation level of 2. A third analysis filtering operation is performed on the subband "2LL" having a low-frequency component in both the horizontal direction and the vertical direction. The third analysis filtering operation results in four subbands (3LL, 3LH, 3HL, and 3HH) at a segmentation level of 3. A fourth analysis filtering operation is performed on the subband "3LL" having a low-frequency component in both the horizontal direction and the vertical direction. The fourth analysis filtering operation results in four subbands (4LL, 4LH, 4HL, and 4HH) at a segmentation level of 4.

Figure 3A:
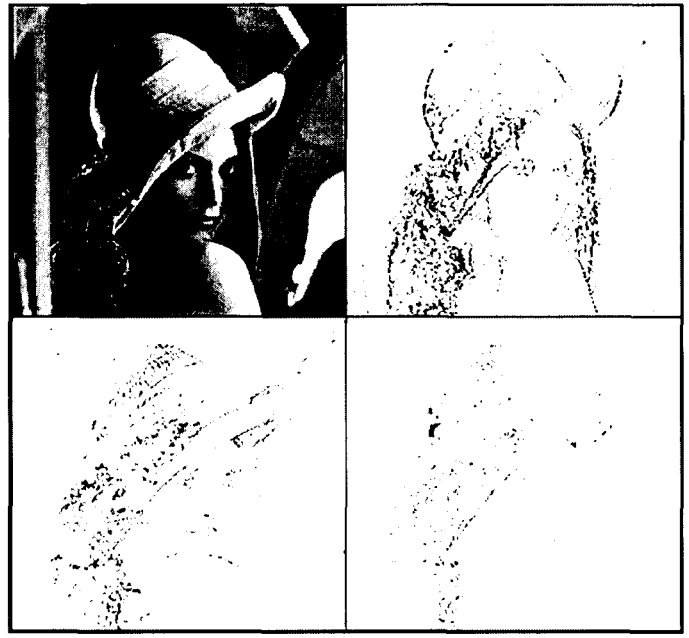
FIGS. 3A and 3B diagrammatically illustrate the wavelet transform.
Figure 3B:
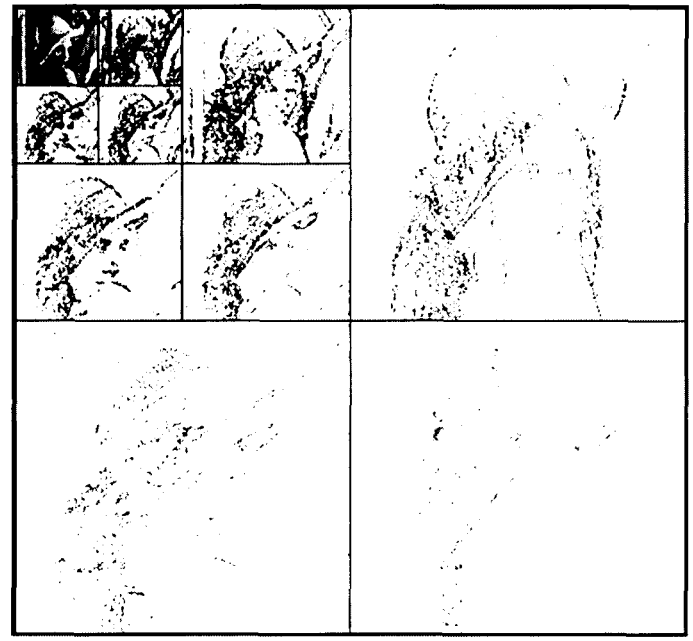

Transform and segmentation are performed on the low frequency component because energy of image concentrates on a low frequency component. This may be understood because subbands are formed as shown in FIG. 3B as segmentation level is increased from an example of segmentation level of 1 shown in FIG. 3A to an example of segmentation level of 3 shown in FIG. 3B. The analysis filtering operation is recursively performed, generating the subbands in a layer structure. Data of a band having a low spatial frequency is narrowed into a small area so that efficient compression encoding is performed in an entropy encoding process.

In the discussion that follows, the analysis filtering operation is performed again on the subband "LL" having the low-frequency component in the horizontal and vertical directions from among the four subbands generated in the analysis filtering operation. The subband "LL" is referred to as a low-frequency subband and the remaining subbands free from subsequent analysis filtering operation, i.e., "LH," "HL," and "HH" are referred to as high-frequency subbands.

The wavelet transformer 21 performs the above-described process using a filter bank containing high-frequency filters and low-frequency filters. Since a digital filter has typically an impulse response having a plurality of tap lengths, namely, a filter factor, input image data or factor data enough to perform a filtering operation needs to be buffered. When the wavelet transform is performed in multiple stages, wavelet transform factors generated in a preceding stage of the number enough to perform the filtering operation need to be buffered.

A specific wavelet transform method using a 5×3 filter is described below. The method of using the filter 5×3 filter, adopted in JPEG 2000 standard, is an excellent method enabling wavelet transform to be performed on image data with a small number of filter taps.

The impulse response (Z transform expression) of the 5×3 filter is composed of a low frequency filter $H_0(z)$ and a high frequency filter $H_1(Z)$ as represented in the following equations (1) and (2).

$$H_0(z)=(-1+2z^{-1}+6z^{-2}+2z^{-3}-z^{-4})/8 \quad (1)$$

$$H_1(z)=(-1+2z^{-1}-z^{-2})/2 \quad (2)$$

The coefficients of the low frequency region and the high frequency region are directly calculated using equations (1) and (2). Using the lifting technique, an amount of calculation for filtering operation is reduced.

A process of the analysis filter performing the wavelet transform is described with reference to FIG. 4. The lifting technique is applied to the 5×3 filter.

Figure 4:
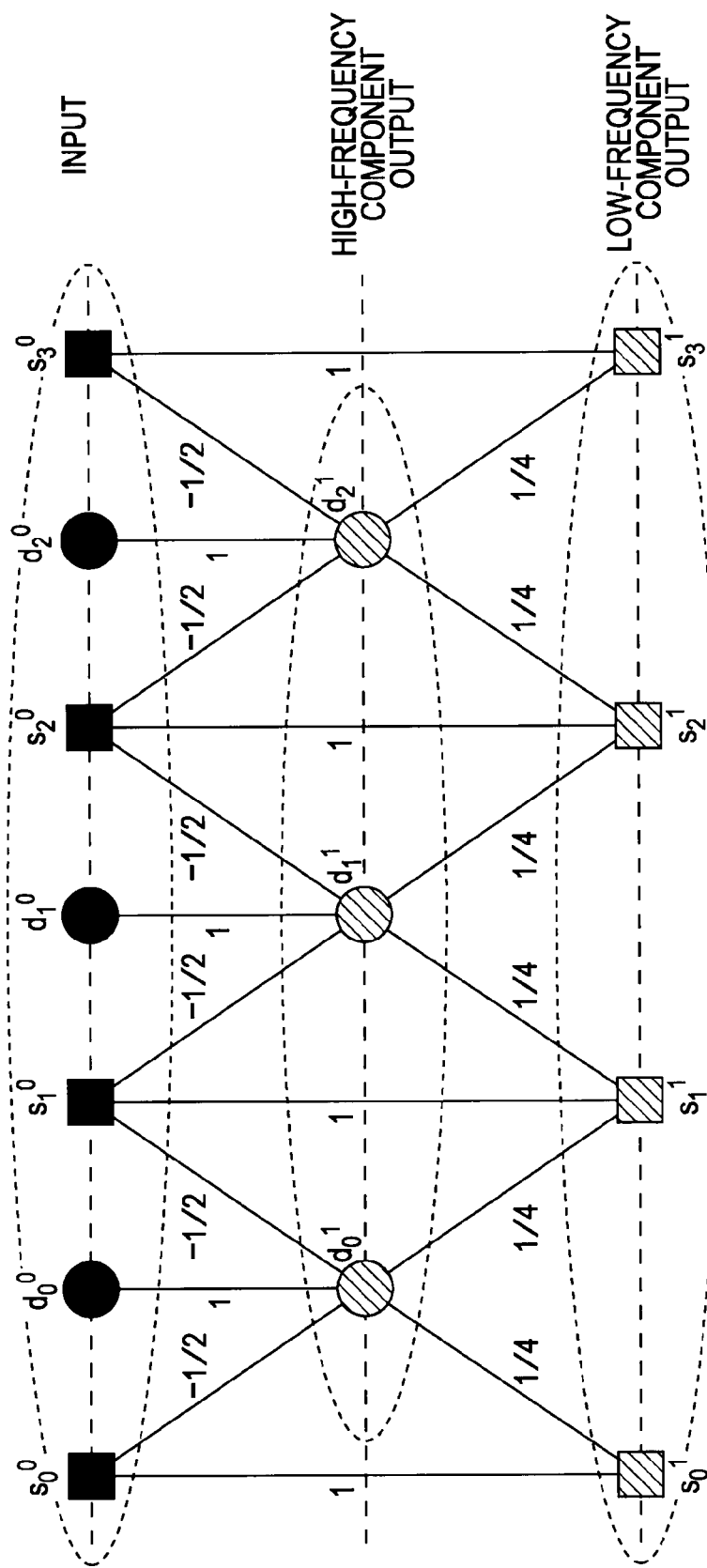
FIG. 4 illustrates a lifting structure of a 5×3 analysis filter.

As shown in FIG. 4, a top row, a medium row and a bottom row respectively represent a pixel line of an input image, a high-frequency component and a low-frequency component.

The top row may represent not only the pixel line of the input image but also the coefficients obtained in a previous filtering operation. The top row here represents the pixel row of the input image. Solid squares denote even-numbered pixels or lines (with a first one being zero) and solid circles denote odd-numbered pixels or lines.

At a first phase, a coefficient $d_i^1$ of a high-frequency component is generated from the input pixel line from the following equation (3):

$$d_i^1 = d_i^0 - \frac{1}{2}(s_i^0 + s_{i+1}^0) \quad (3)$$

At a second phase, a coefficient $s_i^1$ of a low-frequency component from the following equation (4) based on the generated coefficient of the high-frequency component and an odd-numbered pixel of the input image:

$$s_i^1 = s_i^0 + \frac{1}{4}(d_{i-1}^1 + d_i^1) \quad (4)$$

The analysis filter segments the image data of the input image into a high-frequency component and a low-frequency component through the filtering operation.

Figure 5:
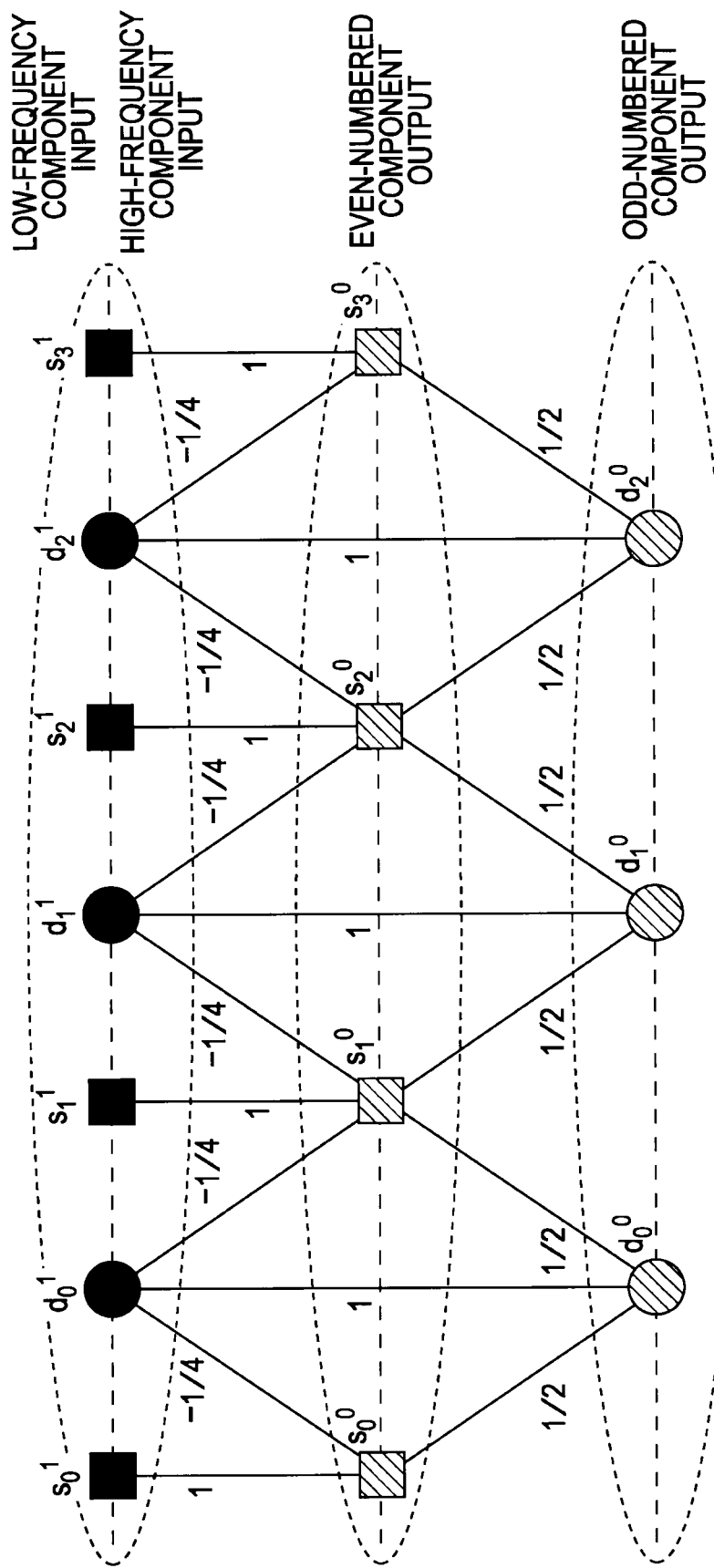
FIG. 5 illustrates a lifting structure of a 5×3 synthesis filter.

A synthesis filtering operation is generally discussed with reference to FIG. 5. The synthesis filtering operation inverse wavelet transforms the wavelet transformed coefficient. As shown in FIG. 5, a 5×3 filter corresponding to the one of FIG. 4 is used with the lifting technique applied. The top row represents input coefficients generated through the wavelet transform. Solid circles represent high-frequency coefficients and solid squares represent low-frequency coefficients.

At a first phase, an even-numbered coefficient $s_i^0$ (with a first coefficient being zero) is generated from the input coefficients of the high-frequency component and the low-frequency component in accordance with the following equation (5):

$$s_i^0 = s_i^1 - \frac{1}{4}(d_{i-1}^1 + d_i^1) \quad (5)$$

At a second phase, an odd-numbered coefficient $d_i^0$ is generated from the even-numbered coefficient $s_i^0$ generated at the first phase and the coefficient $d_i^1$ of the input high-frequency component in accordance with the following equation (6):

$$d_i^0 = d_i^1 + \frac{1}{2}(s_i^0 + s_{i+1}^0) \quad (6)$$

The synthesis filter performs inverse wavelet transform by synthesizing the coefficients of the high-frequency component and the low-frequency component through the filtering operation.

Figure 6:
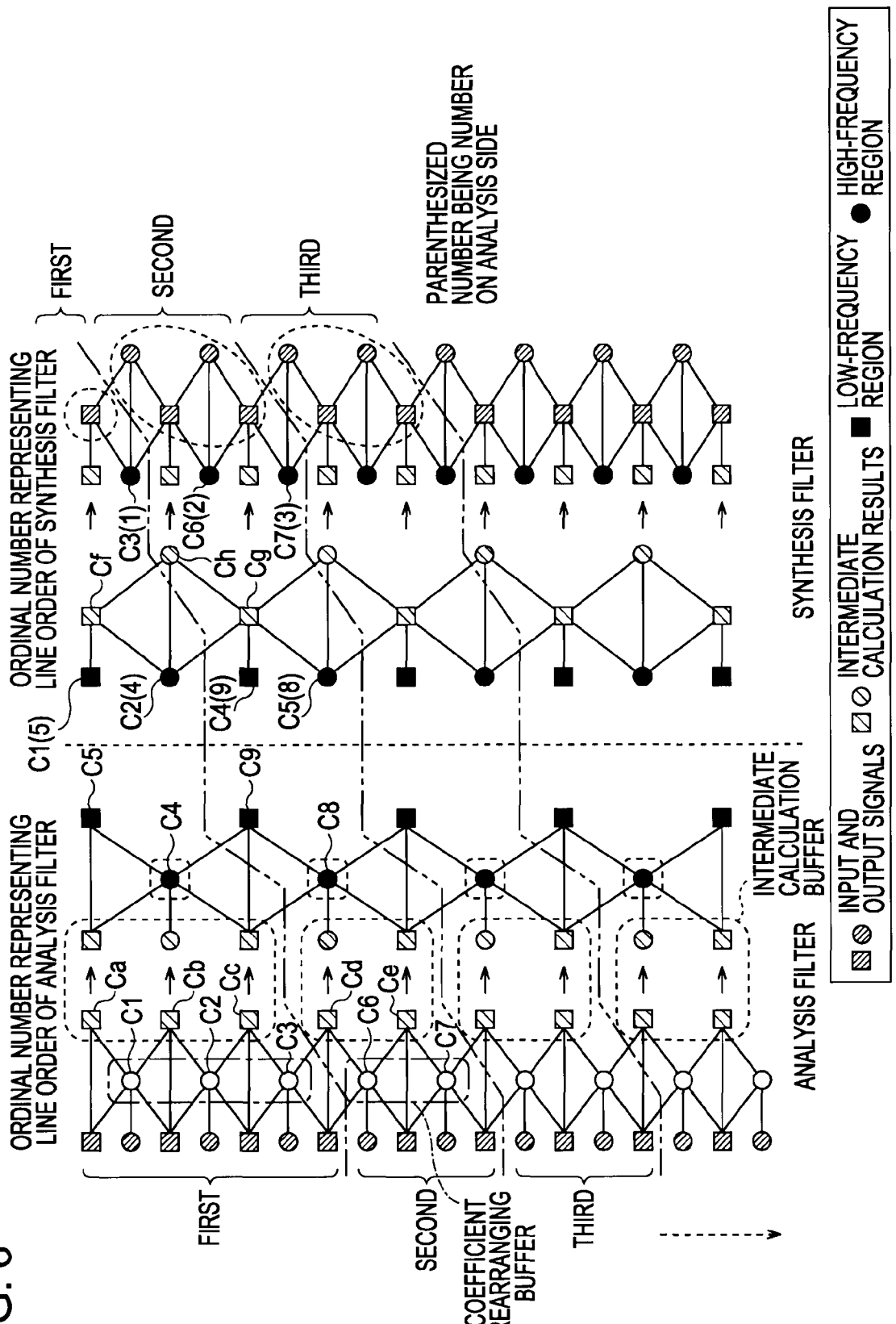
FIG. 6 illustrates a lifting filtering operation of the 5×5 filter performed to a segmentation level=2.

The wavelet transform is described more specifically. FIG. 6 illustrates a lifting filtering operation of the 5×3 filter performed to a segmentation level of 2. An analysis filter shown in the left portion of FIG. 6 is the filter of the wavelet transformer 21 of FIG. 1. A synthesis filter shown in the right portion of FIG. 6 is an inverse wavelet transform filter to be discussed later.

Actual image data is two-dimensional information. However, for simplicity of explanation, FIG. 6 illustrates the image data in one-dimensional representation on the premise that pixels are present behind the plane of the page of FIG. 6 in a direction perpendicular to the page. The processes of the horizontal analysis filter and the synthesis filter are not shown in FIG. 6.

As shown in FIG. 6, a left-end column is composed of vertically arranged pixel data at positions on each line of original image data. More specifically, in the filtering operation of the wavelet transformer 21, the vertical filter is used to scan the pixels vertically on the screen. First column through third column represent a filtering operation of segmentation level=1, and fourth column through sixth column represent a filtering operation of segmentation level=2. The second column from the left represents a high frequency output based on the pixels of the left end original image data. The third column from the left represents a low frequency output based on the original image data and the high frequency component output. As shown in the fourth through sixth columns, the filtering operation of segmentation level=2 is performed on the output of the filtering operation of segmentation level=1.

In a first phase of the filtering operation of segmentation level=1, coefficient data of the high frequency component is calculated based on the image of the original image data. In a second phase, coefficient data of the low frequency component is calculated based on the coefficient data of the high frequency component calculated in the first phase, and the pixel of the original image data. The filtering operation of segmentation level=1 is illustrated in the first column through third column on the left side (analysis filter side) in FIG. 6. The calculated coefficient data of the high frequency component is stored on the coefficient rearranging buffer 25 discussed with reference to FIG. 1. The coefficient data of the low frequency component is stored on the intermediate calculation buffer 24 of FIG. 1.

As shown in FIG. 6, the coefficient rearranging buffer 25 is represented as a dot-and-dash chain line box, and the intermediate calculation buffer 24 is represented as a broken line box.

The filtering operation of segmentation level=2 is performed based on the results of the filtering operation of segmentation level=1 stored on the intermediate calculation buffer 24. In the filtering operation of segmentation level=2, the coefficient data calculated as the coefficient of the low frequency component in the filtering operation of segmentation level=1 is regarded as the coefficient data containing the low frequency component and the high frequency component, and then a filtering operation similar to the filtering operation of segmentation level=1 is performed. The coefficient data of the high frequency component and the coefficient data of the low frequency component, calculated in the filtering operation of segmentation level=2, are supplied to the coefficient rearranger 22 instead of being stored onto the coefficient rearranging buffer 25. The calculated coefficient data of the high frequency component is stored onto the intermediate calculation buffer 24.

The wavelet transformer 21 performs the above-described filtering operation in both the horizontal direction and the vertical direction on the screen. For example, the filtering operation of segmentation level=1 is first performed in the horizontal direction, and the generated coefficient data of the high frequency component and the low frequency component is stored on the intermediate calculation buffer 24. The filtering operation of segmentation level=1 is then performed in the vertical direction on the coefficient data stored on the intermediate calculation buffer 24. The filtering operation of segmentation level=1 in both the horizontal direction and the vertical direction results in four regions, namely, regions HH and HL, and regions LH and LL. The regions HH and HL are coefficient data that is obtained by further segmenting the high frequency component into a high frequency component and a low frequency component and the regions LH and LL are coefficient data that is obtained by further segmenting the low frequency component into a high frequency component and a low frequency component.

At segmentation level=2, the filtering operation is performed in each of the horizontal direction and the vertical direction on the coefficient data of the low frequency component generated in segmentation level=1. More specifically, in segmentation level=2, the region LL segmented at segmentation level=1 is further segmented into four regions. The region LL thus contains a region HH, a region HL, a region LH, and a region LL.

The wavelet transformer 21 performs the filtering operation in accordance with the wavelet transform on the screen in a vertical direction in a stepwise manner by several times, each time with several lines processed. As shown in FIG. 6, seven lines are processed at a first time starting with a first line on the screen, and four lines are processed at a second time starting with an eighth line on the screen. The number of lines is the number of lines required to generate the low frequency component of one line after each region is divided into a high frequency component and a low frequency component.

In the discussion that follows, a set of lines, containing other subbands, required to generate one line of the lowest frequency component (coefficient data of one line of subbands containing the lowest frequency component) is referred to as a precinct (or line block). The line herein refers to one row of pixel data or coefficient data formed in a picture, a field, or a subband corresponding to the image data prior to wavelet transform. More specifically, the precinct (line block) is several lines of a pixel data group, in the original image data prior to the wavelet transform, required to generate one line of subband of coefficient data in the lowest frequency component subsequent to wavelet transform, or the line block (precinct) is a coefficient data group of each subband obtained by wavelet transforming the pixel data group.

As shown in FIG. 6, a coefficient C5 obtained as a result of the filtering operation of segmentation level=2 is calculated from a coefficient $C_a$ stored on the intermediate calculation buffer 24 and a coefficient C4. The coefficient C4 is calculated from the coefficient $C_a$, a coefficient $C_b$, and a coefficient $C_c$, all stored on the intermediate calculation buffer 24. The coefficient $C_c$ is calculated from coefficients C2 and C3 stored on the coefficient rearranging buffer 25, and image data on a fifth line. The coefficient C3 is calculated from image data on the fifth line through the seventh line. To obtain the coefficient C5 at segmentation level=2, the image data on the first line through the seventh line is required.

In contrast, the filtering operation at the second time thereafter may use the coefficient data previously calculated in the preceding filtering operation and stored on one of the intermediate calculation buffer 24 and the coefficient rearranging buffer 25. A smaller number of lines thus works.

More specifically, as shown in FIG. 6, from among the coefficients of the low frequency component obtained as a result of filtering operation of segmentation level=2, a coefficient C9 subsequent to the coefficient C5 is calculated from the coefficients C4 and C8 and the coefficient $C_c$ stored on the intermediate calculation buffer 24. The coefficient C4 is previously calculated in the first filtering operation, and already stored on the intermediate calculation buffer 24. Similarly, the coefficient $C_c$ is previously calculated in the first filtering operation and already stored on the intermediate calculation buffer 24. In the second filtering operation, only a filtering operation for calculating the coefficient C8 is performed. This new filtering operation further uses the eight through eleventh lines.

The second and subsequent filtering operations can use data calculated in the preceding filtering operation and stored on the intermediate calculation buffer 24 and the coefficient rearranging buffer 25, and are simply performed every four lines.

If the number of lines on the screen fails to match the number of lines in encoding, the filtering operation is performed by copying a line of the original image data to equalize the number of lines to the number of lines in encoding.

The filtering operation to obtain the coefficient data of one of the lowest frequency component is performed several times in a stepwise manner (by precinct) to cover the lines of the entire screen as will be described in detail later. This arrangement allows the image to be decoded with short delay time involved when the encoded data is transmitted and then decoded.

To perform the wavelet transform, a first buffer and a second buffer are used. The first buffer is used to perform the wavelet transform and the second buffer stores the coefficient generated when the filtering operation is performed to a predetermined segmentation level. The first buffer corresponds to the intermediate calculation buffer 24 and is represented by the broken lines in FIG. 6. The second buffer corresponds to the coefficient rearranging buffer 25 and is represented by the dot-and-dash chain line in FIG. 6. The coefficient stored on the second buffer is to be entropy encoded in a later entropy encoding process.

The process of the coefficient rearranger 22 of FIG. 1 is described below. As previously discussed, the encoded data calculated by the wavelet transformer 21 is stored on the coefficient rearranging buffer 25, rearranged in the order of the synthesis process by the coefficient rearranger 22, and transferred to the entropy encoder 23.

As previously discussed, the coefficients are generated from the high frequency component to the low frequency component in the wavelet transform. As shown in FIG. 6, the filtering operation of segmentation level=1 generates successively the coefficient C1, the coefficient C2, and the coefficient C3 from the image data of the original image in the first process. The filtering operation of segmentation level=2 is performed on the coefficient data of the low frequency component obtained in the filtering operation of segmentation level=1 and the coefficient C4 and the coefficient C5 of the low frequency component are successively generated. More specifically, in the first process, the coefficient data is generated in the order of the coefficient C1, the coefficient C2, the coefficient C3, the coefficient C4 and the coefficient C5. This generation order of the coefficient data is natural (from high frequency component to low frequency component) due to the principle of the wavelet transform.

In contrast, on the decoder side (the synthesis filter side), the image needs to be generated and output from the low frequency component to the high frequency component in order to decode immediately with a small amount of delay. The coefficient data generated on the encoder side is preferably rearranged in a direction from the low frequency component to the high frequency component and then supplied to the decoder side.

This arrangement is described more specifically with reference to FIG. 6. The synthesis filter for performing the inverse wavelet transform is illustrated on the right side of FIG. 6. A first synthesizing process for the first line and other lines of the output image data (inverse wavelet transform) is performed using the coefficient C4 and the coefficient C5 of the low frequency component generated in the first filtering operation on the encoder side and the coefficient C1.

More specifically, in the first synthesis process, the encoder side supplies the decoder side with the coefficient data in the order of the coefficient C5, the coefficient C4 and the coefficient C1. The decoder side performs the synthesis process on the coefficient C5 and the coefficient C4 in a synthesis level=2 corresponding to segmentation level=2, thereby generating and storing a coefficient $C_f$. In a synthesis level=1 corresponding to the segmentation level=1, the synthesis process is performed on the coefficient $C_f$ and the coefficient C1 and the synthesis result is output as a first line.

In the first synthesis process, the coefficient data, generated and stored on the coefficient rearranging buffer 25 in the order of the coefficient C1, the coefficient C2, the coefficient C3, the coefficient C4 and the coefficient C5, is rearranged in the order of the coefficient C5, the coefficient C4, the coefficient C1, . . . , and then supplied to the decoder side.

As for synthesis filter illustrated on the right side of FIG. 6, the coefficient supplied from the encoder side has a parenthesized number on the encoder side, and an unparenthesized number indicating a line number in the synthesis filter. For example, the coefficient C1(5) means the coefficient C5 on the analysis filter on the left side in FIG. 6 and the first line in the synthesis filter side.

The synthesis process of the decoder side is performed on the coefficient data processed in the second and subsequent filtering operations on the encoder side using the coefficient data synthesized in the preceding synthesis process or supplied from the encoder side. As shown in FIG. 6, the second synthesis process of the decoder side to be performed using the coefficient C8 and the coefficient C9 of the low frequency component generated in the second filtering operation on the encoder side further needs the coefficient C2 and the coefficient C3 generated in the first filtering operation on the encoder side. The second line through the fifth line are thus decoded.

In the second synthesis process, the encoder side supplies to the decoder side the coefficient data in the order of the coefficient C9, the coefficient C8, the coefficient C2, and the coefficient C3. The decoder side generates a coefficient $C_g$ in the process of synthesis level=2 using the coefficient C8 and the coefficient C9 and the coefficient C4 supplied from the encoder side at the first synthesis process, and stores the coefficient $C_g$ on the buffer. The decoder side generates a coefficient $C_h$ using the coefficient $C_g$, the coefficient C4, and the coefficient $C_f$ generated in the first synthesis process and stored on the buffer, and then stores the coefficient $C_h$ on the buffer.

The decoder side performs the synthesis process of synthesis level=1 using the coefficient $C_g$ and the coefficient $C_h$ generated in the synthesis process of synthesis level=2 and stored on the buffer, the coefficient C2 (referred to as a coefficient C6(2) in the synthesis filter) and the coefficient C3 (referred to as a coefficient C7(3) in the synthesis filter) supplied from the encoder side. The decoder side thereby decodes the second line through the fifth line.

In the second synthesis process, the coefficient data generated on the encoder side in the order of the coefficient C2, the coefficient C3, (the coefficient C4 and the coefficient C5), the coefficient C6, the coefficient C7, the coefficient C8, and the coefficient C9 is rearranged in the order of the coefficient C9, the coefficient C8, the coefficient C2, the coefficient C3, . . . before being transferred to the decoder side.

In the third and subsequent synthesis analysis processes, the coefficient data stored on the coefficient rearranging buffer 25 is also rearranged and then transferred to the decoder side. The decoder side decodes the lines with four lines at a time.

In a synthesis process on the decoder side responsive to the filtering operation for the other lines including the bottom line on the screen on the encoder side (hereinafter referred to as final filtering operation), the coefficient data generated and stored heretofore on the buffer in the preceding processes is all output. The number of output lines becomes large. As shown in FIG. 6, eight lines are output at the final process.

The coefficient rearranger 22 may rearrange the coefficient data by setting, in a predetermined order, read addresses in the reading of the coefficient data stored on the coefficient rearranging buffer 25.

A group of coefficient data newly required in any given synthesis process on the decoder side is referred to as a precinct. More specifically, the precinct is a group of coefficient data required in the synthesis process excluding the group of coefficient data used in the preceding syntheses process or a group of coefficient data decoded in any one given synthesis process. With reference to FIG. 6, areas delineated by a two-dot-and-dash chain line represent a precinct on the encoder side and a precinct on the decoder side. For example, an n-th precinct on the encoder does not necessarily match in area an n-th precinct on the decoder side.

Figure 7A:
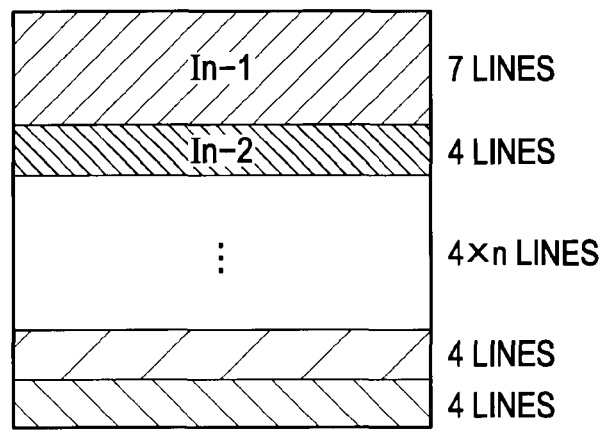
FIGS. 7A-7C diagrammatically illustrate a process flow of the wavelet transform and inverse wavelet transform in accordance with one embodiment of the present invention.
Figure 7B:
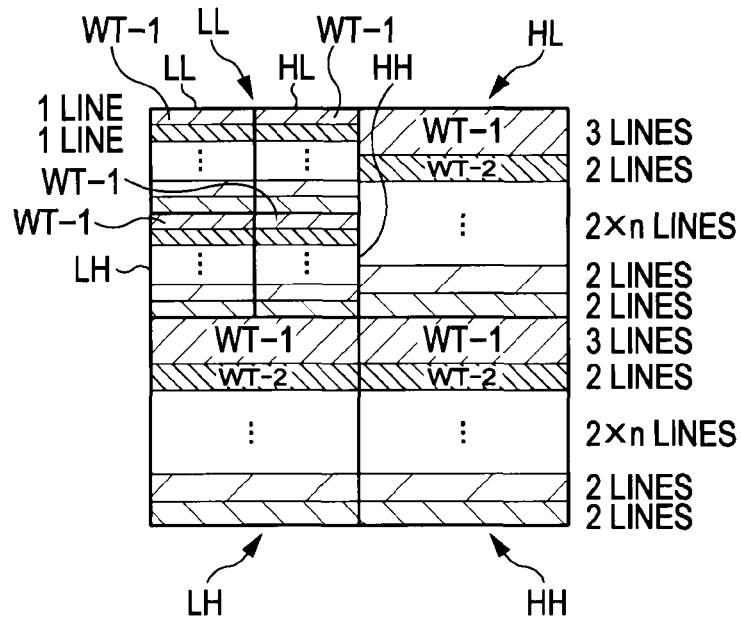
Figure 7C:
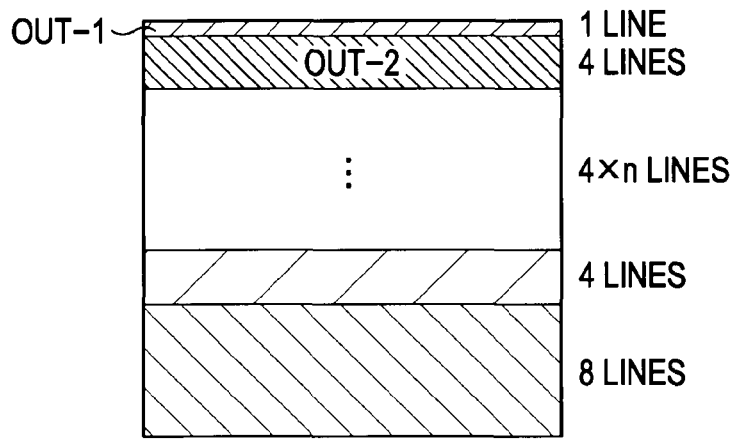

The above-referenced process is specifically described with reference to FIGS. 7A-7C. FIGS. 7A-7C illustrate a wavelet transform filtering operation to segmentation level=2 using the 5×3 filter. As shown in FIG. 7A, the wavelet transformer 21 performs the first filtering operation on the input image data of the first line to the seventh line in the horizontal direction and the vertical direction (In-1 in FIG. 7A).

In the first filtering operation of segmentation level=1, the coefficient data of three lines including the coefficient C1, the coefficient C2 and the coefficient C3 is generated, and arranged in the region HH, the region HL, and the region LH formed at segmentation level=1 as shown in FIG. 7B (WT-1 in FIG. 7B).

The region LL formed at segmentation level=1 is further segmented into four regions in the filtering operation of segmentation level=2 in the horizontal direction and the vertical direction. As for the coefficient C5 and the coefficient C4 generated at segmentation level=2 and arranged in the region LL of segmentation level=1, one line of the coefficient C5 is arranged in the region LL, and one line of the coefficient C4 is arranged in each of the region HH, the region HL, and the region LH.

In the second and subsequent filtering operations by the wavelet transformer 21, each filtering operation is performed on four lines at a time (In-2 in FIG. 7A), two lines of coefficient data are generated at a time at segmentation level=1 (WT-2 of FIG. 7B), and one line of coefficient data is generated at segmentation level=2.

In the second process of FIG. 6, two lines of coefficient data of the coefficient C6 and the coefficient C7 are generated in the filtering operation of segmentation level=1, and arranged subsequent to the coefficient data generated in the first filtering operation in the region HH, the region HL, and the region LH formed at segmentation level=1 as shown in FIG. 7B. Similarly, in the region LL of segmentation level=1, one line of coefficient C9 generated in the filtering operation of segmentation level=2 is arranged in the region LL, one line of coefficient C8 is arranged in each of the region HH, the region HL and the region LH.

When the wavelet transformed data is decoded as shown in FIG. 7B, the decoder side performs the first synthesis process in response to the first filtering operation of the encoder side on the first line through the seventh line, thereby outputting the first line (Out-1 of FIG. 7C). The decoder side outputs four lines at a time in response to the filtering operation of the encoder side from the second to the final filtering operation (Out-2 . . . of FIG. 7C). In response to the final round of filtering operation on the encoder side, the decoder side outputs eight lines.

The coefficient data generated by the wavelet transformer 21 from the high frequency component to the low frequency component, except the coefficient data generated in the analysis filtering operation at the final level, is successively stored on the coefficient rearranging buffer 25. When the coefficient data is stored on the coefficient rearranging buffer 25 to the extent that allows the coefficient data to be rearranged, the coefficient rearranger 22 reads the coefficient data in the rearranged order for the synthesis process. The coefficient data read is successively supplied to the entropy encoder 23.

The process of the analysis filter performing the wavelet transform is diagrammatically described with the lifting technique applied to the 9×7 filter.

Figure 8:
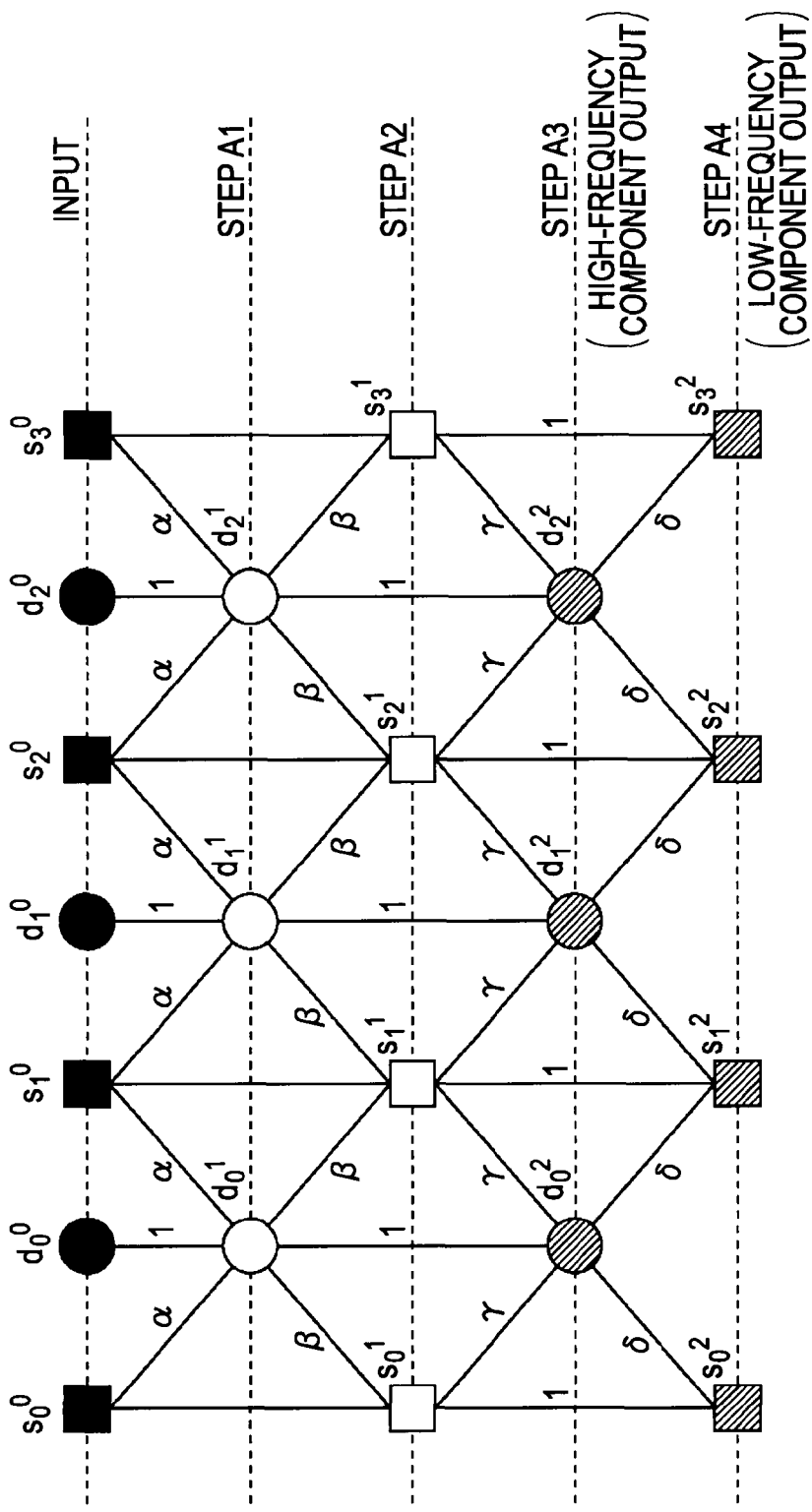
FIG. 8 illustrates a lifting structure of a 9×7 analysis filter.

FIG. 8 illustrates the lifting structure of the 9×7 filter. As shown in FIG. 8, a first row (top row) represents a sample group (pixel line) of an input image and second and third rows represent components (coefficients) generated in step A1 and step A2. A fourth row represents a high-frequency component generated in step A3 and a fifth row represents a low-frequency component generated in step A4. The top row may be not only the sample group of the input image but also coefficients obtained in a preceding analysis filtering operation. Solid squares denote even-numbered samples or lines and solid circles denote odd-numbered samples or lines.

The analysis filtering operation of applying the lifting technique to the 9×7 filter results in the high-frequency component in step A3 and the low-frequency component in step A4. The processes in steps A1-A4 are described by the following equations (7) through (10):

$$\text{Step } A1: d_i^1 = d_i^0 + \alpha(s_i^0 + S_{i+1}^0) \tag{7}$$

$$\text{Step } A2: s_i^1 = s_i^0 + \beta(d_{i-1}^1 + d_i^1) \tag{8}$$

$$\text{Step } A3: d_i^2 = d_i^1 + \gamma(s_i^1 + S_{i+1}^1) \tag{9}$$

$$\text{Step } A4: s_i^2 = s_i^1 + \delta(d_{i-1}^2 + d_i^2) \tag{10}$$

where $\alpha = -1.586134342$, $\beta = -0.05298011857$, $\gamma = 0.8829110755$, and $\delta = 0.4435068520$.

In the analysis filtering operation with the lifting technique applied, processes in steps A1 and A2 are performed. After the high-frequency component coefficient is generated in step A3, the low-frequency component coefficient is generated in step A4.

Figure 9:
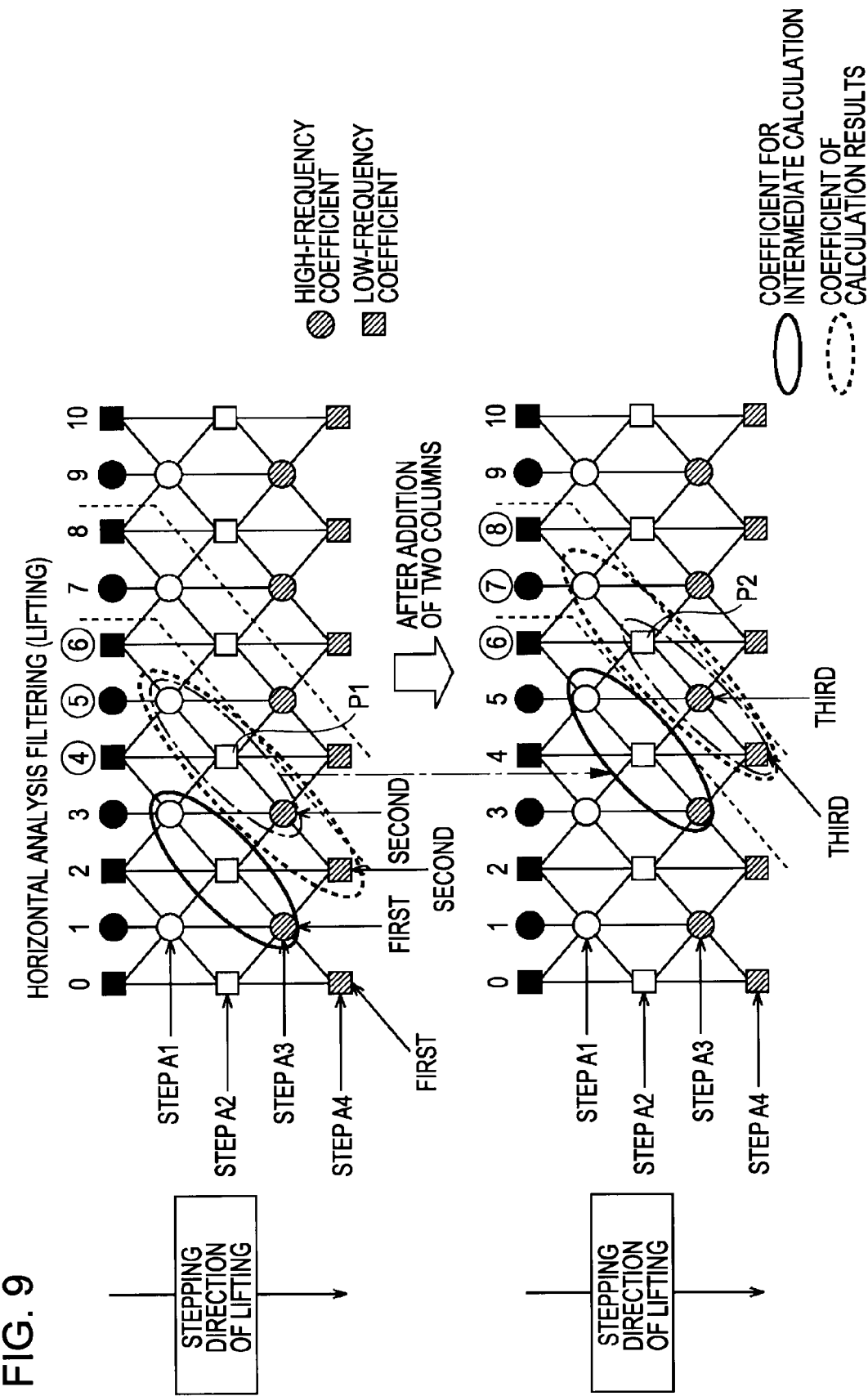
FIG. 9 illustrates a horizontal analysis filtering operation performed on a coefficient group in a horizontal direction using the lifting structure of FIG. 8.

FIG. 9 illustrates the horizontal analysis filtering operation that is applied to the coefficient group in the horizontal direction using the lifting structure of FIG. 8.

As shown in FIG. 9, the input horizontal coefficients have undergone the processes in the four steps (steps A1-A4) described with reference to FIG. 8. The high-frequency component coefficient (also referred to as high-frequency coefficient) and the low-frequency component coefficient (also referred to as low-frequency coefficient) are thus generated. The direction of step of the lifting process is downward from top to bottom. Numbers horizontally placed above the coefficients represent column numbers.

Solid circles and solid squares at the first row represent input high-frequency coefficients and low-frequency coefficients, respectively. Solid circles and solid squares at the second and lower rows represent high-frequency coefficients and low-frequency coefficients, respectively, generated in lifting operation. Hatched circles and squares represent high-frequency coefficients and low-frequency coefficients, respectively, as lifting results.

The lifting operation is described from top to bottom rows. At the top row of FIG. 9, three coefficients at column numbers 4 through 6 are input. A horizontal lifting operation is now performed.

Coefficients at column numbers 0 through 4 are used to determine a first high-frequency coefficient in step A3 of the horizontal lifting operation and a first low-frequency coefficient in step A4 of the horizontal lifting operation.

Three coefficients enclosed in a heavy-lined ellipse and coefficients at two columns, namely, circled column numbers 5 and 6 are used to determine second high-frequency coefficient and low-frequency coefficient. To calculate a coefficient labeled P1 in step A2, a coefficient at circled column number 4 is also used.

The three coefficients enclosed in the heavy-lined ellipse are parts of the coefficients generated in the course of the horizontal lifting operation to determine the first high-frequency coefficient and low-frequency coefficient (hereinafter referred to as a first horizontal lifting operation).

The coefficients at circled column numbers 4 through 6 are input to determine second high-frequency coefficient and low-frequency coefficient. The three coefficients enclosed in the heavy-lined ellipse generated in the course of the first horizontal lifting operation are stored on the intermediate calculation buffer 24 as intermediate calculation coefficients.

The horizontal lifting operation is performed on the three coefficients enclosed in the heavy-lined ellipse stored on the intermediate calculation buffer 24 in the first horizontal lifting operation and the coefficients at three columns, namely, at column numbers 4 through 6. In the course of and at the end of the horizontal lifting operation, four coefficients including the second high-frequency coefficient and low-frequency coefficient are generated (as represented by a broken-heavy-lined ellipse). Within this ellipse, three coefficients falling within a dot-and-dash-chained ellipse are used to determine third high-frequency coefficient and low-frequency coefficient and are stored onto the intermediate calculation buffer 24 as intermediate calculation coefficients.

FIG. 9 illustrates in the lower portion thereof a horizontal lifting operation that is performed when coefficients at two columns in a horizontal direction are additionally input subsequent to inputting of the coefficient at column number 6. More specifically, the horizontal lifting operation is performed with coefficients at column numbers 6 through 8 in a horizontal direction input.

Three coefficients enclosed in a heave-lined ellipse and coefficients at two columns of circled column numbers 7 and 8 are used to determine third high-frequency coefficient and low-frequency coefficient in a similar manner as the second high-frequency coefficient and low-frequency coefficient are determined. A coefficient at a circled column number 6 is also used to determine a coefficient labeled P2 in step A2.

In the middle of the second horizontal lifting operation, the intermediate calculation buffer 24 stores the three coefficients enclosed in the broken-heavy-lined ellipse shown in the lower portion of FIG. 9, and also enclosed in the dot-and-dash-chained ellipse shown in the upper portion of FIG. 9.

The horizontal lifting operation is performed on the three coefficients enclosed in the heavy-lined ellipse stored on the intermediate calculation buffer 24 in the middle of the second horizontal lifting operation and the input coefficients at the three columns of column numbers 6 through 8. This horizontal lifting operation results in four coefficients including third high-frequency coefficient and low-frequency coefficient (as enclosed in a broken-heavy-lined ellipse). Within the four coefficients, three coefficients enclosed in a dot-and-dash-chained ellipse are used to generate fourth high-frequency coefficient and low-frequency coefficient and are thus stored onto the intermediate calculation buffer 24.

The coefficients at the three columns are input while the three coefficients in intermediate calculation are stored. The horizontal lifting operation is performed to the rightmost column on the screen. The analysis filtering operation in the horizontal direction is thus completed.

Figure 10:
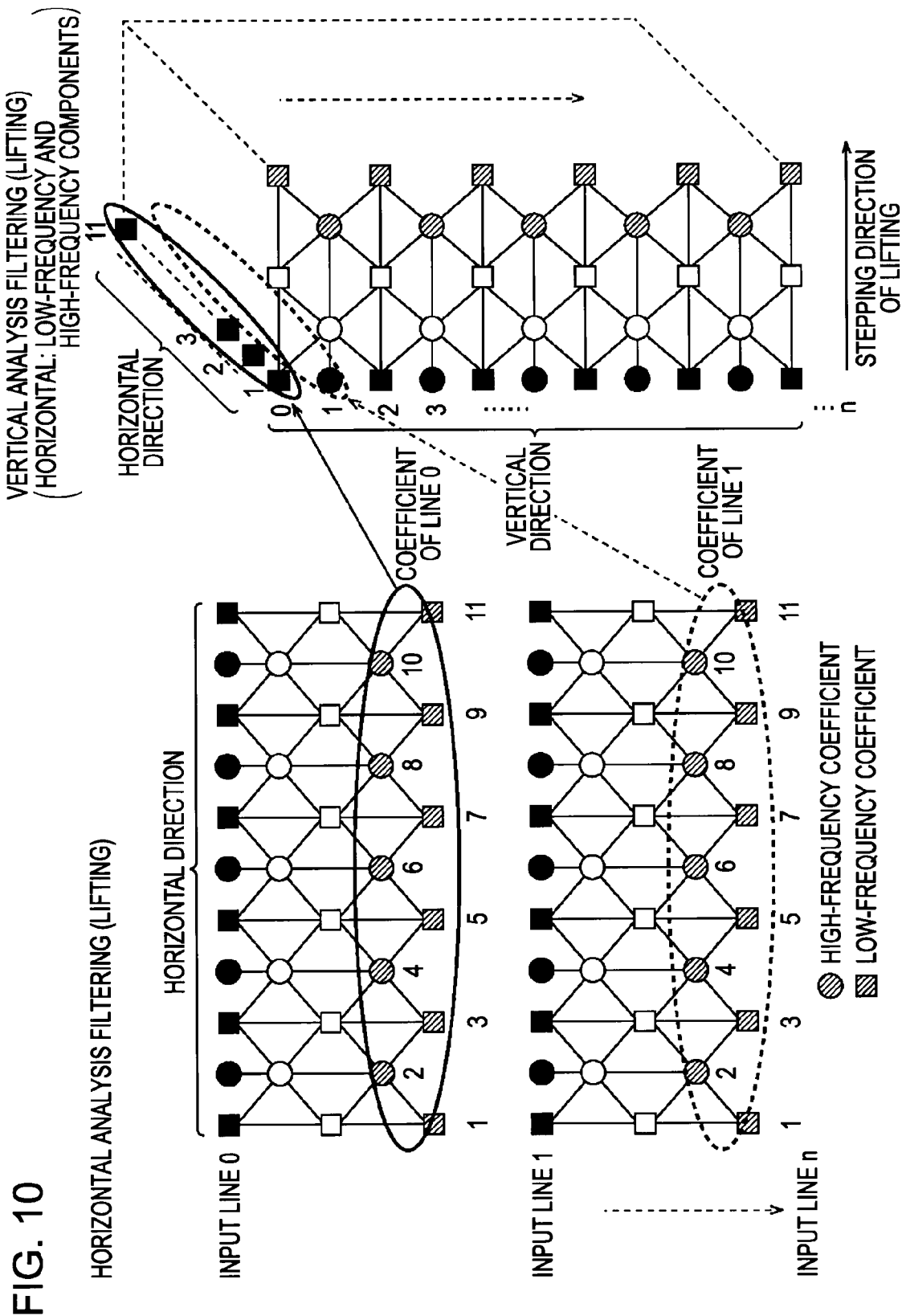
FIG. 10 illustrates the horizontal analysis filtering operation performed with lines of coefficients input in a direction from top to bottom.

In the above discussion, the horizontal lifting operation for one line based on the lifting technique has been performed. A vertical analysis filtering operation based on the lifting technique is described below with reference to FIG. 10. In FIG. 10, coefficients identical to those illustrated in FIGS. 8 and 9 are similarly illustrated and no detailed discussion is provided.

FIG. 10 illustrates in the left portion thereof the horizontal lifting operation performed on each input line. FIG. 10 illustrates in the right portion thereof the vertical lifting operation performed on the coefficients as results of the horizontal lifting operation performed to each line input in a vertical direction from top to bottom.

The left portion of FIG. 10 is described first. The horizontal lifting operation composed of four steps is performed on coefficients at the first input line 0, resulting in low-frequency coefficients and high-frequency coefficients numbered with 1 through 11. Odd-numbered coefficients (1, 3, 5, 7, 9 and 11) are low-frequency coefficients and even-numbered coefficients (2, 4, 6, 8, and 10) are high-frequency coefficients.

Only input line 1 is shown in FIG. 10. The same process is performed on input lines 1 through n. More specifically, the horizontal lifting operation is performed on the first line 1 in four steps, thereby generating low-frequency coefficients and high-frequency coefficients. Odd-numbered coefficients (1, 3, 5, 7, 9 and 11) are low-frequency coefficients and even-numbered coefficients (2, 4, 6, 8, and 10) are high-frequency coefficients.

As shown in the right portion of FIG. 10, the coefficients numbered with 1 through 11 as results of the horizontal filtering operation on the input line 0 are arranged horizontally from front to backward at the first row. The coefficients numbered with 1 through 11 as results of the horizontal filtering operation on the input line 1 are arranged horizontally from front to backward at the second row. The coefficients numbered with 1 through 11 as results of the horizontal filtering operation on the input line 2 are arranged horizontally from front to backward at the third row.

The coefficients as results of the horizontal filtering operation performed on the input line 0 to input line n are shown vertically from top to bottom on the right portion of FIG. 10. In practice, the coefficients numbered with 1 through 11 as a result of the horizontal filtering operation on each input line are arranged in a horizontal direction from front to back in a manner such that the low-frequency coefficient alternates with the high-frequency coefficient.

As soon as a predetermined number of coefficients in a vertical direction is collected, i.e., a predetermined number of lines is collected, the vertical lifting operation is performed from left to right in the stepping direction of the lifting as shown in the right portion of FIG. 10.

Figure 11:
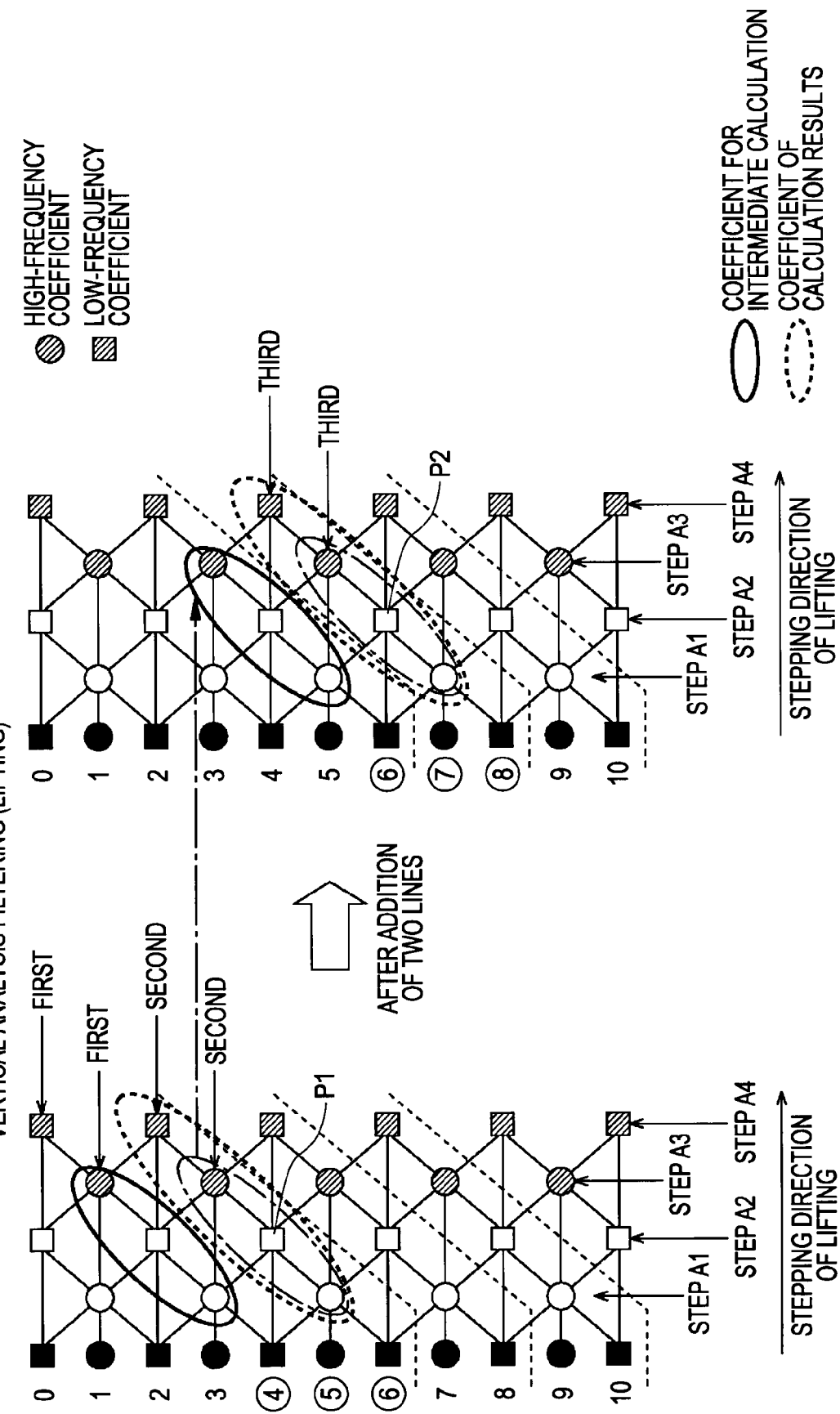
FIG. 11 illustrates a vertical analysis filtering operation performed on a coefficient group in a vertical direction using the lifting structure of FIG. 8.

The vertical analysis filtering operation is described below. As shown in FIG. 11, the vertical analysis filtering operation in the lifting structure of FIG. 8 is performed on the coefficients that are obtained by vertically arranging the results of the horizontal analysis filtering operation.

FIG. 11 focuses on each of the coefficients arranged horizontally in the right portion of FIG. 10. In the actual two-dimensional wavelet transform, the vertical analysis filtering operation needs to be calculated by the number of times equal to the number of coefficients in the horizontal direction of the frequency components (subbands) generated in the course of the wavelet transform.

As shown in FIG. 11, the high-frequency coefficients and the low-frequency coefficients are generated through the four steps of A1 through A4 discussed with reference to FIG. 8. The stepping direction of the lifting is rightward. Numbers respectively vertically placed to the left of the coefficients represent line numbers.

Circles and squares on a first column from the left represent input high-frequency components and low-frequency components, respectively. Circles and squares on a second and subsequent columns represent high-frequency components and low-frequency components generated in the course of vertical lifting operations, respectively. Hatched circles and squares from among the circles and squares represent high-frequency components and low-frequency components as a result of vertical lifting operation, respectively.

The left portion of FIG. 11 is described first. FIG. 11 illustrates in the left portion thereof the vertical lifting operation performed on coefficients on three lines at line number 4 through 6 in a vertical direction.

Coefficients at four lines of line number 0 through line number 4 are used to determine a first high-frequency component in step A3 of the vertical lifting operation and a first low-frequency component in step A4 of the vertical lifting operation.

Three coefficients enclosed in a heavy-lined ellipse and coefficients at two lines of circled line numbers 5 and 6 are used to determine a second high-frequency component and a second low-frequency component. A coefficient at a circled line number 4 is also used to calculate a coefficient labeled P1 in step A2.

The three coefficients enclosed in the heave-lined ellipse are parts of the coefficients generated in the course of the vertical lifting operation for the first high-frequency component and low-frequency component (first vertical lifting operation).

More specifically, the coefficients at the three lines of the circled line numbers 4 through 6 are input to determine the second high-frequency and low-frequency coefficients. The three coefficients enclosed in the heavy-lined ellipse generated in the course of the first horizontal lifting operation are stored on the intermediate calculation buffer 24 as intermediate calculation coefficients.

The vertical lifting operation is thus performed on the three coefficients enclosed in the heavy-lined ellipse stored on the intermediate calculation buffer 24 in the first vertical lifting operation and the coefficients at the three lines of line numbers 4 through 6 read and input from the buffer of the corresponding level. Four coefficients enclosed in a broken-heavy-lined ellipse including the second high-frequency and low-frequency components are thus obtained. From among the four coefficients, three coefficients enclosed in a dot-and-dash-chained ellipse are coefficients used to determines third high-frequency and low-frequency components and are thus stored onto the intermediate calculation buffer 24.

FIG. 11 illustrates in the right portion thereof the vertical lifting operation performed when coefficients at two lines are additionally read subsequent to reading of the coefficient at line number 6, i.e., when coefficients at three lines of line numbers 6 through 8 in the vertical direction are input.

Three coefficients enclosed in a heavy-lined ellipse and coefficients at two lines of circled line numbers 7 and 8 are used to determine the third high-frequency and low-frequency components in a manner similar to the determination of the second high-frequency component and low-frequency component. A coefficient at the circled line number 6 is also used to calculate a coefficient labeled P2 in step A2.

Three coefficients enclosed in the heavy-lined ellipse in the right portion of FIG. 11 and also enclosed in the dot-and-dash-chained ellipse in the left portion of FIG. 11 are stored onto the intermediate calculation buffer 24 in the course of the second vertical lifting operation.

The vertical lifting operation is performed on the three coefficients enclosed in the heavy-lined ellipse stored in the second vertical lifting operation and the coefficients at the three lines of line numbers 6 through 8 read and input from the buffer of the corresponding level. Four coefficients containing the third high-frequency and low-frequency coefficients (enclosed in a broken-heavy-lined ellipse) are obtained. From among the four coefficients, three coefficients enclosed in a dot-and-dash-chained ellipse are used to determine fourth high-frequency and low-frequency components and are thus stored onto the intermediate calculation buffer 24.

The coefficients at the three columns are input while the three coefficients in intermediate calculation are stored. The vertical lifting operation is performed to the bottom line on the screen. The analysis filtering operation in the vertical direction is thus completed.

An inverse wavelet transform of a synthesis filter is described below with reference to FIGS. 12 through 14. In the inverse wavelet transform, the coefficients wavelet transformed using the 9×7 filter lifting technique is decoded.

Figure 12:
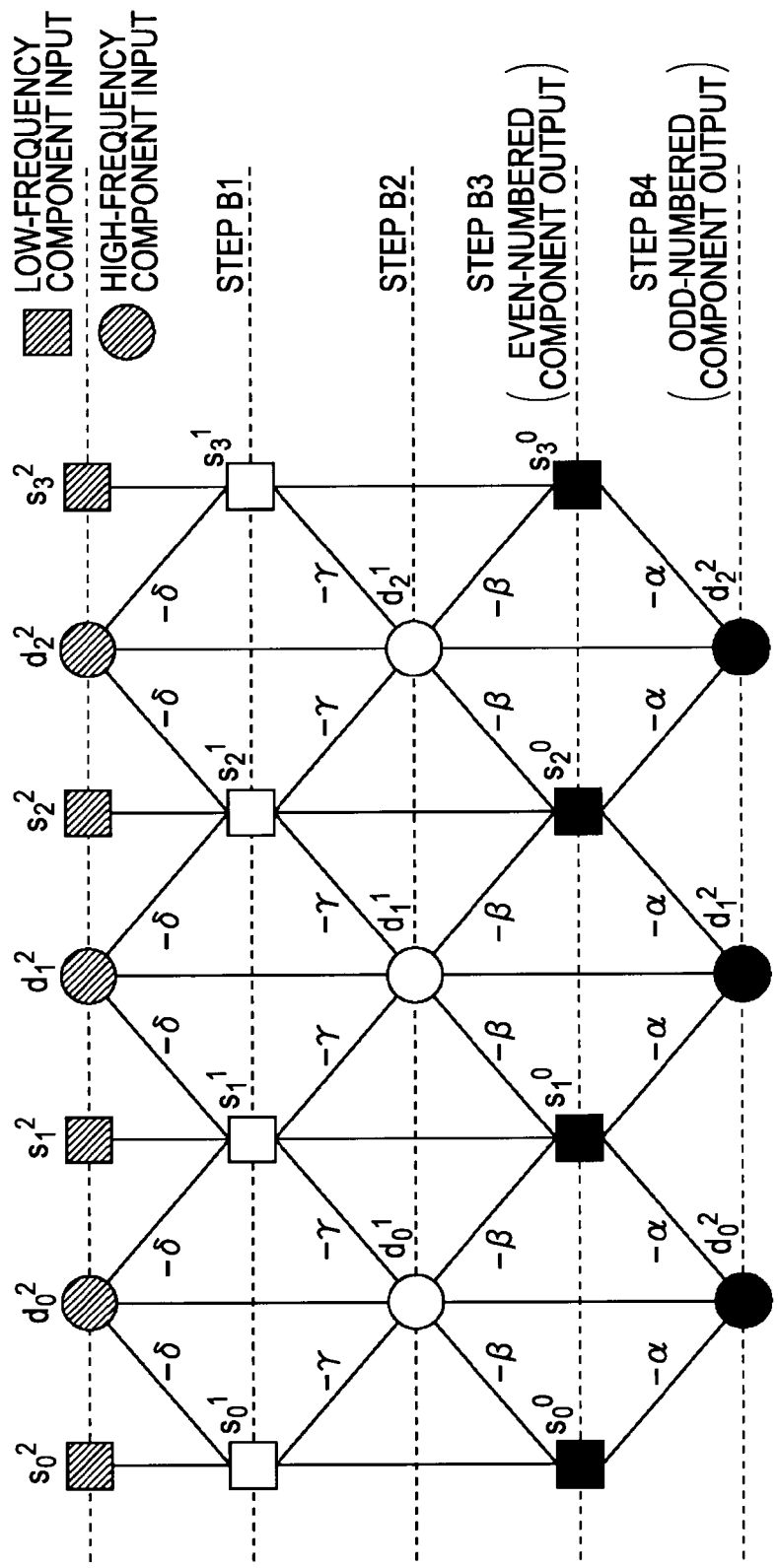
FIG. 12 illustrates another example of the lifting structure of the 9×7 filter.

FIG. 12 illustrates the lifting structure of the 9×7 filter. The synthesis filtering using the 9×7 filter lifting technique is described below.

In a first (top) row of FIG. 12, solid circles represent wavelet transformed coefficients of high-frequency component and solid squares represent wavelet transformed coefficients of low-frequency component. Second and third rows represent components (coefficients) generated in steps B1 and B2. A fourth row represents even-numbered component outputs generated in step A3 and a fifth row represents odd-numbered component outputs generated in step A4.

The synthesis filtering operation of applying the lifting technique to the 9×7 filter results an even-numbered component in step B3 and an odd-numbered component in step B4. The processes in steps B1-B4 are described by the following equations (11) through (14):

$$\text{Step } B1: s_i^1 = s_i^2 - \delta(d_{i-1}^2 + d_i^2) \quad (11)$$

$$\text{Step } B2: d_i^1 = d_i^2 - \gamma(s_i^1 + s_{i+1}^1) \quad (12)$$

$$\text{Step } B3: s_i^0 = s_i^1 - \beta(d_{i-1}^1 + d_i^1) \quad (13)$$

$$\text{Step } B4: d_i^0 = d_i^1 - \alpha(s_i^0 + s_{i+1}^0) \quad (14)$$

where $\alpha = -1.586134342$, $\beta = -0.05298011857$, $\gamma = 0.8829110755$, and $\delta = 0.4435068520$.

In the synthesis filtering operation with the lifting technique applied, processes in steps B1 and B2 are performed. After the even-numbered coefficient is generated in step B3, the odd-numbered coefficient is generated in step B4.

The vertical synthesis filtering operation and the horizontal synthesis filtering operation are described more in detail. The vertical synthesis filtering operation is described with reference to FIG. 13. FIG. 13 illustrates the vertical analysis filtering operation that is applied to the coefficient group in the vertical direction using the lifting structure of FIG. 12.

Figure 13:
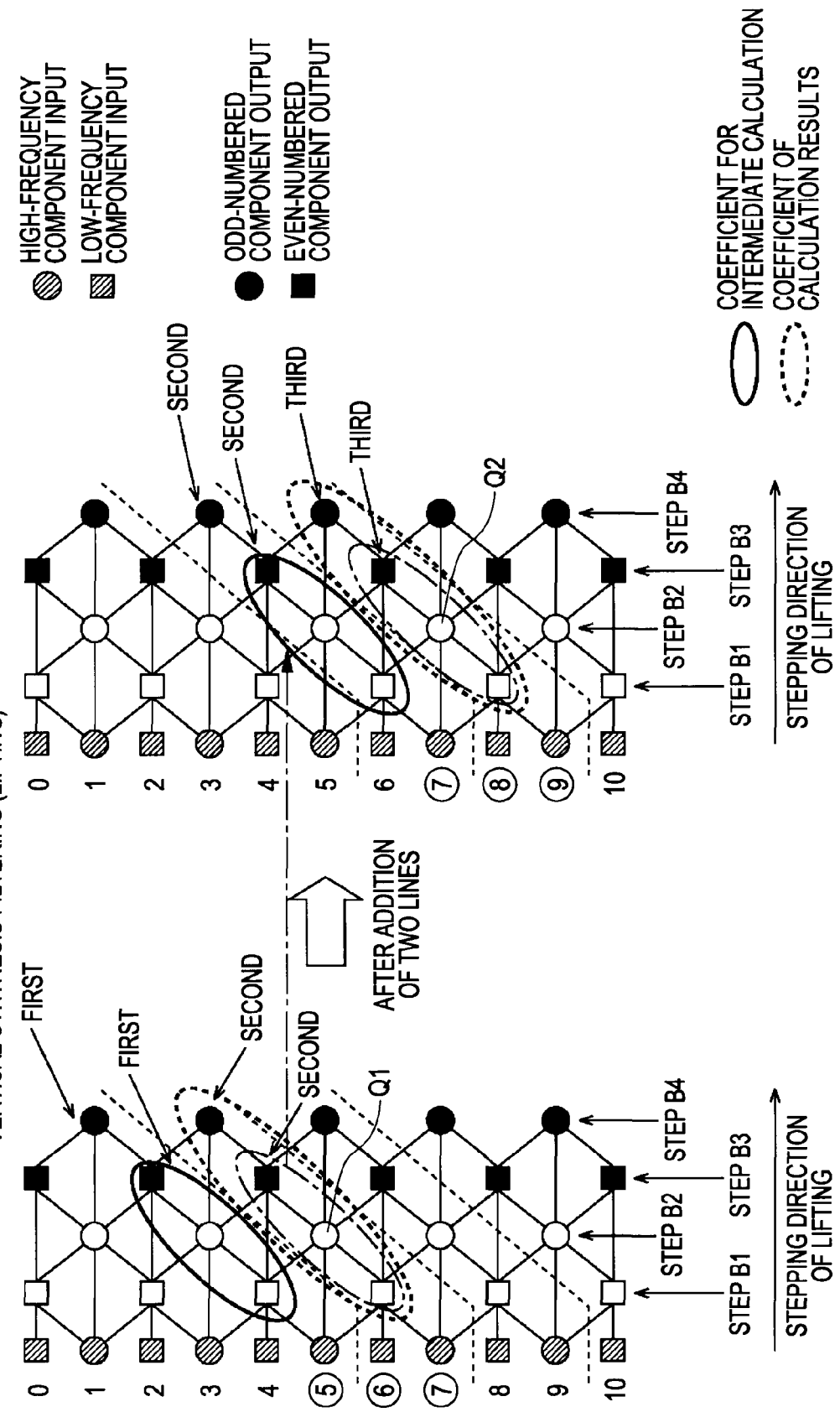
FIG. 13 illustrates the vertical analysis filtering operation performed on the coefficient group in the vertical direction using the lifting structure of FIG. 12.

As shown in FIG. 13, the high-frequency coefficients and the low-frequency coefficients are generated through the four steps of B1 through B4 discussed with reference to FIG. 12. The stepping direction of the lifting is rightward.

Numbers arranged in a vertical direction to the left of the respective coefficients indicate line numbers. Hatched circles and squares at a first column from the left represent high-frequency inputs and low-frequency inputs, respectively. Circles and squares on a second and subsequent columns represent high-frequency components and low-frequency components generated in the course of vertical lifting operations, respectively. From among the circles and squares on the second and subsequent columns, solid circles and squares represents odd-numbered and even-numbered coefficients, respectively.

The left portion of FIG. 13 is described first. FIG. 13 illustrates in the left portion thereof the vertical lifting operation performed on coefficients input on three lines at line number 4 through 6, from among others, in a vertical direction. An even-numbered coefficient on the top row is not combined with odd-numbered coefficients and the discussion thereof is omitted here.

Coefficients at six lines of line number 0 through line number 5 are used to determine a first even-numbered coefficient in step B3 of the vertical lifting operation and a first odd-numbered coefficient in step B4 of the vertical lifting operation.

Three coefficients enclosed in a heavy-lined ellipse and coefficients at two lines of circled line numbers 6 and 7 are used to determine second even-numbered and odd-numbered coefficients. A coefficient at a circled line number 5 is also used to calculate a coefficient labeled Q1 in step B2.

The three coefficients enclosed in the heave-lined ellipse are parts of the coefficients generated in the course of the vertical lifting operation for the first even-numbered and odd-numbered coefficients (first vertical lifting operation).

The vertical lifting operation is thus performed on the three coefficients enclosed in the heavy-lined ellipse calculated in the first vertical lifting operation and the coefficients at the three lines of line numbers 5 through 7. Four coefficients enclosed in a broken-heavy-lined ellipse including second even-numbered and odd-numbered coefficients are thus obtained.

FIG. 13 illustrates in the right portion thereof the vertical lifting operation performed when coefficients at two lines are additionally read subsequent to reading of the coefficient at line number 7, i.e., when coefficients at three lines of line numbers 7 through 9 in the vertical direction are input.

Three coefficients enclosed in a heavy-lined ellipse and coefficients at two lines of circled line numbers 8 and 9 are used to determine third even-numbered and odd-numbered coefficients in a manner similar to the determination of the second even-numbered and odd-numbered coefficients. A coefficient at a circled line number 7 is also used to calculate a coefficient labeled Q2 in step B2.

The vertical lifting operation is performed on the three coefficients enclosed in the heavy-lined ellipse generated in the second vertical lifting operation and the coefficients at the three lines of line numbers 7 through 9. Four coefficients containing the third high-frequency and low-frequency coefficients (enclosed in a broken-heavy-lined ellipse) are obtained.

The coefficients at the three lines are input while the three coefficients in intermediate calculation are stored. The vertical lifting operation is performed to the bottom on the screen. The analysis filtering operation in the vertical direction is thus completed.

The horizontal synthesis filtering operation is specifically discussed below. FIG. 14 illustrates the horizontal analysis filtering operation that is applied to the coefficient group in the horizontal direction using the lifting structure of FIG. 12.

Figure 14:
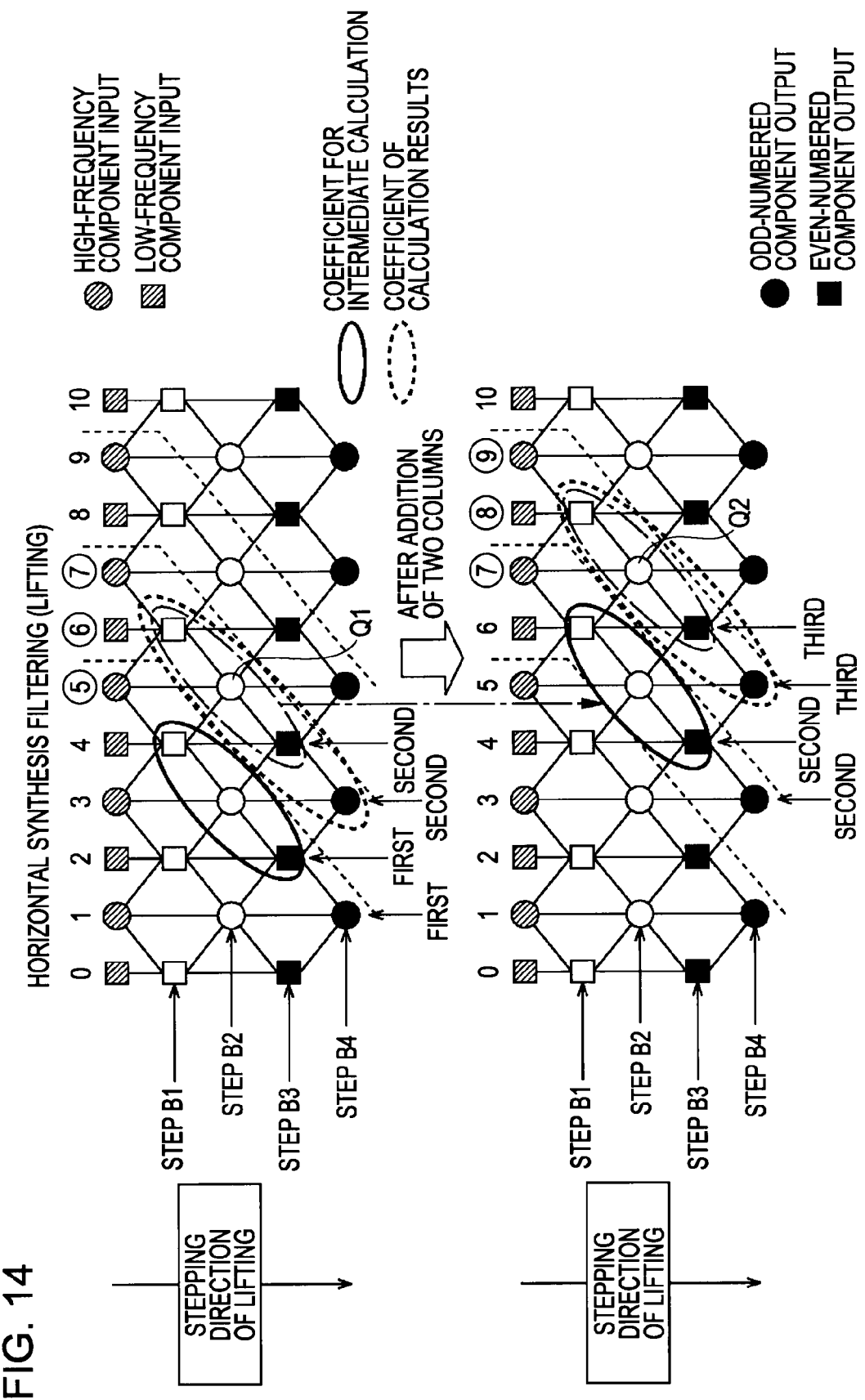
FIG. 14 illustrates the horizontal analysis filtering operation performed on the coefficient group in the horizontal direction using the lifting structure of FIG. 12.

As shown in FIG. 14, the input horizontal coefficients have undergone the processes in the four steps (steps B1-B4) described with reference to FIG. 12. The even-numbered and odd-numbered coefficients are thus generated. The direction of step of the lifting process is downward from top to bottom.

Numbers horizontally placed above the coefficients represent respective column numbers. Hatched circles and squares at the first row represent input high-frequency coefficients and low-frequency coefficients, respectively. Circles and squares at the second and lower rows represent high-frequency coefficients and low-frequency coefficients, respectively, generated in lifting operation. Solid circles and squares represent odd-numbered coefficients and even-numbered coefficients, respectively, as lifting results.

The lifting operation is described from top to bottom rows. At the top row of FIG. 14, three coefficients at column numbers 5 through 7 are input. A horizontal lifting operation is now performed. The leftmost even-numbered coefficient is not combined with odd-numbered coefficients and the discussion thereof is omitted here.

Coefficients at column numbers 0 through 5 are used to determine a first even-numbered coefficient in step B3 of the horizontal lifting operation and a first odd-numbered coefficient in step B4 of the horizontal lifting operation.

Three coefficients enclosed in a heavy-lined ellipse and coefficients at two columns, namely, circled column numbers 6 and 7 are used to determine second even-numbered and odd-numbered coefficients. To calculate a coefficient labeled Q1 in step B2, a coefficient at circled column number 5 is used.

The three coefficients enclosed in the heavy-lined ellipse are parts of the coefficients generated in the course of the horizontal lifting operation to determine the first even-numbered and odd-numbered coefficients (hereinafter referred to as a first horizontal lifting operation).

The horizontal lifting operation is performed on the three coefficients enclosed in the heavy-lined ellipse generated in the first horizontal lifting operation and the coefficients at three columns, namely, at column numbers 5 through 7. In the course of and at the end of the horizontal lifting operation, four coefficients including the second even-numbered and odd-numbered coefficients are generated (as represented by a broken-heavy-lined ellipse).

FIG. 14 illustrates in the lower portion thereof a horizontal lifting operation that is performed when coefficients at two columns in a horizontal direction are additionally input subsequent to inputting of the coefficient at column number 7. More specifically, the horizontal lifting operation is performed with three coefficients at column numbers 7 through 9 in a horizontal direction input.

Three coefficients enclosed in a heave-lined ellipse and coefficients at two columns of circled column numbers 8 and 9 are used to determine third even-numbered and odd-numbered coefficients in a similar manner as in the determination of the second even-numbered and odd-numbered coefficients. A coefficient at a circled column number 7 is also used to determine a coefficient labeled Q2 in step B2.

The horizontal lifting operation is performed on the three coefficients enclosed in the heavy-lined ellipse generated in the second horizontal lifting operation and the input coefficients at the three columns of column numbers 7 through 9. This horizontal lifting operation results in four coefficients including third even-numbered and odd-numbered coefficients (as enclosed in a broken-heavy-lined ellipse).

The coefficients at the three columns are input while the three coefficients in intermediate calculation are stored. The horizontal lifting operation is performed to the rightmost column on the screen. The analysis filtering operation in the horizontal direction is thus completed.

In the encoder 10, the intermediate calculation buffer 24 and the coefficient rearranging buffer 25 are preferably arranged in a high-speed accessing memory such as a local storage in a processor in order to control latency caused in memory access and to achieve high-speed process. The processor may implement the wavelet transformer 21, the coefficient rearranger 22 and the entropy encoder 23. Depending on the data size of input image data, the type of the filter, the segmentation level, and the memory capacity of the local storage, the coefficient data can overflow from the local storage and an external memory may be used.

The number of accesses and required memory capacity of each of the intermediate calculation buffer 24 and the coefficient rearranging buffer 25 are considered.

FIGS. 15 and 16 illustrate access counts per pixel of the input image data to the intermediate calculation buffer 24 and the coefficient rearranging buffer 25 in the encoding process of the encoder 10. FIG. 15 lists the access count with the 9×7 filter used for the wavelet transform and FIG. 16 lists the access count with the 5×3 filter used for the wavelet transform. In the access counts listed in FIGS. 15 and 16, a set of read and write cycle to each buffer is counted as one.

One access is performed on the intermediate calculation buffer 24 for each pixel of the low-frequency subband (LL) at each segmentation level in each lifting step. The access count to the intermediate calculation buffer 24 for each pixel of the input image data is calculated in accordance with the following equation (15):

$$\text{Access count} = \left\{ \sum_{i=1}^{n} 0.25^{i-1} \right\} \times \text{Lifting step per one segmentation} \quad (15)$$

where n represents a segmentation level in the wavelet transform.

As shown in FIG. 15, the wavelet transform is performed using the 9×7 filter. The 9×7 filter has lifting steps of 4 per segmentation level. The access count to the intermediate calculation buffer 24 per pixel of the input image data is 4 at the segmentation level of 1 in the wavelet transform, 5 at a segmentation level of 2, 5.25 at a segmentation level of 3 and 5.31 at a segmentation level of 4.

As shown in FIG. 16, the wavelet transform is performed using the 5×3 filter. The 5×3 filter has lifting steps of 2 per segmentation level. The access count to the intermediate calculation buffer 24 per pixel of the input image data is 2 at the segmentation level of 1 in the wavelet transform, 2.5 at a segmentation level of 2, 2.62 at a segmentation level of 3 and 2.65 at a segmentation level of 4.

The access count to the coefficient rearranging buffer 25 is equal to the number of units of coefficient data generated in the analysis filtering process excluding the number of units of coefficient data generated in the analysis filtering process at the final level. The access count to the coefficient rearranging buffer 25 is thus expressed in the following equation (16):

$$\text{Access count} = 1 - 0.25^{n-1} \quad (16)$$

where n is a segmentation level of the wavelet transform.

In both cases of using the 9×7 filter and the 5×3 filter as shown in FIGS. 15 and 16, the access count to the coefficient rearranging buffer 25 per pixel of the input image data is 0 at a segmentation level of 1, 0.75 at a segmentation level of 2, 0.938 at a segmentation level of 3 and 0.984 at a segmentation level of 4.

FIGS. 17 and 18 illustrate memory capacities of the intermediate calculation buffer 24 and the coefficient rearranging buffer 25 required in the encoding process of the encoder 10. The memory capacity is listed with reference to the lines in the horizontal direction of the input image data. FIG. 17 lists the memory capacity of each buffer with the 9×7 filter used in the wavelet transform. FIG. 18 lists the memory capacity of each buffer with the 5×3 filter used in the wavelet transform.

If the 9×7 filter is used, the memory capacity of the intermediate calculation buffer 24 needs 6 lines with respect to the lines in the horizontal direction of the low-frequency subbands per low-frequency subband (LL) at each segmentation level. If the 5×3 filter is used, the memory capacity of the intermediate calculation buffer 24 needs 4 lines with respect to the lines in the horizontal direction of the low-frequency subbands per low-frequency subband (LL) at each segmentation level. The ratio of the size of the lines in the horizontal direction of the input image data to the size of the lines in the horizontal direction of the low-frequency subband at a segmentation level k is $\frac{1}{2}^k$. The required capacity of the intermediate calculation buffer 24 with reference to the lines in the horizontal direction of the input image data is determined in accordance with the following equation (17):

$$\text{Required capacity} = \begin{cases} \left\{\sum_{i=1}^{n} 0.5^{i-1}\right\} \times 6 \text{ lines}: 9 \times 7 \text{ filter} \\ \left\{\sum_{i=1}^{n} 0.5^{i-1}\right\} \times 4 \text{ lines}: 5 \times 3 \text{ filter} \end{cases} \quad (17)$$

where n is segmentation level of the wavelet transform.

If the wavelet transform is performed using the 9×7 filter as shown in FIG. 17, the required memory capacity of the intermediate calculation buffer 24 is 6 lines in the horizontal direction of the input image data at a segmentation level of 1, 9 lines at a segmentation level of 2, 10.5 lines at a segmentation level of 3, and 11.5 lines at a segmentation level of 4.

If the wavelet transform is performed using the 9×7 filter as shown in FIG. 18, the required memory capacity of the intermediate calculation buffer 24 is 4 lines in the horizontal direction of the input image data at a segmentation level of 1, 6 lines at a segmentation level of 2, 7 lines at a segmentation level of 3, and 7.5 lines at a segmentation level of 4.

The memory capacity s(k) of the coefficient rearranging buffer 25 required per subband, other than the low-frequency subband, at a segmentation level k is determined in accordance with the following equation (18) with respect to the lines in the horizontal direction of the subbands:

$$s(k) = \begin{cases} s(k+1) \times 2 + 6 : 9 \times 7 \text{ filter} \\ s(k+1) \times 2 + 2 : 5 \times 3 \text{ filter} \end{cases} \quad (18)$$

where s(n)=1 and n is a segmentation level of the wavelet transform.

Since the ratio of the size of the lines in the horizontal of the input image data to the size of the lines in the horizontal direction of the low-frequency subband at a segmentation level k is $\frac{1}{2}^k$, the required memory capacity of the coefficient rearranging buffer 25 at a segmentation level of k is determined using the following equation (19) with respect to the lines in the horizontal direction of the input image data:

Required memory capacity=$s(k) \times \frac{1}{2}^k \times$ number of subbands other than low-frequency subbands $$= s(k) \times \frac{1}{2}^k \times 3 \quad (19)$$

The coefficient data generated in the analysis filtering operation at the final level is not stored onto the coefficient rearranging buffer 25. The required memory capacity of the coefficient rearranging buffer 25 is determined by summing equation (19) from k=1 through n−1.

As shown in FIG. 17, the required memory capacity of the coefficient rearranging buffer 25 with the 9×7 filter used for the wavelet transform is 0 line in the horizontal direction of the input image data at a segmentation level of 1, 12 lines at a segmentation level of 2, 39 lines at a segmentation level of 3, and 94.5 lines at a segmentation level of 4.

As shown in FIG. 18, the required memory capacity of the coefficient rearranging buffer 25 with the 5×3 filter used for the wavelet transform is 0 line in the horizontal direction of the input image data at a segmentation level of 1, 6 lines at a segmentation level of 2, 18 lines at a segmentation level of 3, and 42 lines at a segmentation level of 4.

The intermediate calculation buffer 24 is larger in access count than the coefficient rearranging buffer 25 and smaller in required memory capacity than the coefficient rearranging buffer 25 except with a segmentation level of 1. The sum of the required memory capacities of the intermediate calculation buffer 24 and the coefficient rearranging buffer 25 may exceed the memory capacity permitted in the local storage. In such a case, the intermediate calculation buffer 24 may be left in the local storage with a higher priority with the coefficient rearranging buffer 25 arranged in an external memory. This arrangement controls a drop in process speed and memory capacity reduction effect is great.

Figure 19:
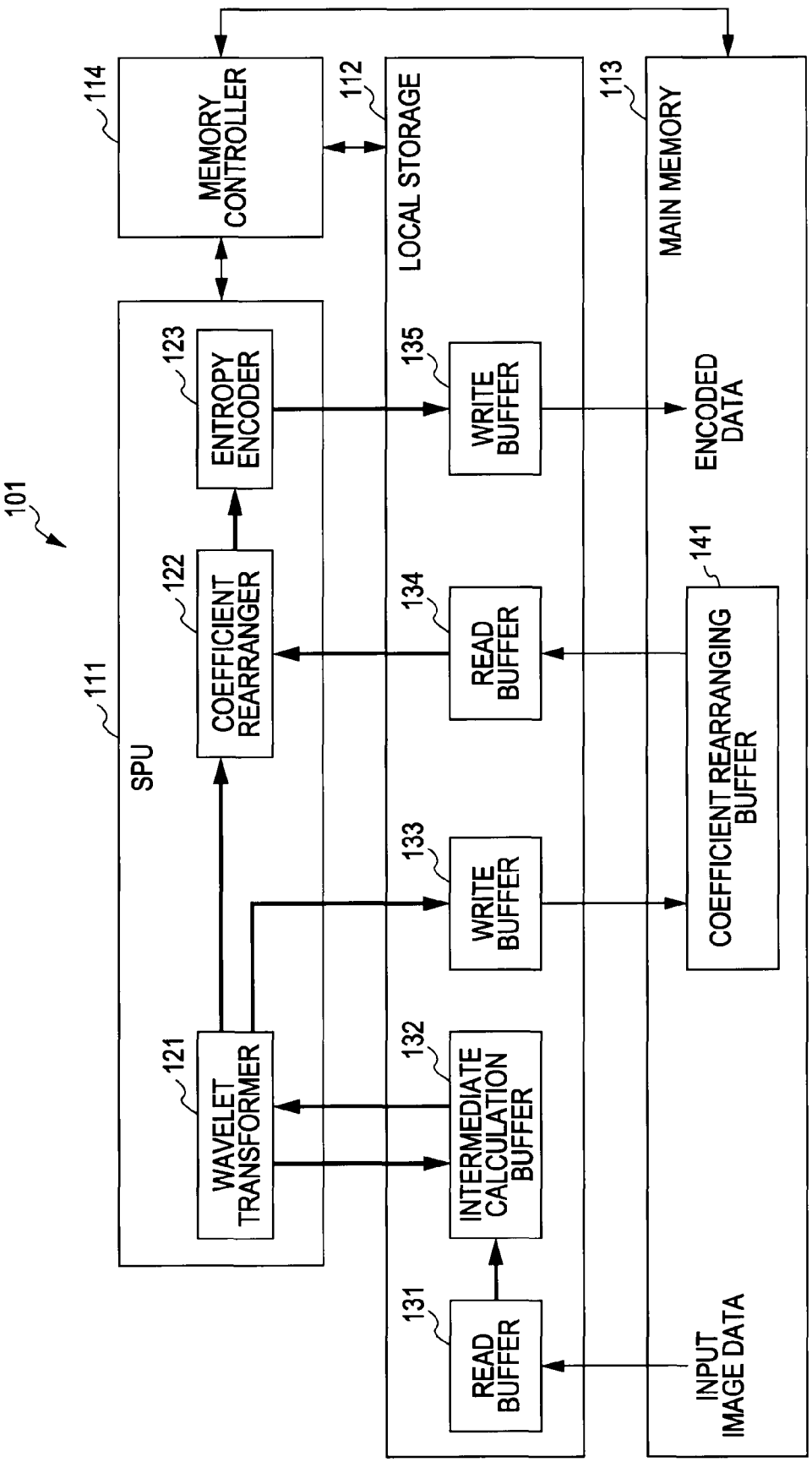
FIG. 19 is a block diagram illustrating an encoding apparatus in accordance with a first embodiment of the present invention.

FIG. 19 is a block diagram illustrating an encoding apparatus 101 in accordance with one embodiment of the present invention. In the encoding apparatus 101, the encoder 10 of FIG. 1 is incorporated with an intermediate calculation buffer arranged in a local storage and with a coefficient rearranging buffer arranged in an external memory. As shown in FIG. 19, elements corresponding to those illustrated in FIG. 1 are designed with reference numerals with the lower two digit numbers thereof equal to the corresponding reference numerals of FIG. 1. The description of the elements having the same functions as in FIG. 1 are not repeated.

The encoding apparatus 101 includes a synergistic processing unit (SPU) 111, a local storage 112, a main memory 113, and a memory controller 114.

The SPU 111 performs a predetermined program. The SPU 111 thus performs the functions of a wavelet transformer 121 corresponding to the wavelet transformer 21 of FIG. 1, a coefficient rearranger 122 corresponding to the coefficient rearranger 22 of FIG. 1, and an entropy encoder 123 corresponding to the entropy encoder 23 of FIG. 1.

A local storage 112 is composed of a cache memory contained in the same hardware package of the SPU 111. The SPU 111 can have access to the local storage 112 at a higher speed than to the main memory 113.

The local storage 112 includes a read buffer 131, an intermediate calculation buffer 132 corresponding to the intermediate calculation buffer 24 of FIG. 1, a write buffer 133, a read buffer 134, and a write buffer 135. Each of the read buffer 131, the write buffer 133, the read buffer 134, and the write buffer 135 may be a first-in, first-out (FIFO) buffer or a simple double buffer.

The main memory 113 includes a random-access memory (RAM). A coefficient rearranging buffer 141 may be arranged in the main memory 113. The coefficient rearranging buffer 141 of a FIFO type has a ring-type buffer with an address subsequent to an end address of a buffer being a leading address.

In response to an instruction from each element of the SPU 111, the memory controller 114 controls a data transfer between the local storage 112 and the main memory 113 independently of or in parallel with the process of the SPU 111. The memory controller 114 notifies each element of the SPU 111 of the status of the main memory 113.

Data is transferred at a speed higher within the SPU 111 or between the SPU 111 and the local storage 112 than between the local storage 112 and the main memory 113. Latency is shorter in the data transfer within the SPU 111 or between the SPU 111 and the local storage 112 than in the data transfer between the local storage 112 and the main memory 113. Data transfer between the local storage 112 and the main memory 113 is performed less stably at a lower speed and with a longer latency than within the SPU 111 or between the SPU 111 and the local storage 112. To indicate the above features, arrow-headed lines connecting elements within the SPU 111 and connecting the SPU 111 to the local storage 112 are drawn heavier than arrow-headed lines connecting the local storage 112 to the main memory 113.

The flow of the encoding process performed by the encoding apparatus 101 is described with reference to a flowchart of FIG. 20.

In step S1, the wavelet transformer 121 sets a number A of a target precinct to an initial value in step S1. The number A is typically set to "1."

In step S2, the wavelet transformer 121 acquires image data of lines of the number required to generate one line at A-th line from the top in the lowest frequency subband (i.e., one precinct). More specifically, the wavelet transformer 121 requests the memory controller 114 to transfer the line of the input image data at the first precinct from the main memory 113 to the intermediate calculation buffer 132. The memory controller 114 transfers the line of the requested input image data from the main memory 113 to the intermediate calculation buffer 132. The wavelet transformer 121 reads, as necessary, the input image data transferred from the intermediate calculation buffer 132.

The wavelet transformer 121 requests the memory controller 114 to transfer the input image data of a second precinct in whole or in part from the main memory 113 to the read buffer 131. The memory controller 114 transfers the requested line of the input image data from the main memory 113 to the read buffer 131. The line of the input image data needed in the processing of the next precinct is read in a prior read operation from the main memory 113 to the read buffer 131.

In the processing of the second and subsequent precincts, the line of the input image data to be processed is transferred from the read buffer 131 to the intermediate calculation buffer 132. The line of the input image data needed in the processing of the next precinct is also transferred from the main memory 113 to the read buffer 131 in the order of lines.

In step S3, the wavelet transformer 121 performs a vertical analysis filtering operation to the acquired image data arranged in a vertical direction on the screen.

In step S4, the wavelet transformer 121 performs a horizontal analysis filtering operation to the image data arranged in a horizontal direction on the screen.

In step S5, the wavelet transformer 121 determines whether the analysis filtering operation has reached the final level. If it is determined in step S5 that the final level has not been reached, processing proceeds to step S6.

In step S6, the wavelet transformer 121 writes the coefficient data of high-frequency subbands on the buffer in the order of generation. More specifically, the wavelet transformer 121 controls the memory controller 114 in order to write onto the write buffer 133 the coefficient data of high-frequency subbands (HL, LH, and HH) of the current segmentation level and in order to write the coefficient data already written on the write buffer 133 onto the coefficient rearranging buffer 141 subsequent to the coefficient data already written thereon. The memory controller 114 controls data writing so that the coefficient data already written on the write buffer 133 is written in the written order in succession to the coefficient data already written on the coefficient rearranging buffer 141.

The coefficient data is thus rearranged in the order of generation and written onto the coefficient rearranging buffer 141. A waiting time of the SPU 111 caused by the data transfer from the write buffer 133 to the coefficient rearranging buffer 141 is thus shortened.

The memory controller 114 supplies, to the coefficient rearranger 122, information indicating a storage position of the coefficient data stored on the coefficient rearranging buffer 141. The coefficient rearranger 122 stores the storage position of the coefficient data. The memory controller 114 deletes from the write buffer 133 the coefficient data that has transferred to the coefficient rearranging buffer 141.

Processing returns to step S3. Steps S3 through S6 are cycled through until the analysis filtering operation reaches the final level in step S5. More specifically, the analysis filtering operation is repeated at the current segmentation level and the coefficient data of the resulting subbands is written on the coefficient rearranging buffer 141 in the order of generation.

If it is determined in step S5 that the analysis filtering operation has reached the final level, the wavelet transformer 121 proceeds to step S7.

In step S7, the wavelet transformer 121 supplies the coefficient data at the final level. More specifically, the wavelet transformer 121 supplies the coefficient data generated in the analysis filtering operation at the final level directly to the coefficient rearranger 122 without writing that coefficient data onto the coefficient rearranging buffer 141. The coefficient rearranger 122 supplies the acquired coefficient data directly to the entropy encoder 123. In this way, the memory capacity of the coefficient rearranging buffer 141 and the access count to the coefficient rearranging buffer 141 are reduced.

High-frequency coefficient data of the coefficient data at the final level is used in a subsequent precinct and is thus stored onto the intermediate calculation buffer 132.

In step S8, the entropy encoder 123 entropy encodes the supplied coefficient data on a line-by-line basis.

In step S9, the entropy encoder 123 outputs the encoded data. More specifically, the entropy encoder 123 requests the memory controller 114 to write the encoded data onto the write buffer 135 and transfer the encoded data to the main memory 113. The memory controller 114 transfers the encoded data written on the write buffer 135 to the main memory 113. The encoded data transferred to the main memory 113 is transmitted to a decoder via a communication device (not shown) or the like.

In step S10, the entropy encoder 123 determines whether the encoding of the A-th precinct has been completed. If it is determined in step S10 that the entropy encoding of the coefficient data used in an A-th synthesis operation has not been completed, the entropy encoder 123 determines that the encoding of the A-th precinct has not been completed and then proceeds to step S11.

In step S11, the coefficient rearranger 122 reads the coefficient data to be processed next. The coefficient rearranger 122 determines the storage position of the coefficient data, to be processed in the synthesis operation subsequent to the immediately preceding encoded coefficient data, on the coefficient rearranging buffer 141. The coefficient rearranger 122 requests the memory controller 114 to transfer the coefficient data stored at the determined position from the coefficient rearranging buffer 141 to the read buffer 134. The memory controller 114 transfers the requested coefficient data from the coefficient rearranging buffer 141 to the read buffer 134 and then deletes the corresponding data from the coefficient rearranging buffer 141. The coefficient rearranger 122 reads the coefficient data stored on the read buffer 134 and then supplies the read coefficient data to the entropy encoder 123.

The coefficient rearranger 122 determines, on the coefficient rearranging buffer 141, the position of the coefficient data to be processed in the synthesis operation subsequent to the coefficient data currently read and requests the memory controller 114 to transfer the coefficient data stored at the determined position from the coefficient rearranging buffer 141 to the read buffer 134. The memory controller 114 transfers the requested coefficient data from the coefficient rearranging buffer 141 to the read buffer 134 and deletes the coefficient data corresponding to the transferred coefficient data from the coefficient rearranging buffer 141. More specifically, the coefficient data to be entropy encoded next may be in a prior read operation read from the coefficient rearranging buffer 141 to the read buffer 134.

In step S11, the coefficient rearranger 122 reads from the read buffer 134 the coefficient data to be entropy encoded next and reads in a prior read operation the coefficient data to be entropy encoded in succession to the next coefficient data from the coefficient rearranging buffer 141 into the read buffer 134. This process shortens the waiting time of the SPU 111 caused by the data transfer from the coefficient rearranging buffer 141 to the read buffer 134.

Steps S8 through S11 are repeated until it is determined in step S10 that the encoding of the A-th precinct has been completed. The coefficient data is read from the coefficient rearranging buffer 141 in the order of the later synthesis operation, and entropy encoded. The resulting coefficient data is thus transmitted.

If it is determined in step S10 that the entropy encoding of all the coefficient data needed in the synthesis operation of the A-th precinct has been completed, the entropy encoder 123 determines that the A-th precinct has been encoded and proceeds to step S12.

In step S12, the wavelet transformer 121 increments the value of A by "1" and handles a next precinct as a target.

In step S13, the wavelet transformer 121 determines whether an unprocessed image input line is present in the target picture (frame or field). If it is determined in step S13 that an unprocessed image input line is present, processing returns to step S2. Steps S2 and subsequent steps are repeated on a new unprocessed precinct.

Steps S2 through S13 are repeated to encode each precinct. If it is determined in step S13 that no further unprocessed image input line is present, the encoding process on that picture is complete. The encoding process then newly starts on a next picture.

Coefficient rearrangement performed by the encoding apparatus 101 is described below with reference to FIGS. 21 through 24. In the coefficient rearrangement, the 5×3 filter performs the lifting filtering operation up to a segmentation level of 3.

Figure 21:
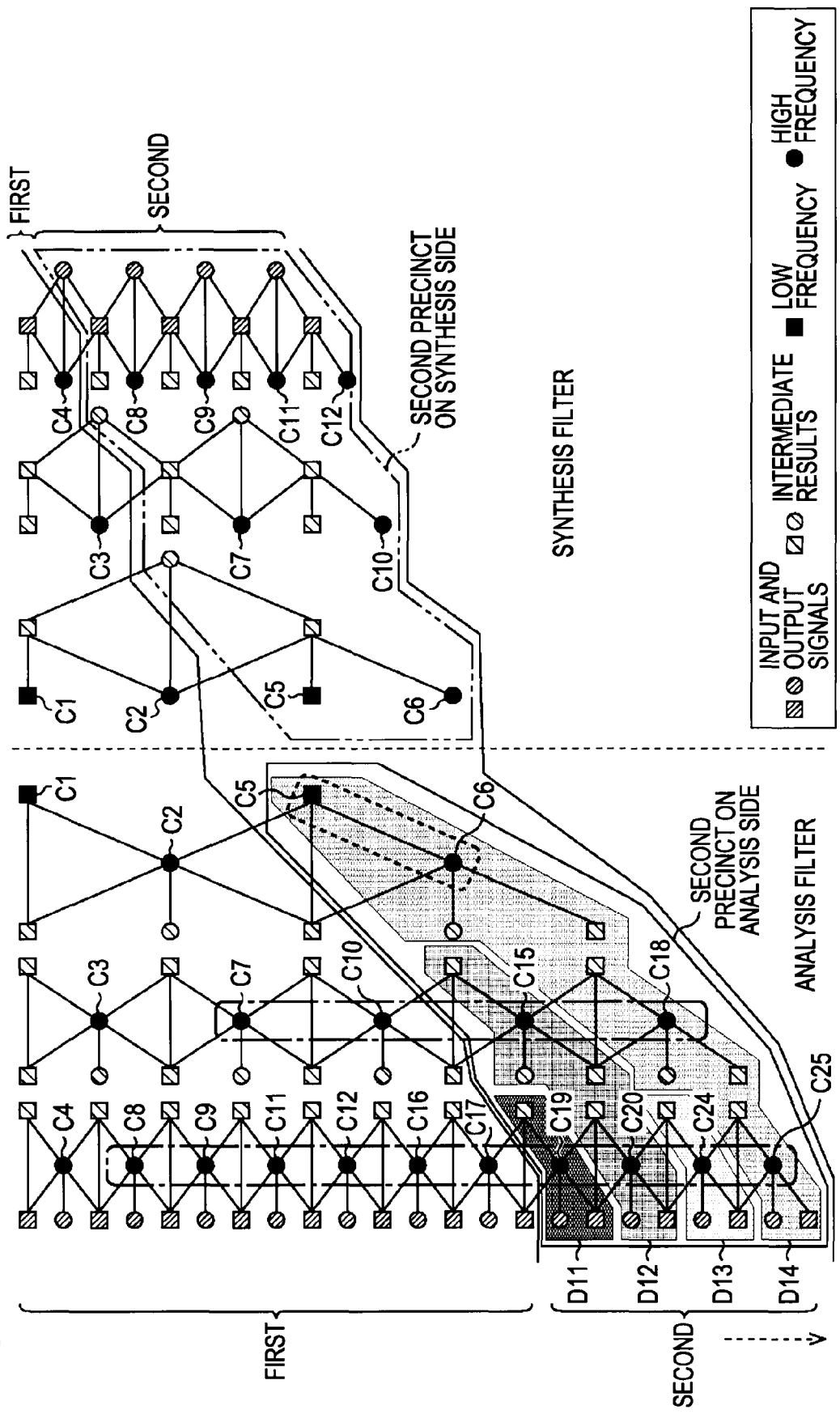
FIG. 21 diagrammatically illustrates a lifting filtering operation of the 5×3 filter performed to a segmentation level=3.
Figure 22:
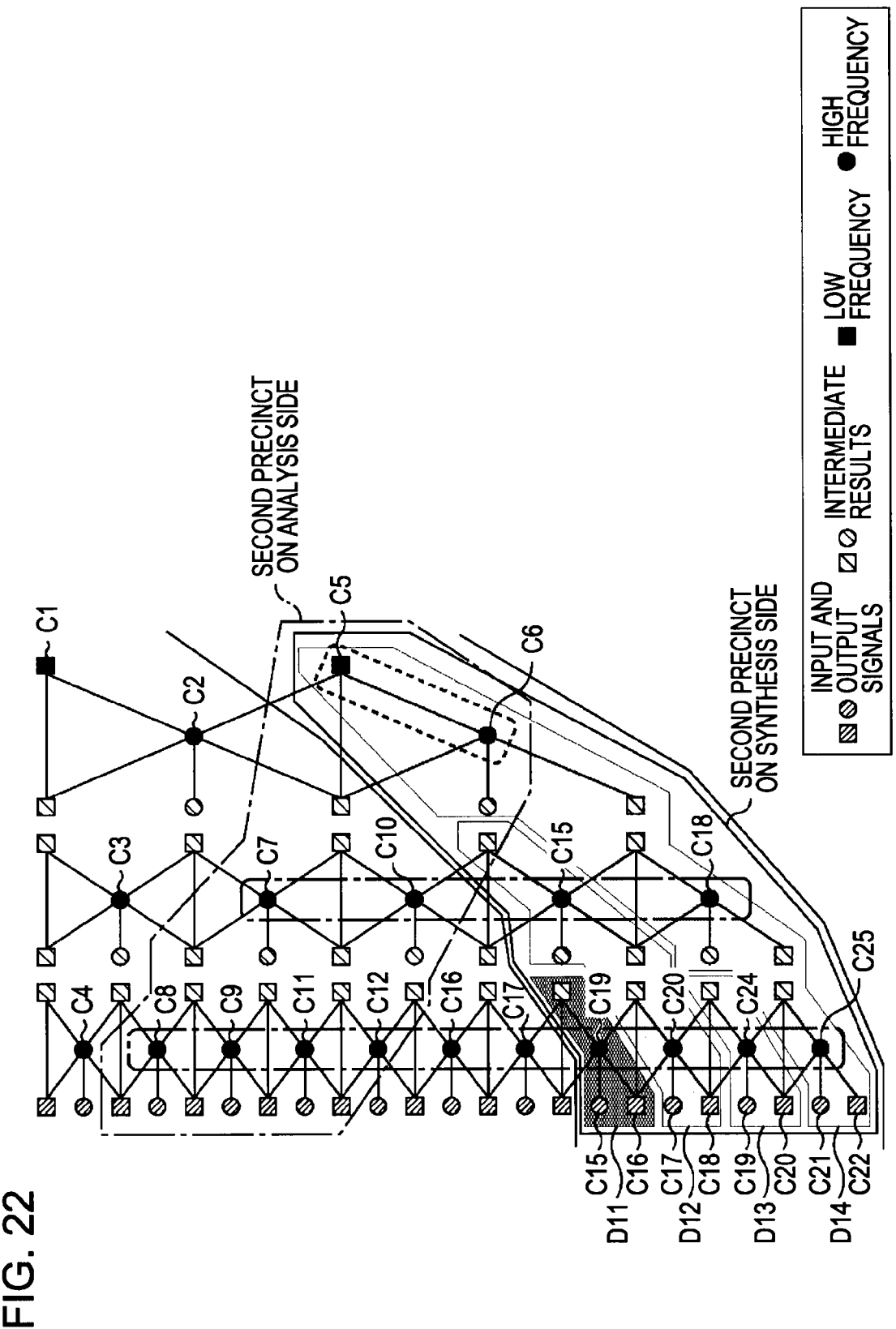
FIG. 22 illustrates the analysis filter illustrated on a left portion of FIG. 21 with a second precinct of a synthesis filter overlaid thereon.

FIG. 21 illustrates the lifting filtering operation with the 5×3 filter performed up to a segmentation level of 3 in a layout similar to FIG. 6. FIG. 22 illustrates the synthesis filter shown on the left portion with respect to a broken line in FIG. 21 with a second precinct in the synthesis filter overlaid thereon.

Unlike in FIG. 6, numbers labeling coefficients are shown in the order of processing in the synthesis process for simplicity of explanation in FIGS. 21 and 22. Actual image data is two-dimensional information. As FIG. 6, FIGS. 21 and 22 illustrate, for simplicity of explanation, the image data in one-dimensional representation on the premise that pixels are present behind the plane of the pages of FIGS. 21 and 22 in a direction perpendicular to the pages. The horizontal analysis filtering operation and the synthesis filtering operation are omitted in FIGS. 21 and 22.

Basic operations of FIGS. 21 and 22 remain the same as the analysis filtering operation at a segmentation level of 2 of FIG. 6. As shown in FIG. 21, the number of lines to obtain one line of coefficient data at the low-frequency subband at a segmentation level of 3 in the wavelet transform is 8 lines at a first precinct and 15 lines at second and subsequent precincts. In the output of the synthesis side, the required number of lines is 1 line for a first precinct and 8 lines for subsequent precincts.

The analysis filtering operation using the 5×3 filter lifting technique is performed to a segmentation level of 3. A first analysis filtering operation generates the coefficient data in the order of coefficient C4, coefficient C8, coefficient C9, coefficient C3, coefficient C11, coefficient C12, coefficient C7, coefficient C16, coefficient C17, coefficient C10, coefficient C2, and coefficient C1. A second analysis filtering operation generates the coefficient data in the order of coefficient C19, coefficient C20, coefficient C15, coefficient C24, coefficient C25, coefficient C18, coefficient C6, and coefficient C5. A first synthesis filtering operation processes the coefficient data in the order of coefficient C1, coefficient C2, coefficient C3, and coefficient C4. A second synthesis filtering operation processes the coefficient data in the order of coefficient C5, coefficient C6, coefficient C7, coefficient C8, coefficient C9, coefficient C10, coefficient C11, and coefficient C12.

The coefficient rearrangement of the coefficient data in the encoding process on the second precinct is described below.

Figure 23:
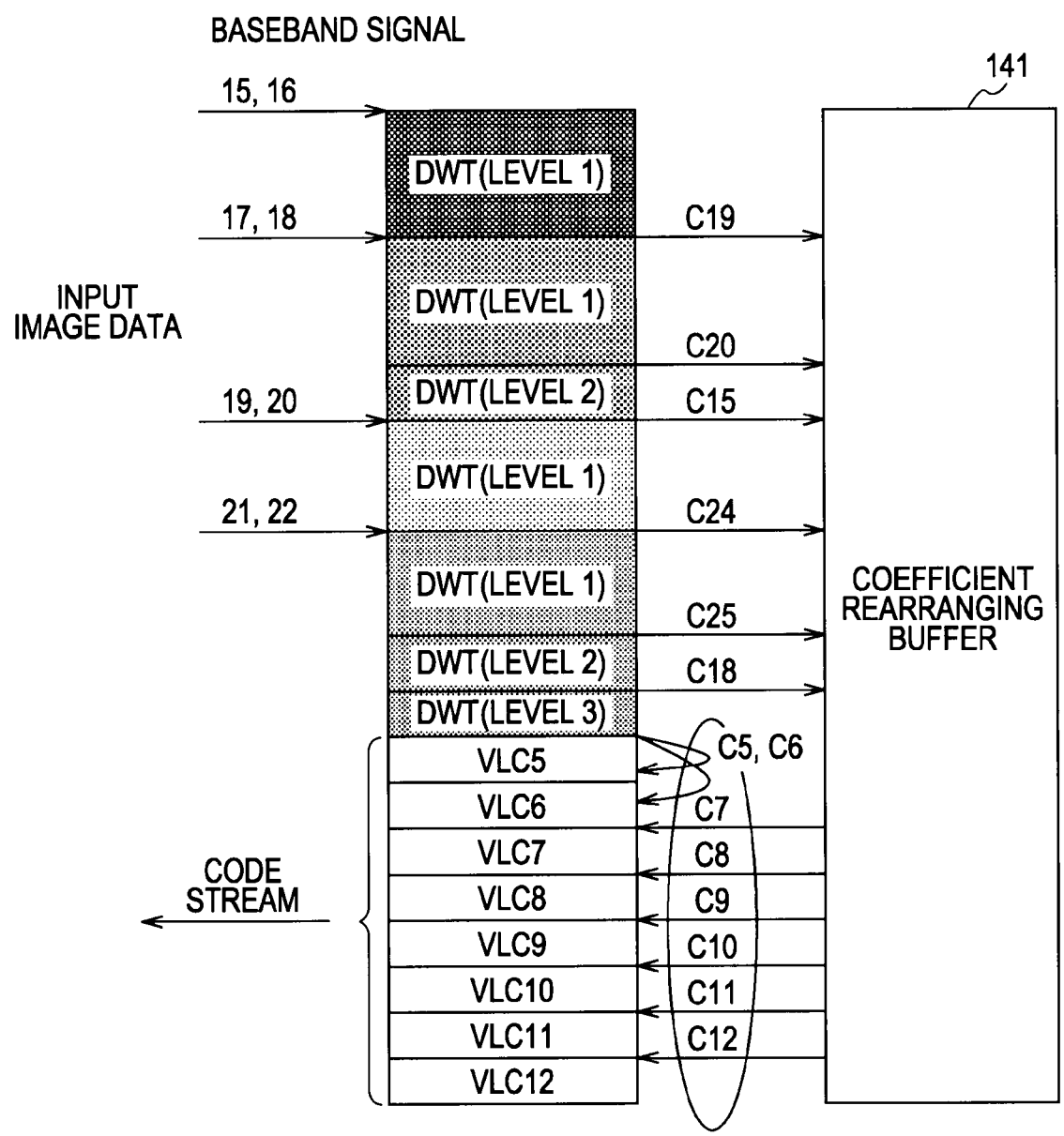
FIG. 23 illustrates an encoding process performed on the second precinct.

FIG. 23 illustrates the encoding process performed on the second precinct. Like in FIGS. 21 and 22, the discussion of the horizontal analysis filtering operation is omitted in FIG. 23 for simplicity of explanation.

In the encoding process on the second precinct as shown in FIG. 23, firstly, the analysis filtering operation (wavelet transform) is performed on an area D11 (FIG. 21) on the second precinct with 15th and 16th lines of the input image data input to the wavelet transformer 121. A coefficient C19 is generated and written onto the coefficient rearranging buffer 141.

Secondly, the analysis filtering operation at a segmentation level of 1 is performed on an area D12 with 17th and 18th lines of the input image data input to the wavelet transformer 121. A coefficient C20 is generated and written onto the coefficient rearranging buffer 141. The analysis filtering operation with a segmentation level of 2 is performed on the area D12, and a coefficient C15 is generated and written onto the coefficient rearranging buffer 141.

Thirdly, the analysis filtering operation with a segmentation level of 1 is performed on an area D13 with 19th and 20th lines of the input image data input to the wavelet transformer 121. A coefficient C24 is generated and written onto the coefficient rearranging buffer 141.

Fourthly, the analysis filtering operation with a segmentation level of 1 is performed on an area D14 with 21st and 22nd lines of the input image data input to the wavelet transformer 121. A coefficient C25 is generated and written onto the coefficient rearranging buffer 141. The analysis filtering operation with a segmentation level of 2 is performed on the area D14, and a coefficient C18 is generated and written onto the coefficient rearranging buffer 141. The analysis filtering operation with a segmentation level of 3 is performed on the area D14, and coefficients C5 and C6 are generated. The coefficients C5 and C6 are not written onto the coefficient rearranging buffer 141 but directly supplied to the entropy encoder 123 via the coefficient rearranger 122.

As shown in FIG. 23, rectangles labeled DWT are different in vertical height depending on the segmentation level. The number of pixels to be processed becomes different depending on the segmentation level. More specifically, the number of pixels at the segmentation level of 2 in a horizontal direction is half the number of pixels at a segmentation level of 1, and the number of pixels at a segmentation level of 3 is half the number of pixels at a segmentation level of 2. The processing time also becomes different depending on the segmentation level.

When the analysis filtering operation is completed on the second precinct, the coefficients C7 through C12, C15 through C20 and C24 and C25 enclosed in a dot-and-dash chained line in FIGS. 21 and 22 are stored on the coefficient rearranging buffer 141. The coefficients C5 and C6 enclosed in a broken line are stored on the entropy encoder 123.

Figure 24:
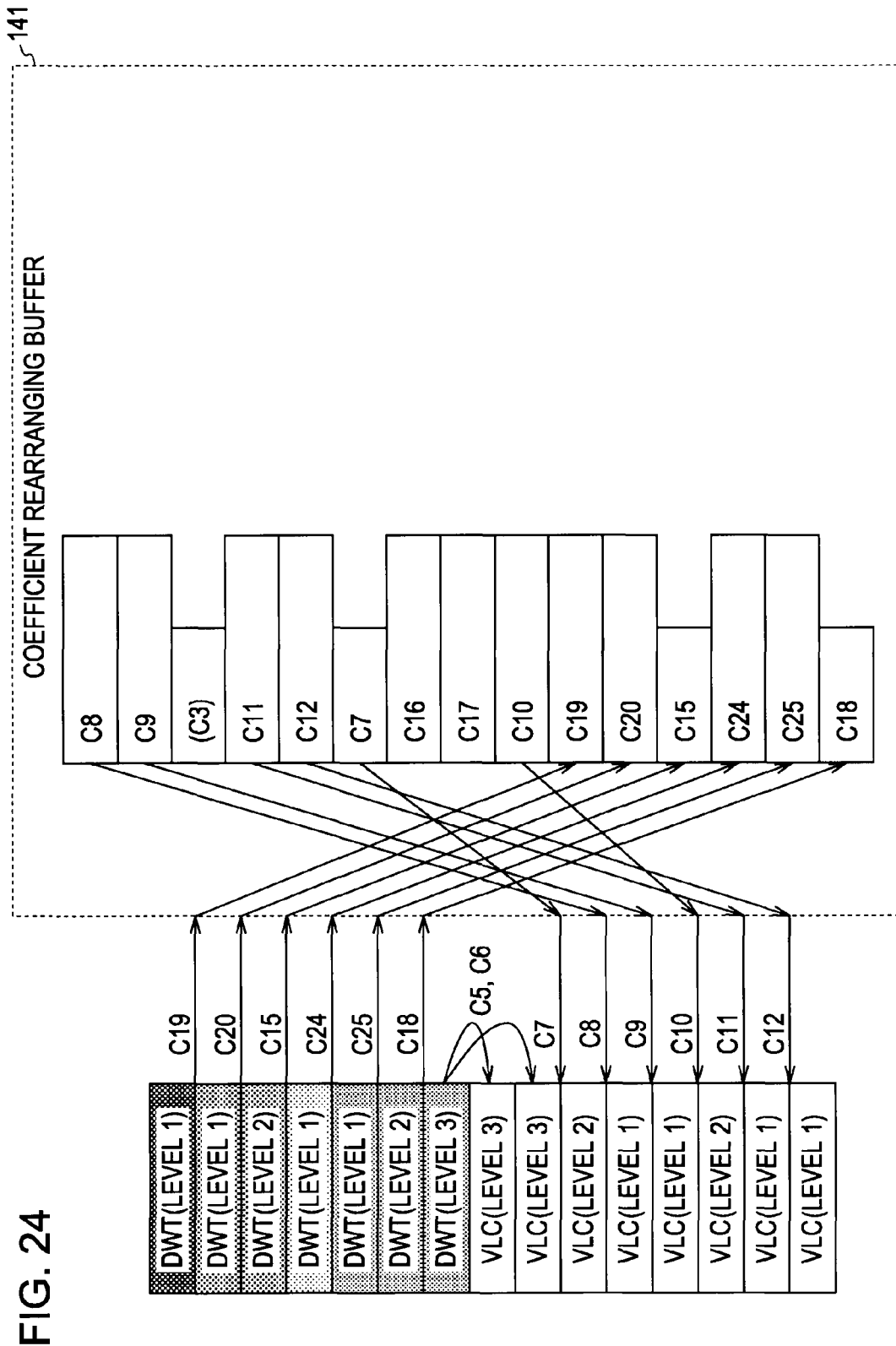
FIG. 24 diagrammatically illustrates the status of the coefficient rearranging buffer.

FIG. 24 diagrammatically illustrates the coefficients at the end of the analysis filtering operation on the second precinct and the status of the coefficient rearranging buffer 141. At the moment the analysis filtering operation is completed on the second precinct, the coefficient rearranging buffer 141 stores in the order of generation, out of the coefficient data generated in the analysis filtering operation performed on the first precinct, the coefficient data not to be processed in a first synthesis filtering operation and the coefficient data generated in the analysis filtering operation on the second precinct. More specifically, the coefficient rearranging buffer 141 stores as coefficients the coefficient C8, the coefficient C9, the coefficient C11, the coefficient C12, the coefficient C7, the coefficient C16, the coefficient C17, the coefficient C10, the coefficient C19, the coefficient C20, the coefficient C15, the coefficient C24, the coefficient C25, and the coefficient C18 in that order. The coefficient C3 is entropy encoded in the encoding process on the first precinct and is deleted from the coefficient rearranging buffer 141. However, since the generation order of the coefficient C3 is later than the unprocessed coefficients C8 and C9, only an area of the coefficient C3 is reserved in the coefficient rearranging buffer 141.

The entropy encoding is performed on the coefficient data in the order to be processed in the second synthesis filtering operation. The coefficient data is read in the order of the coefficient C7 through C12 from the coefficient rearranging buffer 141 and then supplied to the entropy encoder 123. The entropy encoding is performed on the coefficients C5 through C12 in that order. Encoded data VLC5 through VLC12 are thus generated and transmitted to a decoder as a code stream.

The coefficient data is rearranged in the order according to which the synthesis process (inverse wavelet transform) is performed, and then transmitted to the decoder side. In this way, latency through the decoding process is shortened.

Since the coefficient data is written on the coefficient rearranging buffer 141 in the order of generation, a write process is simplified.

In the above discussion, the coefficient data is rearranged in order when the coefficient data is read from the coefficient rearranging buffer 141. Alternatively, the coefficient data may be rearranged in order when the coefficient data is written onto the coefficient rearranging buffer 141.

Figure 25:
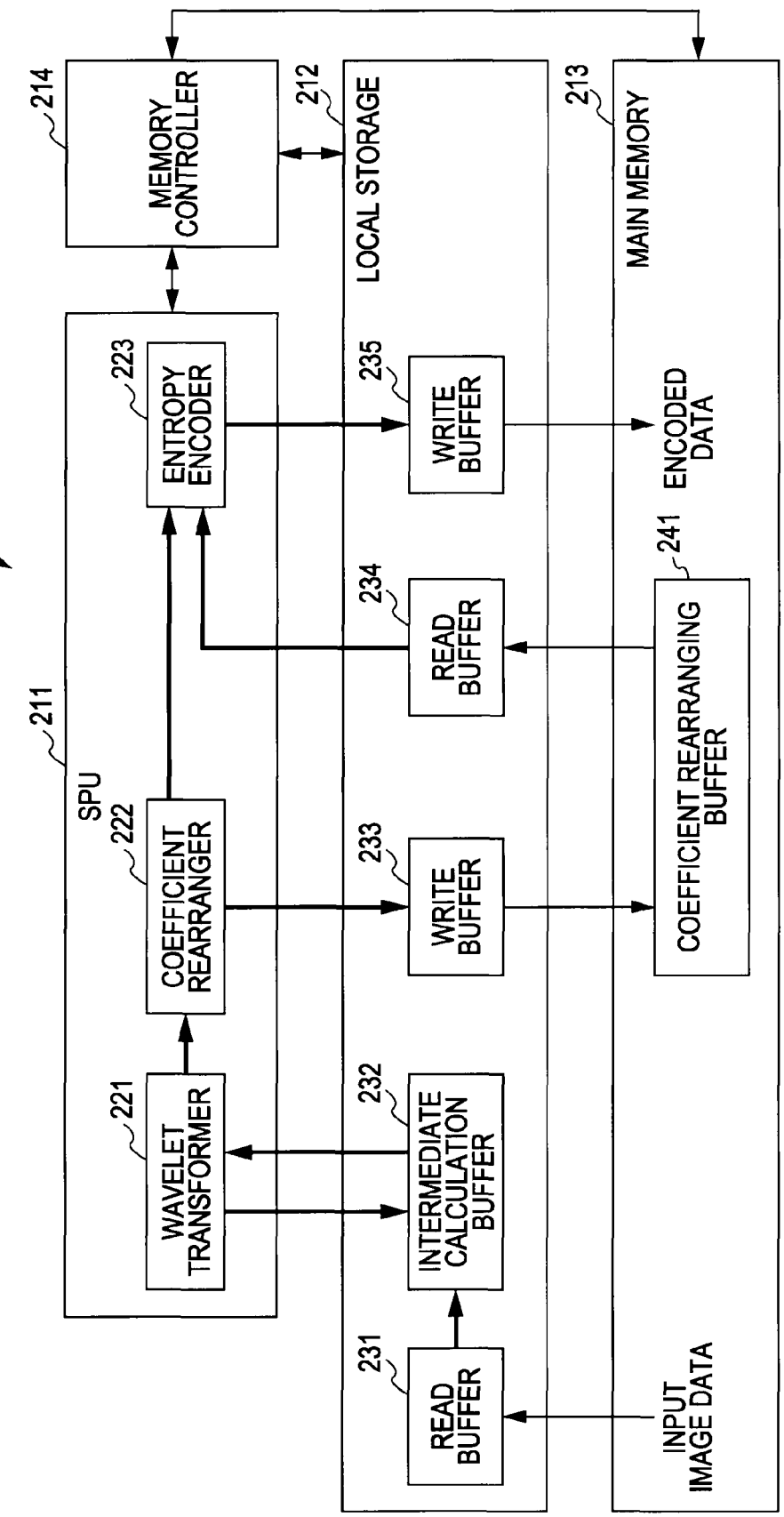
FIG. 25 is a block diagram illustrating an encoding apparatus in accordance with a second embodiment of the present invention.

FIG. 25 is a block diagram illustrating an encoding apparatus 201 in accordance with one embodiment of the present invention. As shown in FIG. 25, elements corresponding to those illustrated in FIG. 19 are designed with reference numerals with the lower two digit numbers thereof equal to the corresponding reference numerals of FIG. 19. The description of the elements having the same functions as in FIG. 19 are not repeated. Data is transferred at a speed higher within the SPU 211 or between the SPU 211 and the local storage 212 than between the local storage 212 and the main memory 213. Latency is shorter in the data transfer within the SPU 211 or between the SPU 211 and the local storage 212 than in the data transfer between the local storage 212 and the main memory 213. To indicate the above-described feature, arrow-headed lines connecting elements within the SPU 211 and connecting the SPU 211 to the local storage 212 are drawn heavier than arrow-headed lines connecting the local storage 212 to the main memory 213.

The encoding apparatus 201 includes the SPU 211, the local storage 212, the main memory 213, and the memory controller 214.

The SPU 211 performs a predetermined program, thereby performing processes of a wavelet transformer 221, a coefficient rearranger 222, and an entropy encoder 223.

Unlike the wavelet transformer 121 of FIG. 19, the wavelet transformer 221 supplies the generated coefficient data to the coefficient rearranger 222.

Figure 26:
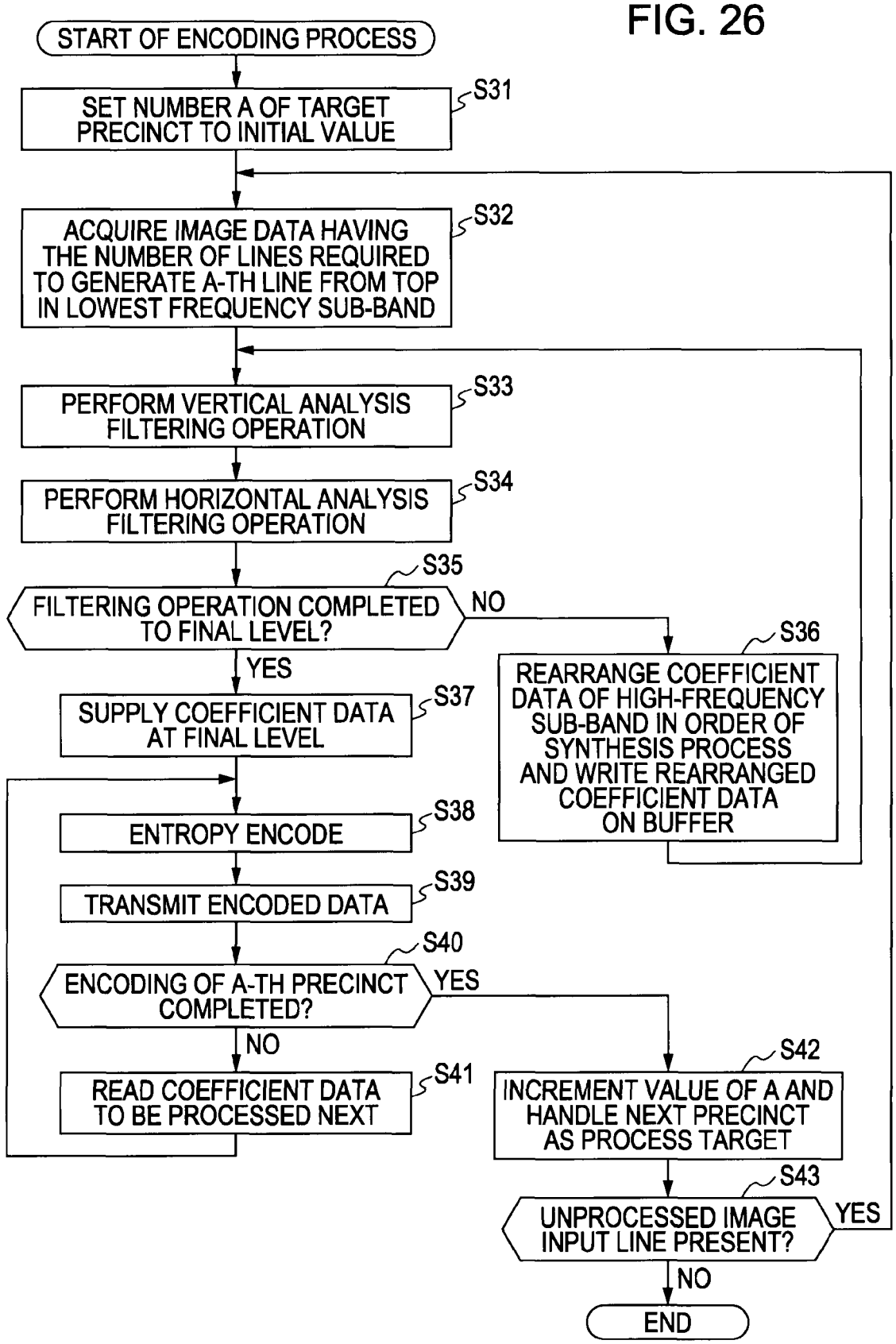
FIG. 26 is a flowchart illustrating the encoding process performed by the encoding apparatus of FIG. 25.

As will be described later with reference to FIG. 26, the coefficient rearranger 222 rearranges, in the order of the synthesis process, the coefficient data other than the coefficient data generated in the analysis filtering operation at the final level and then writes the rearranged coefficient data onto a coefficient rearranging buffer 241 via a write buffer 233. The coefficient rearranger 222 supplies the coefficient data generated in the analysis filtering operation at the final level to the entropy encoder 223 without writing the generated coefficient data onto the coefficient rearranging buffer 241.

As will be described with reference to FIG. 26, the entropy encoder 223 reads the coefficient data from the coefficient rearranging buffer 241 via a read buffer 234 in the order of storage. The entropy encoder 223 entropy encodes the acquired coefficient data and writes the resulting coefficient data onto the main memory 213 via a write buffer 235.

As the local storage 112 of FIG. 19, a local storage 212 includes a read buffer 231, an intermediate calculation buffer 232, a read buffer 234, and the write buffer 235.

As the main memory 113 of FIG. 19, the main memory 213 includes the coefficient rearranging buffer 241.

The encoding process of the encoding apparatus 201 is described below with reference to a flowchart of FIG. 26.

Figure 20:
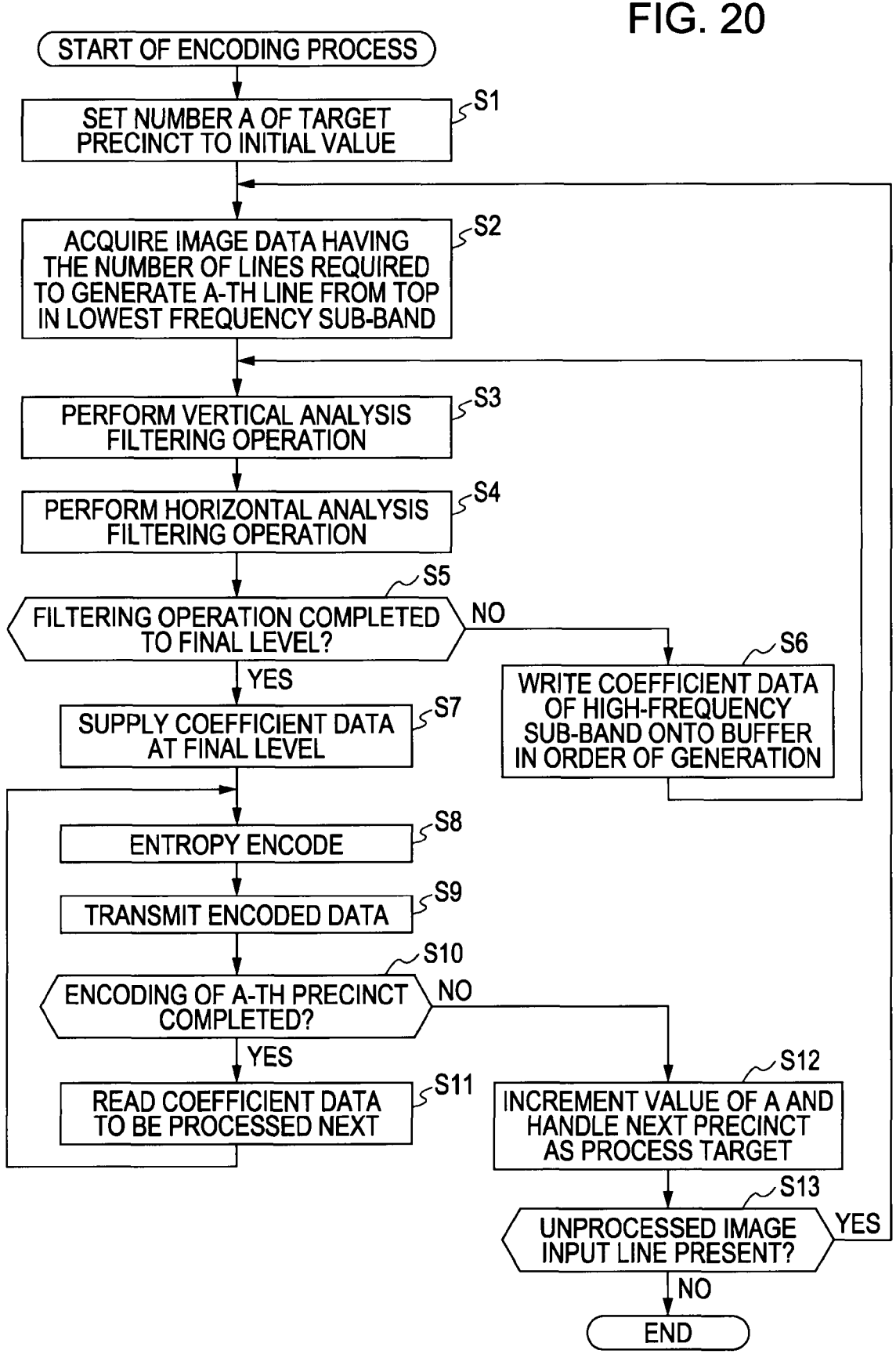
FIG. 20 is a flowchart illustrating an encoding process of the encoding apparatus of FIG. 19.

Steps S31 through S34 are respectively identical to steps S1 through S4 of FIG. 20 and the discussion thereof is omitted here.

If it is determined in step S35 that the final level has not been reached, processing proceeds to step S36.

In step S36, the coefficient rearranger 222 rearranges the coefficient data at the high-frequency subband in the order of synthesis process while writing the rearranged coefficient data onto the buffer. More specifically, the wavelet transformer 221 supplies the coefficient data of high-frequency subbands (HL, LH, and HH) of the current segmentation level to the coefficient rearranger 222. The coefficient rearranger 222 calculates the storage position of the acquired coefficient data of high-frequency subbands on the coefficient rearranging buffer 241 in order to place the coefficient data in the order of the synthesis process. The coefficient rearranger 222 writes the acquired coefficient data of high-frequency subbands onto the write buffer 233 in the order of generation and requests the memory controller 214 to write the coefficient data written on the write buffer 233 onto the calculate storage position on the coefficient rearranging buffer 241.

The memory controller 214 controls data writing so that the coefficient data already written on the write buffer 233 is written at the instructed position on the coefficient rearranging buffer 241. More specifically, the coefficient data is rearranged in the order of the synthesis process and then written onto the coefficient rearranging buffer 241. The memory controller 214 supplies to the entropy encoder 223 information indicating the storage position of the coefficient data written on the coefficient rearranging buffer 241. The entropy encoder 223 stores the storage position of the coefficient data. The memory controller 214 deletes from the write buffer 233 the coefficient data corresponding to the coefficient data transferred to the coefficient rearranging buffer 241.

Processing returns to step S33. Steps S33 through S36 are cycled through until the analysis filtering operation reaches the final level in step S35. More specifically, the analysis filtering operation is repeated at the current segmentation level and the coefficient data of the resulting subbands is rearranged in the order of the synthesis process and written on the coefficient rearranging buffer 241.

If it is determined in step S35 that the analysis filtering operation has reached the final level, processing proceeds to step S37.

As in step S7 of FIG. 23, in step S37, the coefficient data at the final level is transferred from the wavelet transformer 221 to the entropy encoder 223 via the coefficient rearranger 222.

In step S38, the entropy encoder 223 entropy encodes the supplied coefficient data on a line-by-line basis.

In step S39, the entropy encoder 223 outputs the encoded data as in step S9 of FIG. 20.

As in step S10 of FIG. 20, the entropy encoder 223 determines in step S40 whether the encoding of the A-th precinct has been completed. If it is determined in step S40 that the encoding of the A-th precinct has not been completed, processing proceeds to step S41.

In step S41, the entropy encoder 223 reads coefficient data to be processed next. More specifically, the entropy encoder 223 requests the memory controller 214 to transfer to the read buffer 234 the coefficient data placed at the head of the coefficient rearranging buffer 241. The memory controller 214 transfers the requested coefficient data from the coefficient rearranging buffer 241 to the read buffer 234 and deletes from the coefficient rearranging buffer 241 the coefficient data corresponding to the transferred coefficient data. The entropy encoder 223 reads the coefficient data stored on the read buffer 234.

The entropy encoder 223 requests the memory controller 214 to transfer the coefficient data placed subsequent to the coefficient data currently read from the coefficient rearranging buffer 241, from the coefficient rearranging buffer 241 to the read buffer 234. The memory controller 214 transfers the requested coefficient data from the coefficient rearranging buffer 241 to the read buffer 234 and deletes from the coefficient rearranging buffer 241 the coefficient data corresponding to the transferred coefficient data. In other words, the coefficient data to be entropy encoded next is read in a prior read operation from the coefficient rearranging buffer 141 into the read buffer 134.

In this way, in step S41, the entropy encoder 223 reads the coefficient data to be entropy encoded next from the read buffer 234 and reads the coefficient data to be entropy encoded in succession to the next coefficient data from the coefficient rearranging buffer 241 into the read buffer 234. The waiting time of the SPU 211 caused by the data transfer from the coefficient rearranging buffer 241 to the read buffer 234 is thus shortened.

Steps S38 through S41 are repeated until the encoding of the A-th precinct has been completed in step S40. The coefficient data is thus entropy encoded in the order of the synthesis process. The resulting coefficient data is thus output.

If it is determined in step S40 that the encoding of the A-th precinct has been completed, processing proceeds to step S42.

Step S42 and subsequent steps are identical to step S22 and subsequent steps in FIG. 20 and the discussion thereof is omitted here.

Figure 27:
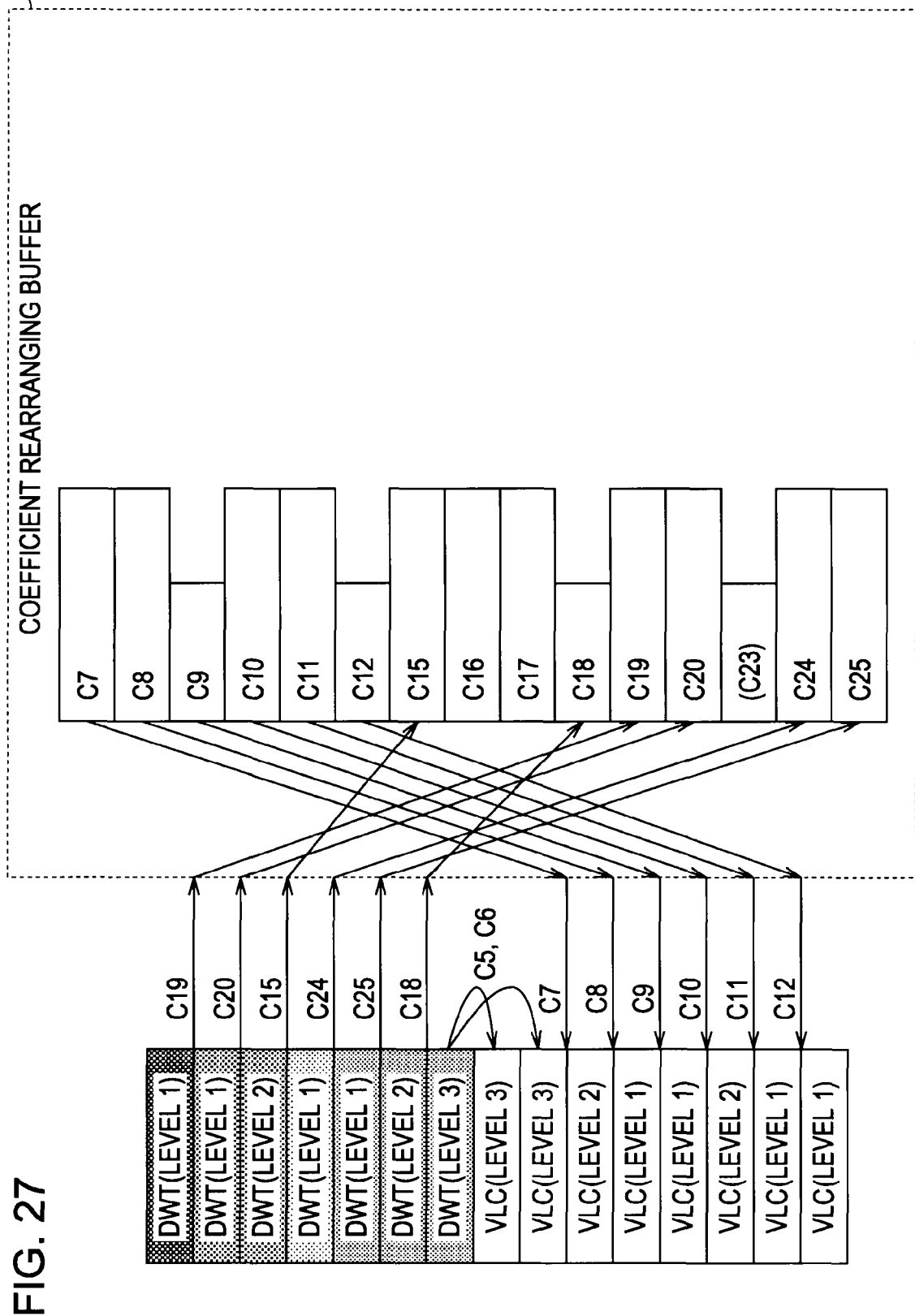
FIG. 27 diagrammatically illustrates a status of a coefficient rearranging buffer.

As FIG. 24, FIG. 27 diagrammatically illustrates the status of the coefficient rearranging buffer 241 when the analysis filtering operation has been completed on the second precinct using the 5×3 filter lifting technique to a segmentation level of 3.

When the analysis filtering operation on the second precinct has completed, the coefficient rearranging buffer 241 stores coefficients C7 through C12, coefficients C15 through C20, and coefficients C24 and C25 in the order of the synthesis process. Since a coefficient C23 is generated in the analysis filtering operation for a third precinct, only an area for the coefficient C23 is reserved.

The coefficient data is rearranged in the order of the synthesis process (inverse wavelet transform), then encoded and transmitted to the decoder side. Latency in the decoding process is thus shortened.

The coefficient data is simply read from the coefficient rearranging buffer 241 in the order of storage. The read process can be simplified. A prior read operation is thus easily performed.

The coefficient data is read in the order of the synthesis process when read from the coefficient rearranging buffer 141 in the encoding apparatus 101. The coefficient data is read from discontinuous positions. Management of the storage positions of the coefficient data and determination of a storage position of coefficient data to be read next are also performed, leading to an increase in the workload of the SPU 111. The process speed of the SPU 111 is decreased. The size of the coefficient data in a horizontal direction becomes different depending on the segmentation level. Repeated operations of reading the coefficient data from the discontinuous positions and deleting the read coefficient data are performed, causing fragments in the coefficient rearranging buffer 141.

The coefficient data is written in the order of the synthesis process when written onto the coefficient rearranging buffer 241 in the encoding apparatus 201. The write positions of the coefficient data become discontinuous. Management of the write positions of the coefficient data is performed, leading to an increase in the workload of the SPU 211. The process speed of the SPU 211 is decreased. The size of the coefficient data in a horizontal direction becomes different depending on the segmentation level. Repeated operations of writing the coefficient data on the discontinuous positions are performed, causing fragments in the coefficient rearranging buffer 241.

In the above discussion, the analysis filtering operation is performed using the 5×3 filter to the segmentation level of 3. For example, if the analysis filtering operation is performed to the segmentation level of 4 using the 9×7 filter with the filter size and the segmentation level increased, the rearrangement process becomes even more complex. This leads to an increase in the workload of the SPU 111 and the SPU 211 and prolongs the process time.

If the size of the input image data, the type of the filter and the segmentation level are variable, the rearrangement pattern of the coefficient data becomes different depending on the combination of those factors. The size of the program of each of the coefficient rearranger 122 and the coefficient rearranger 222 increases in response to all the patterns.

Returning to FIG. 23, the coefficient C19, the coefficient C20, the coefficient C24, and the coefficient C25 are generated in that order in the analysis filtering operation at the segmentation level of 1. The coefficient C15, and the coefficient C18 are generated in that order in the analysis filtering operation at the segmentation level of 2. In other words, the coefficient data is generated in the order of the synthesis process at each segmentation level.

Regardless of the conditions of the size of the input image data, the type of the filter and the segmentation level, the analysis filtering operation has a characteristic that the order of the coefficient data generated in the analysis filtering operation is not reversed from the order of the coefficient data processed in the synthesis filtering operation in terms of subband.

Figure 28:
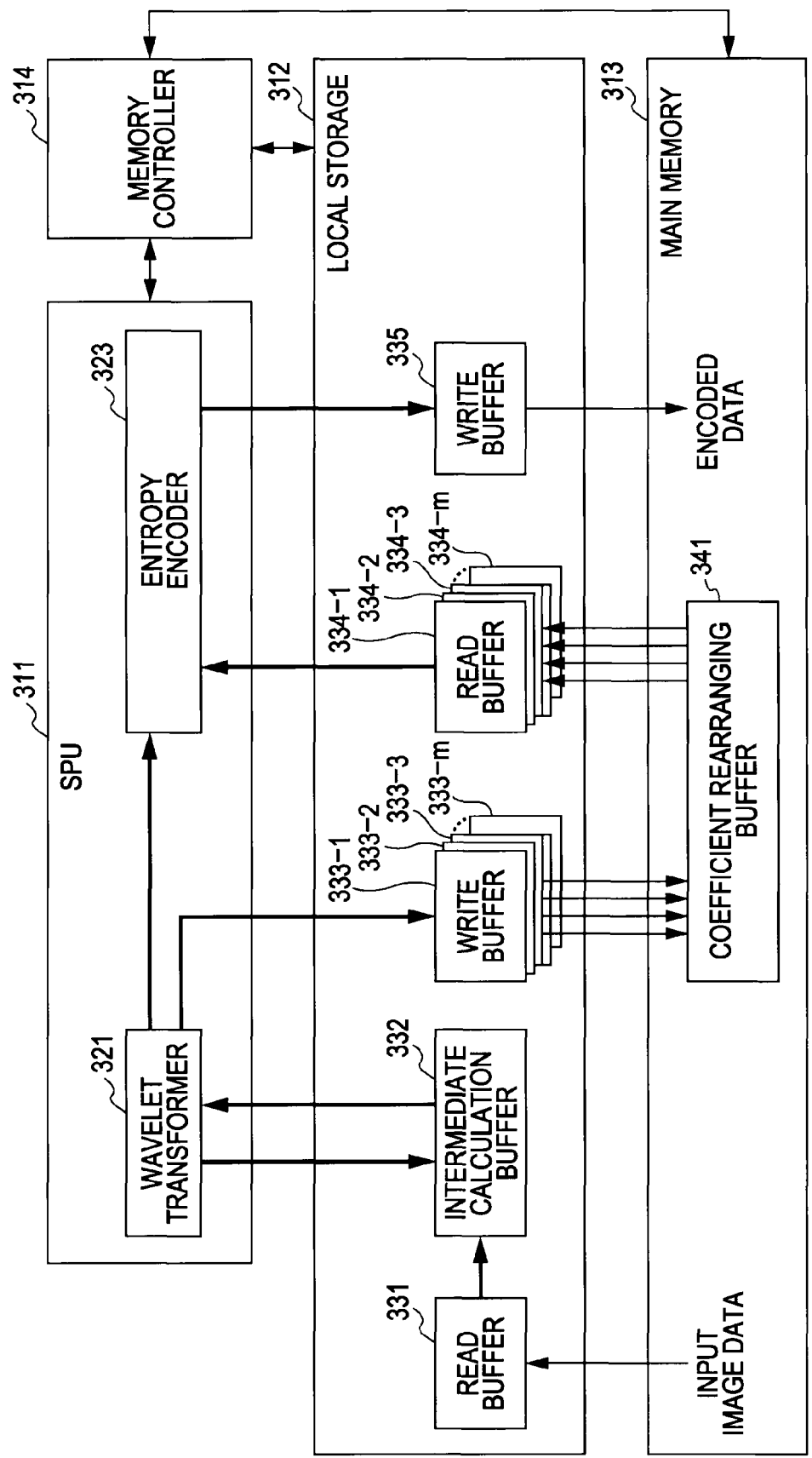
FIG. 28 is a block diagram illustrating an encoding apparatus in accordance with a third embodiment of the present invention.

FIG. 28 is a block diagram illustrating an encoding apparatus 301 in accordance with one embodiment of the present invention. Taking advantage of that characteristic, the encoding apparatus 301 writes the coefficient data onto a coefficient rearranging buffer. As shown in FIG. 28, elements corresponding to those illustrated in FIG. 19 are designed with reference numerals with the lower two digit numbers thereof equal to the corresponding reference numerals of FIG. 19. The description of the elements having the same functions as in FIG. 19 are not repeated. Data is transferred at a speed higher within a SPU 311 or between the SPU 311 and a local storage 312 than between the local storage 312 and a main memory 313. Latency is shorter in the data transfer within the SPU 311 or between the SPU 311 and the local storage 312 than in the data transfer between the local storage 312 and the main memory 313. To indicate that feature as in FIGS. 19 and 20, arrow-headed lines connecting elements within the SPU 311 and connecting the SPU 311 to the local storage 312 are drawn heavier than arrow-headed lines connecting the local storage 312 to the main memory 313 in FIG. 28.

The encoding apparatus 301 includes the SPU 311, the local storage 312, the main memory 313, and a memory controller 314.

The SPU 311 performs a predetermined program, thereby performing functions of a wavelet transformer 321, and an entropy encoder 323.

Figure 30:
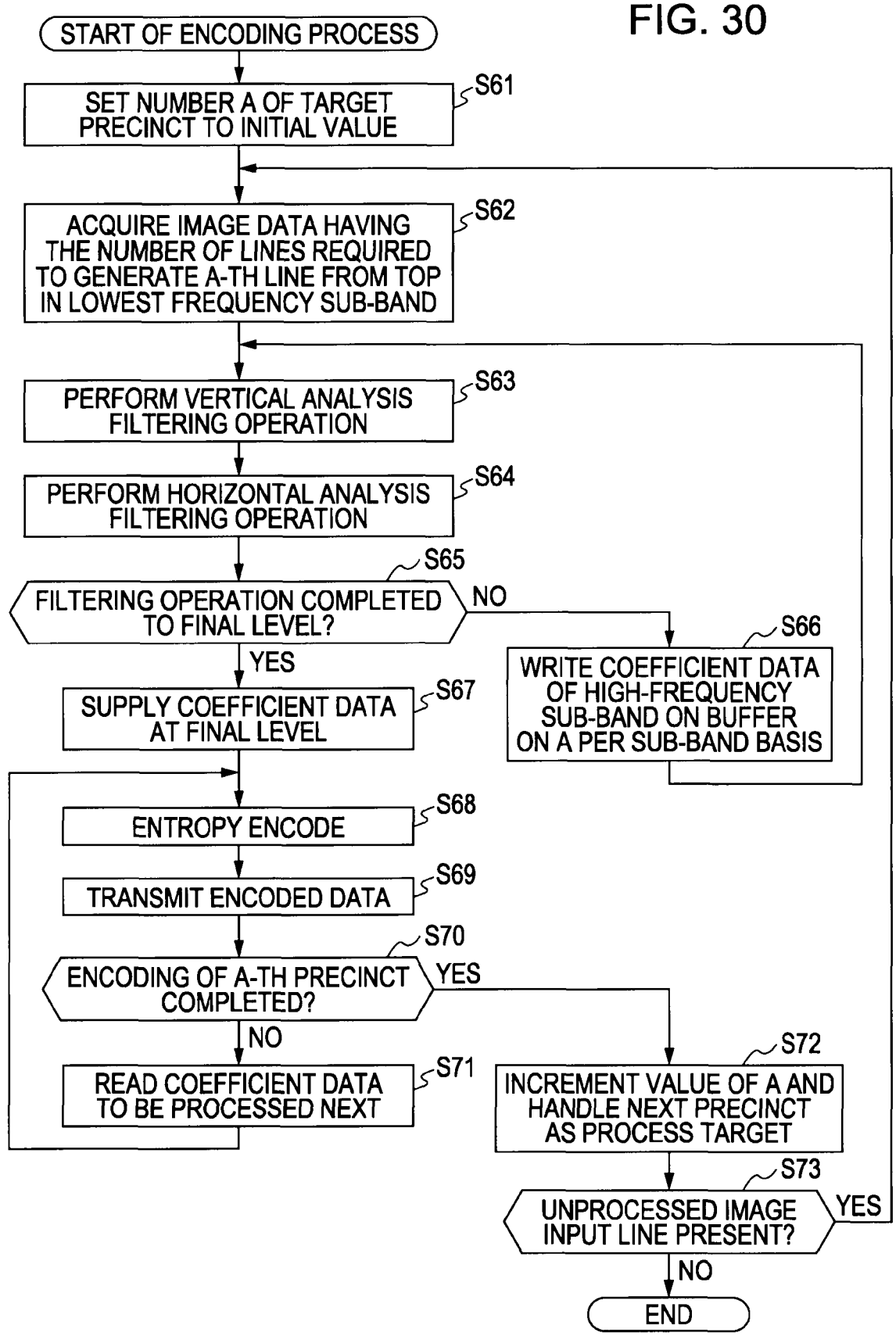
FIG. 30 is a flowchart illustrating an encoding process performed by the encoding apparatus of FIG. 28.

Unlike the wavelet transformer 121 of FIG. 19, the wavelet transformer 321 writes generated coefficient data onto different areas on a per subband basis in the coefficient rearranging buffer 341 via write buffers 333-1 through 333-m as described with reference to FIG. 30. The wavelet transformer 321 directly supplies to the entropy encoder 323 the coefficient data generated in the analysis filtering operation at the final level without writing that coefficient data onto the coefficient rearranging buffer 341.

As will be described with reference to FIG. 30, the entropy encoder 323 reads from the coefficient rearranging buffer 341 the coefficient data stored on the separate areas on a per subband basis via read buffers 334-1 through 334-m. The entropy encoder 323 entropy encodes the acquired coefficient data and writes the encoded coefficient data onto a main memory 313 via a write buffer 335.

As the local storage 112 of FIG. 19, the local storage 312 includes a read buffer 331, an intermediate calculation buffer 332, and the write buffer 335. The local storage 312 further includes the write buffers 333-1 through 333-m in place of the write buffer 233, and the read buffers 334-1 through 334-m in place of the read buffer 234. If there is no need to discriminate between the write buffers 333-1 through 333-m, each buffer is referred to as a write buffer 333 and if there is no need to discriminate between the read buffers 334-1 through 334-m, each buffer is referred to as a read buffer 334.

Figure 29:
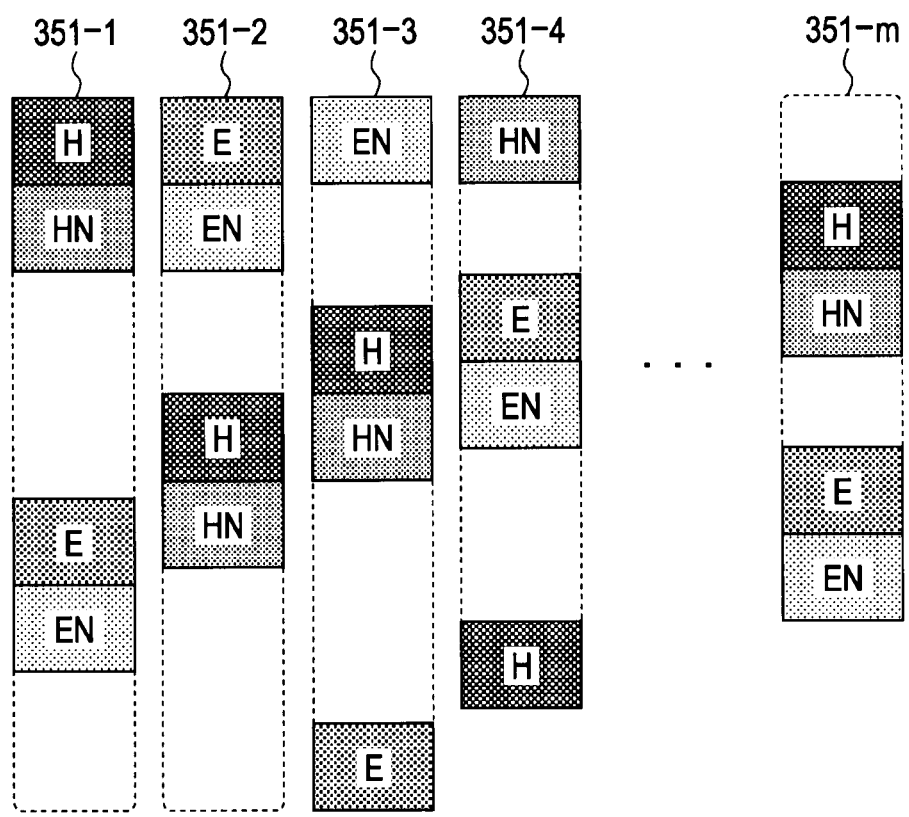
FIG. 29 illustrates a memory structure of the coefficient rearranging buffer of FIG. 28.

As the main memory 113 of FIG. 19, the main memory 313 includes the coefficient rearranging buffer 341. As shown in FIG. 29, the coefficient rearranging buffer 341 includes ring buffers 351-1 through 351-m of the number equal to each of the number of the write buffers 333 and the number of the read buffer 334. If there is no need to discriminate between the ring buffers 351-1 through 351-m, each buffer is referred to as a ring buffer 351.

The ring buffer 351 of a FIFO type has a ring-type buffer structure with an address subsequent to an end address of a buffer being a leading address. Each of the ring buffers 351 is repeatedly used in a ring-like fashion, and the memory size of the ring buffer 351 is thus minimized. The required memory capacity of each ring buffer 351 is easily calculated in accordance with the calculation method discussed with reference to FIGS. 17 and 18.

The write buffers 333 arranged, one for each of the high-frequency subbands (HL, LH, and HH) at each segmentation level. The read buffers 334 and the ring buffers 351 are also arranged in the same fashion, namely, one for each of the high-frequency subbands (HL, LH, and HH) at each segmentation level. For example, at the segmentation level of 3, each of six high-frequency subbands generated at segmentation levels 1 and 2 except segmentation level of 3 is provided with one write buffer 333, one read buffer 334, and one ring buffer 351.

The wavelet transformer 321 manages a pointer to an end point E indicating the end of the latest coefficient data written immediately before. When the coefficient data is written on the ring buffer 351, the wavelet transformer 321 writes the coefficient data on the write buffer 333 corresponding to the subband to which the coefficient data belongs. The wavelet transformer 321 requests the memory controller 314 to write the coefficient data written on the write buffer 333 on an area EN subsequent to the end point E of the corresponding ring buffer 351. The memory controller 314 controls writing of the coefficient data written on the write buffer 333 to be written onto the area EN of the indicated ring buffer 351. The memory controller 314 notifies the wavelet transformer 321 and the entropy encoder 323 of the position of the end point of the area EN of the ring buffer 351 on which the coefficient data has been written. The wavelet transformer 321 moves the pointer of the end point E of the ring buffer 351 to the end point of the area EN.

The entropy encoder 323 manages the pointer to the head H indicating the position of the head of the oldest written coefficient data on the ring buffer 351. When the coefficient data is read from the ring buffer 351, the entropy encoder 323 requests the memory controller 314 to transfer the coefficient data stored at the head H of the ring buffer 351. The memory controller 314 reads from a head H of the ring buffer 351 the requested coefficient data, transfers the coefficient data to the corresponding read buffer 334, and deletes from the ring buffer 351 the coefficient data corresponding to the transferred coefficient data. The entropy encoder 323 reads the transferred coefficient data from the read buffer 334. The memory controller 314 notifies the entropy encoder 323 of the position of the head of an area HN having stored next coefficient data in succession to the transferred coefficient data. The entropy encoder 323 moves the pointer from the head H of the ring buffer 351 to the head of the area HN.

The positions of the head H and end E are shifted to the head of the ring buffer 351 after being moved to the end of the ring buffer 351.

The encoding process to be executed by the encoding apparatus 301 is described below with reference to a flowchart of FIG. 30.

Steps S61 through S64 are respectively identical to steps S1 through S4 of FIG. 20 and the discussion thereof is omitted is omitted here.

If it is determined in step S65 that the analysis filtering operation has not reached the final level, processing proceeds to step S66.

In step S66, the wavelet transformer 321 writes the coefficient data at the high-frequency subband onto the write buffer 333 on a subband-by-subband basis. More specifically, the wavelet transformer 321 writes the coefficient data at the high-frequency subbands (HL, LH, and HH) at the current segmentation level onto the write buffer 333 corresponding to the respective subbands. The wavelet transformer 321 requests the memory controller 314 to write the coefficient data written on the write buffer 333 onto the area EN subsequent to the end E of the corresponding ring buffer 351. The memory controller 314 writes the coefficient data written on the write buffer 333 onto the area EN of the indicated ring buffer 351. The memory controller 314 notifies the wavelet transformer 321 and the entropy encoder 323 of the position of the area EN of the ring buffer 351 having the coefficient data written thereon. The wavelet transformer 321 shifts the pointer from the end E of the ring buffer 351 to the end of the area EN.

The coefficient data is written on the ring buffer 351 in the order of generation on a per subband basis. The waiting time of the SPU 311 caused by the data transfer from the write buffer 333 to the ring buffer 351 is reduced.

Processing returns to step S63. Steps S63 through S66 are cycled through until the analysis filtering operation reaches the final level in step S65. More specifically, the analysis filtering operation is repeated at the current segmentation level and the coefficient data of the high-frequency subbands is separated by subband and written on the ring buffer 351 of the coefficient rearranging buffer 341 in the order of generation. More specifically, the coefficient data of the high-frequency subbands is written on different areas on a per subband basis on the coefficient rearranging buffer 341.

If it is determined in step S65 that the analysis filtering operation has reached the final level, processing proceeds to step S67.

In step S67, the wavelet transformer 321 directly supplies to the entropy encoder 323 the coefficient data generated in the analysis filtering operation at the final level without writing that coefficient data onto the coefficient rearranging buffer 341.

The high-frequency coefficient data out of the coefficient data at the final level is stored onto the intermediate calculation buffer 332 to be used in a subsequent precinct process.

In step S68, the entropy encoder 323 entropy encodes the supplied coefficient data on a line-by-line basis.

As in step S9 of FIG. 20, the encoded data is transmitted in step S69.

As in step S10 of FIG. 20, the entropy encoder 323 determines in step S70 whether the encoding of the A-th precinct has been completed. If it is determined in step S70 that the entropy encoding of the A-th precinct has not been completed, processing proceeds to step S71.

In step S71, the entropy encoder 323 reads coefficient data to be processed next. More specifically, the entropy encoder 323 requests the memory controller 314 to read the coefficient data to be processed in the synthesis process subsequent to the immediately preceding encoded coefficient data, from the head H of the ring buffer 351 corresponding to the subband of that coefficient data and to transfer that coefficient data to the read buffer 334. The memory controller 314 transfers the requested coefficient data from the ring buffer 351 to the read buffer 334 and deletes from the coefficient rearranging buffer 341 the coefficient data corresponding to the transferred coefficient data. The entropy encoder 323 reads the coefficient data stored on the read buffer 334. The memory controller 314 notifies the entropy encoder 323 of the position of the head of the area HN storing coefficient data subsequent to the transferred coefficient data. The entropy encoder 323 moves the pointer from the head H of the ring buffer 351 to the head of the area HN.

The entropy encoder 323 requests the memory controller 314 to transfer the coefficient data stored at the head H of the ring buffer 351 from which the pointer has been moved. The memory controller 314 transfers the requested coefficient data from the ring buffer 351 to the read buffer 334 and deletes from the ring buffer 351 the coefficient data corresponding to the transferred coefficient data. In this way, the coefficient data to be encoded next is read in a prior read operation from the ring buffer 351 into the read buffer 334 on a per subband basis. The memory controller 314 notifies the entropy encoder 323 of the position of the head of the area HN storing the coefficient data subsequent to the transferred coefficient data. The entropy encoder 323 moves the pointer from the head H of the ring buffer 351 to the head of the area HN.

In step S71, the entropy encoder 323 reads from the read buffer 334 the coefficient data to be entropy encoded next. The entropy encoder 323 reads from the ring buffer 351 into the read buffer 334, in a prior read operation, coefficient data belonging to the same subband as the read coefficient data and generated subsequent to the read coefficient data, namely, the coefficient data to be entropy encoded in succession to the read coefficient data. In this way, the waiting time of the SPU 311 caused in the data transfer from the ring buffer 351 to the read buffer 334 is reduced.

Steps S68 through S71 are repeated until the encoding of the A-th precinct has been completed in step S70. The coefficient data is thus read from the coefficient rearranging buffer 341 in the order of the synthesis process. The resulting coefficient data is output.

If it is determined in step S70 that the encoding of the A-th precinct has been completed, processing proceeds to step S72.

Step S72 and subsequent steps are identical to step S22 and subsequent steps in FIG. 20 and the discussion thereof is omitted here.

Figure 31:
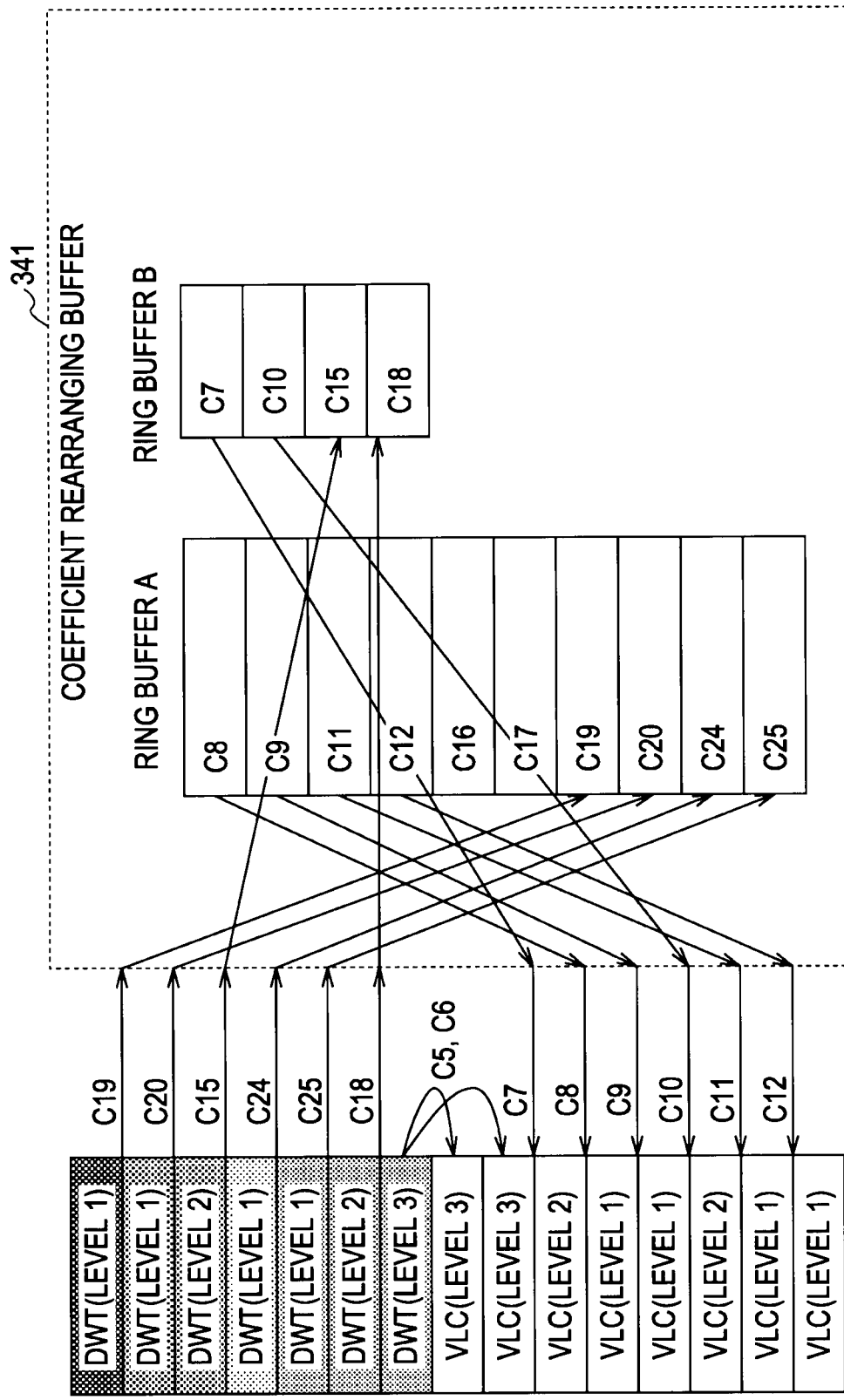
FIG. 31 diagrammatically illustrates a status of the coefficient rearranging buffer.

As FIGS. 24 and 27, FIG. 31 diagrammatically illustrates the status of the coefficient rearranging buffer 341. The coefficient rearranging buffer 341 has completed the analysis filtering operation on the second precinct using the 5×3 filter lifting technique to a segmentation level of 3. As in FIGS. 24 and 27, the horizontal analysis filtering operation is not illustrated for simplicity of explanation in FIG. 31. With the segmentation level of 3, six ring buffers are arranged in the coefficient rearranging buffer 341. FIG. 31 illustrates only a ring buffer A for a high-frequency subband at a segmentation level of 1 and a ring buffer B for a high-frequency subband at a segmentation level of 2.

When the analysis filtering operation on the second precinct has completed, the ring buffer A stores the coefficient data generated in the wavelet transform at the segmentation level of 1, namely, coefficient C8, coefficient C9, coefficient C11, coefficient C12, coefficient C16, coefficient C17, coefficient C19, coefficient C20, coefficient C24, and coefficient C25 in that order. The ring buffer B stores the coefficient data generated in the wavelet transform at the segmentation level of 2, namely, coefficient C7, coefficient C10, coefficient C15, and coefficient C18 in that order.

Figure 32:
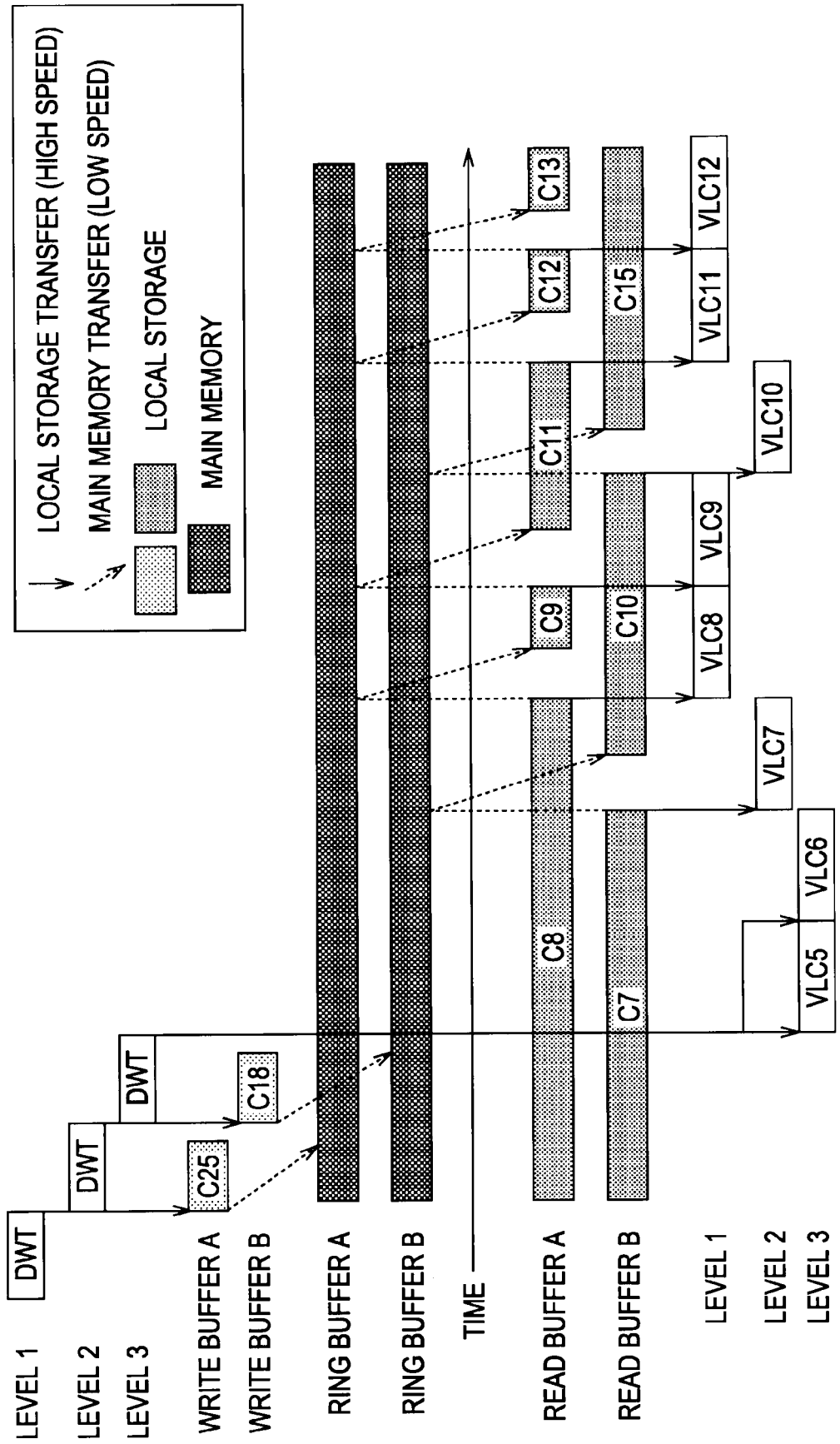
FIG. 32 diagrammatically illustrates a flow of the encoding process performed on a second precinct.

FIG. 32 diagrammatically illustrates the encoding process performed on the second precinct using the 5×3 filter lifting technique in the same manner as shown in FIGS. 21, 22, 23 and 31.

FIG. 32 illustrates the process performed subsequent to the lifting process within the area D14 of FIG. 21. A right-looking arrow-headed solid line drawn at the middle level represents time axis. Downward looking arrow-headed solid lines represent local storage transfer performed between the SPU 311 and the local storage 312 (also including part of data transfer performed within the SPU 311). Right-downward looking arrow-headed broken lines represent main memory transfer performed between the local storage 312 and the main memory 313. To emphasize a difference between transfer times of the local storage transfer and the main memory transfer, the local storage transfer is represented by the substantially vertical arrow-headed lines in substantially perpendicular to the time axis in order to indicate approximately zero transfer time. The main memory transfer is represented by the slantly right-downward looking arrow-headed lines to indicate that the main memory transfer takes more time than the local storage transfer.

A write buffer A, a ring buffer A, and a read buffer A store coefficient data generated in the analysis filtering operation at a segmentation level of 1. A write buffer B, a ring buffer B, and a read buffer B store coefficient data generated in the analysis filtering operation at a segmentation level of 2.

The analysis filtering operation is described with reference to the processes performed along the time axis. The wavelet transformer 321 performs the analysis filtering operation at the segmentation level of 1 to the area D14. The wavelet transformer 321 generates and writes coefficient C25 onto the write buffer A and requests the memory controller 314 to transfer the coefficient C25 to the ring buffer A. When the memory controller 314 transfers the coefficient C25 from the write buffer A to the ring buffer A, the wavelet transformer 321 performs the analysis filtering operation at the segmentation level of 2 on the area D14. The wavelet transformer 321 thus generates coefficient C18, writes the generated coefficient C18 onto the write buffer B and requests the memory controller 314 to transfer the coefficient C18 to the ring buffer B. When the memory controller 314 transfers the coefficient C18 from the write buffer B to the ring buffer B, the wavelet transformer 321 performs the analysis filtering operation at the segmentation level of 3 on the area D14. The wavelet transformer 321 thus generates coefficients C5 and C6 and then supplies the coefficients C5 and C6 to the entropy encoder 323.

The entropy encoder 323 entropy encodes the coefficients C5 and C6 and then outputs the resulting encoded data VLC5 and VLC6.

During the analysis filtering operation to a first precinct, the entropy encoder 323 reads coefficient C7 stored on the read buffer B and requests the memory controller 314 to transfer coefficient C10 stored at the head H of the ring buffer B. When the memory controller 314 transfers the coefficient C10 from the ring buffer B to the read buffer B, the entropy encoder 323 entropy encodes the coefficient C7 and outputs the resulting encoded data VLC7.

During the analysis filtering operation to the first precinct, the entropy encoder 323 reads coefficient C8 stored on the read buffer A and requests the memory controller 314 to transfer coefficient C9 stored on the head H of the ring buffer A. When the memory controller 314 transfers the coefficient C9 from the ring buffer A to the read buffer A, the entropy encoder 323 entropy encodes the coefficient C8 and outputs the resulting encoded data VLC8.

The entropy encoder 323 reads the coefficient C9 from the read buffer A and requests the memory controller 314 to transfer coefficient C11 stored at a position subsequent to the storage position of the coefficient C9 on the ring buffer A. When the memory controller 314 transfers the coefficient C11 from the ring buffer A to the read buffer A, the entropy encoder 323 entropy encodes the coefficient C9 and outputs the resulting encoded VLC9.

The entropy encoder 323 reads the coefficient C10 from the ring buffer B and requests the memory controller 314 to transfer coefficient C15 stored at a position subsequent to a storage position of the coefficient C10 on the ring buffer B. When the memory controller 314 transfers the coefficient C15 from the ring buffer B to the read buffer B, the entropy encoder 323 entropy encodes the coefficient C10 and outputs the resulting VLC10.

The entropy encoder 323 reads coefficient C11 from the read buffer A and requests the memory controller 314 to transfer coefficient C12 stored at a position subsequent to a storage position of the coefficient C11 on the ring buffer A. When the memory controller 314 transfers the coefficient C12 from the ring buffer A to the read buffer A, the entropy encoder 323 entropy encodes the coefficient C1 and outputs the resulting the encoded data VLC11.

The entropy encoder 323 reads the coefficient C12 from the read buffer A and requests the memory controller 314 to transfer coefficient C13 stored at a position subsequent to a storage position of the coefficient C12 on the read buffer A. When the memory controller 314 transfers the coefficient C13 from the ring buffer A to the read buffer A, the entropy encoder 323 entropy encodes the coefficient C12 and outputs the resulting encoded data VLC12. The encoding process on the second precinct is thus completed.

The coefficient data is rearranged in the order of the synthesis process (inverse wavelet transform) and the rearranged coefficient data is then supplied to the decoder side. Latency in the decoding process is thus shortened.

The coefficient data is written onto the ring buffer 351 in the order of generation on a per subband basis and then read in the order of write by selecting the ring buffer 351. The coefficient data is thus rearranged in the order of the synthesis process. A calculation process at the write position or the read position of the coefficient data is reduced. The workload on the SPU 311 is reduced. A fast process speed is achieved and the latency in the encoding process is shortened.

Since the coefficient data is stored on the ring buffer 351 on a subband-by-subband basis, the size of the coefficient data stored in a horizontal direction on the ring buffer 351 becomes uniform. This arrangement controls the generation of fragments in the coefficient rearranging buffer 341. Memory usage efficiency is thus heightened.

The waiting time of the SPU 311 caused in the data transfer between the local storage 312 and the main memory 313 is shortened as described with reference to FIG. 32. The process time is shortened and the latency in the encoding process is also shortened.

Different channels are preferably used to transfer data between the write buffers 333-1 through 333-m and the ring buffers 351-1 through 351-m and to transfer data between the read buffers 334-1 through 334-m and the ring buffers 351-1 through 351-m. In other words, a channel for the same subband for data transfer between the write buffer 333 and the ring buffer 351 is preferably different from a channel for the same subband for data transfer between the ring buffer 351 and the read buffer 334. In this way, the transfer operations of the coefficient data of the subbands are performed in parallel, shortening the waiting time of the SPU 311.

Figure 33:
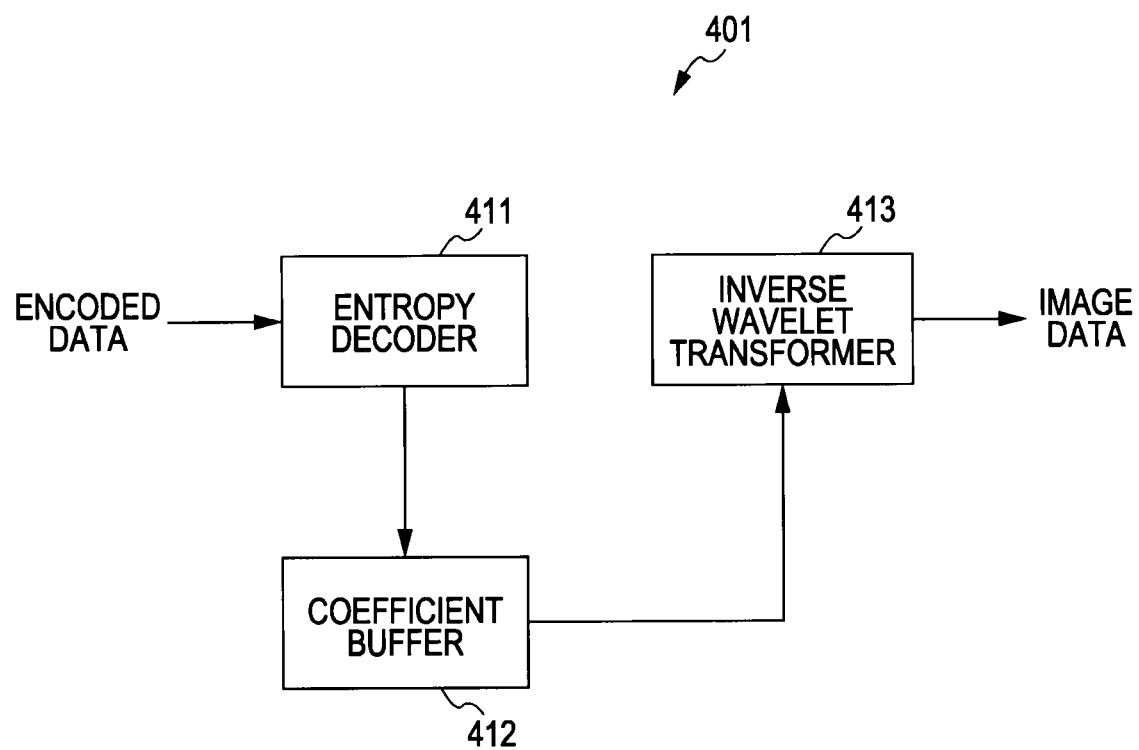
FIG. 33 is a block diagram illustrating a decoder.

A decoder 401 corresponding to the encoder 10 of FIG. 1 is described below. FIG. 33 is a block diagram illustrating the software decoder 401 in accordance with one embodiment of the present invention. The software decoder 401 of FIG. 33 is implemented using a software program. The decoder 401, implemented when a CPU in a predetermined information processing apparatus executes the software program, restores image data by decoding encoded data. As shown in FIG. 33, the decoder 401 includes an entropy decoder 411, a coefficient buffer 412, and an inverse wavelet transformer 413.

The entropy decoder 411 decodes the supplied encoded data in accordance with a decoding method corresponding to the encoding method of the entropy encoder 23. The resulting coefficient data is stored onto the coefficient buffer 412. Using the synthesis filter, the inverse wavelet transformer 413 performs the synthesis filtering operation (inverse wavelet transform) on the coefficient data stored on the coefficient buffer 412. The inverse wavelet transformer 413 then stores results of the synthesis filtering operation back onto the coefficient buffer 412. The inverse wavelet transformer 413 obtains decoded image data (output image data) by repeating the synthesis filtering operation in accordance with the segmentation level and outputs the resulting decoded image data.

Figure 34:
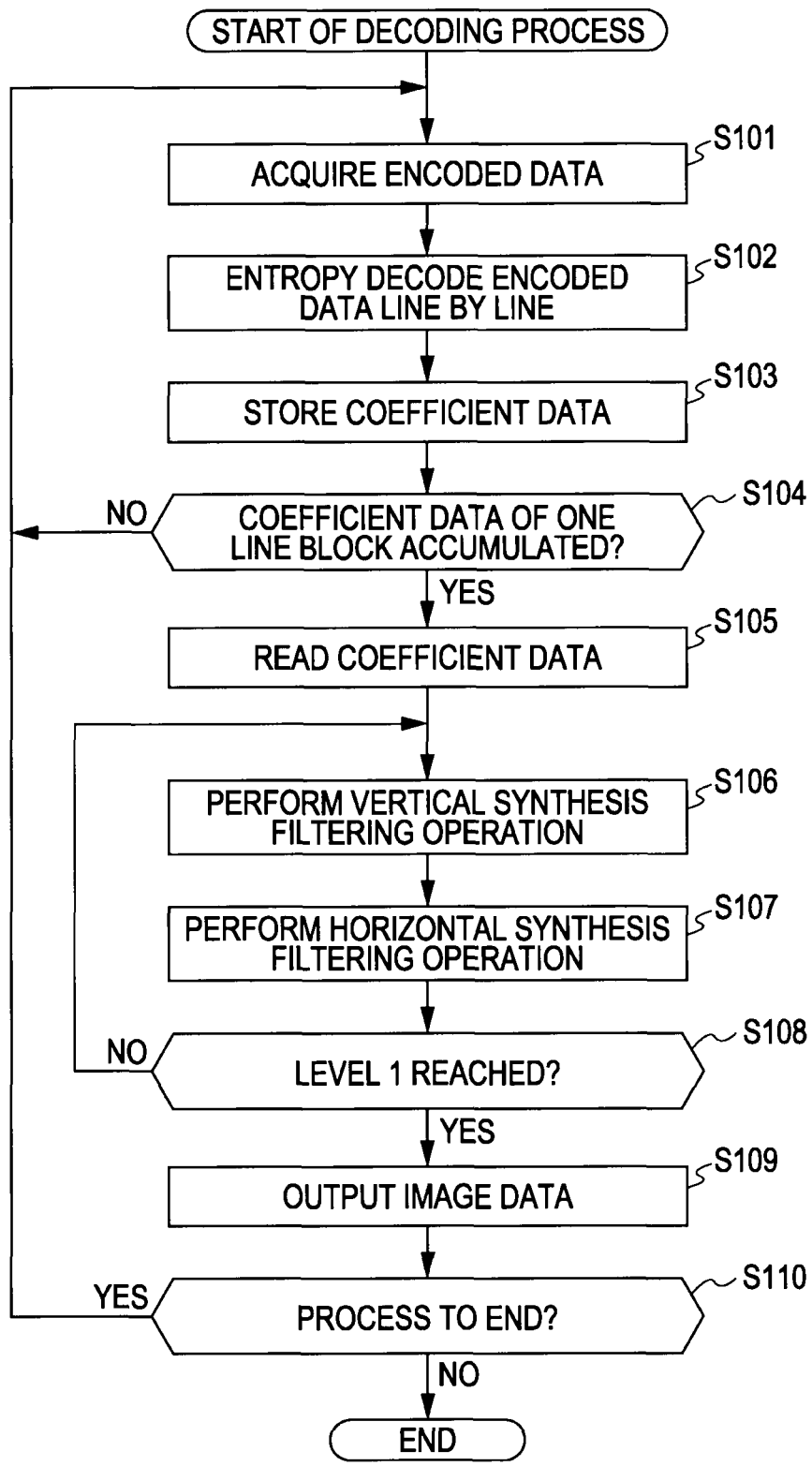
FIG. 34 is a flowchart illustrating a decoding process of the decoder of FIG. 33.

The decoding process of the decoder 401 is described below with reference to a flowchart of FIG. 34.

The decoding process performed by the decoder 401 is described below with reference to a flowchart of FIG. 34.

When the decoding process starts, the entropy decoder 411 acquires in step S101 the encoded data supplied from outside the decoder 401. In step S102, the entropy decoder 411 entropy decodes the encoded data line by line.

In step S103, the coefficient buffer 412 stores the coefficient data obtained as a result of decoding.

In step S104, the inverse wavelet transformer 413 determines whether the coefficient buffer 412 has stored one precinct of coefficient data. If it is determined in step S104 that one precinct of coefficient data is not stored, processing returns to step S101 to perform step S101 and subsequent steps. The inverse wavelet transformer 413 thus waits on standby until the coefficient buffer 412 has stored one precinct of coefficient data.

If it is determined in step S104 that the coefficient buffer 412 has stored one precinct of coefficient data, the inverse wavelet transformer 413 proceeds to step S105.

Since the encoder 10 (the encoding apparatus 101, the encoding apparatus 201 or the encoding apparatus 301) supplies to the decoder 401 the coefficient data in an order of the inverse wavelet transform, the coefficient buffer 412 stores the coefficient data of one precinct in the order of the inverse wavelet transform.

In step S105, the inverse wavelet transformer 413 reads one precinct of coefficient data from the coefficient buffer 412. In step S106, the inverse wavelet transformer 413 performs a vertical synthesis filtering operation on the coefficients arranged in a vertical line on the screen. In step S107, the inverse wavelet transformer 413 performs a horizontal synthesis filtering operation on the coefficient data arranged in a horizontal line on the screen.

The coefficient data of one precinct is stored in the order of inverse wavelet transform on the coefficient buffer 412. The inverse wavelet transformer 413 simply reads the coefficient data in the order of storage from the coefficient buffer 412. There is no need for rearranging the stored coefficient data. The delay time involved in the inverse wavelet transform is thus reduced.

In step S108, the inverse wavelet transformer 413 determines whether the synthesis filtering operation has reached level=1 (with segmentation level being "1"), namely, whether inverse transform has been performed to the state prior to wavelet transform. If it is determined in step S108 that the synthesis filtering level has not reached level=1, processing returns to step S106 to repeat steps S106 and S107.

If it is determined in step S108 that the synthesis filtering operation has reached level=1, the inverse wavelet transformer 413 proceeds to step S109.

In step S109, the inverse wavelet transformer 413 outputs the image data obtained through the inverse wavelet transform.

In step S110, the entropy decoder 411 determines whether the decoding process has been completed. If it is determined in step S110 that the decoding process has not been completed, processing returns to step S101 to repeat step S101 and subsequent steps. If it is determined in step S110 that the decoding process has been completed, the entropy decoder 411 ends the decoding process.

The latency in the decoding process is thus reduced.

The above-described method steps may be executed using software or hardware. The above-described software programs can be performed by any apparatus. For example, a personal computer 500 of FIG. 35 may perform the above-described software programs.

A CPU in the personal computer 500 of FIG. 35 performs a variety of processes in accordance with a program stored on a read-only memory (ROM) 502 or a program loaded onto a random-access memory (RAM) 503 from a storage unit 513. The RAM 503 stores, as necessary, data used for the CPU 501 to perform a variety of processes.

The CPU 501, the ROM 502 and the RAM 503 are connected to each other via a bus 504. The bus 504 connects to an input-output interface 510.

Also connected to the input-output interface 510 are an input unit 511 including a keyboard and a mouse, an output unit 512 including a display such as a cathode ray tube (CRT) or a liquid-crystal display (LCD) and a loudspeaker, a storage unit 513 including a hard disk, and a communication unit 514 including a modem. The communication unit 514 performs a communication process via a network such as the Internet.

The input-output interface 510 also connects to a drive 515, as necessary. A removable medium 521, such as one of a magnetic disk, an optical disk, a magneto-optical disk, and a semiconductor memory, is loaded on the drive 515. A computer program read from the removable medium 521 is installed onto the storage unit 513.

If the above-described series of method steps are performed using software, a program implementing the software is installed via the network or from a recording medium.

The recording medium may be a removable medium 521 of FIG. 35, storing the program and distributed separately from the host apparatus to supply the user with the program. The removable medium 521 may include one of a magnetic disk (including a flexible disk), an optical disk (compact-disk read-only memory (CD-ROM), a digital versatile disk (DVD) or the like), a magneto-optical disk (Mini-Disk (MD) (Registered Trademark)), and a semiconductor memory. The recording medium may also be one of the ROM 502 and a hard disk loaded onto the storage unit 513, each storing the program and supplied in the host apparatus to the user.

The above-described method steps describing the program recorded on the recording medium may be performed in the time-series sequence described above. Also, the above-described method steps may be performed in parallel or separately.

The word system refers to an entire apparatus composed a plurality of devices.

The apparatus described as a single unit may be divided into a plurality of apparatuses. Apparatuses described a plurality of units may be integrated into a single unit. Another arrangement may be attached to the structure of the above-described apparatus. If the structure and operation of the system remain unchanged, part of one apparatus may be integrated into another apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An encoding apparatus, comprising:
    means for performing an analysis filtering operation on image data in a layer fashion by segmenting a frequency component of the image data into a high-frequency component and a low-frequency component to generate a plurality of subbands composed of coefficient data segmented on a per frequency band basis;
    intermediate data storage means for storing intermediate data generated in a middle of the analysis filtering operation of the means for performing;
    coefficient storage means for storing the coefficient data generated in the analysis filtering operation of the means for performing on a subband by subband basis, with each subband corresponding to a respective area of the coefficient storage means;
    a write buffer arranged between the means for performing and the coefficient storage means, wherein the means for performing writes the coefficient data onto the coefficient storage means via the write buffer in response to a determination that the analysis filtering operation has not reached a final segmentation level; and
    entropy encoding means for entropy encoding the coefficient data,
    the means for performing writing the coefficient data on the area of the coefficient storage means corresponding to the subband to which the coefficient data belongs, and
    the means for performing supplies the coefficient data generated in the analysis filtering operation at the final segmentation level to the entropy encoding means without storing the coefficient data onto the coefficient storage means in response to a determination that the analysis filtering operation has reached a final segmentation level.

2. The encoding apparatus according to claim 1, wherein the intermediate data storage means features an access speed higher than the coefficient storage means.

3. The encoding apparatus according to claim 1, further comprising:
    a read buffer arranged between the entropy encoding means and the coefficient storage means; and
    data transfer control means for controlling a data transfer performed between the write buffer and the coefficient storage means and a data transfer performed between the read buffer and the coefficient storage means, wherein the entropy encoding means reads the coefficient data from the coefficient storage means via the read buffer.

4. The encoding apparatus according to claim 3, wherein the write buffer stores the coefficient data on different areas thereof on a subband by subband basis, the read buffer stores the coefficient data on different areas thereof on a subband by subband basis, and the data transfer between corresponding areas of the subbands of the write buffer and the coefficient storage means is performed in parallel with the data transfer between the corresponding areas of the subbands of the read buffer and the coefficient storage means.

5. The encoding apparatus according to claim 1, wherein the means for performing performs the analysis filtering operation on the image data by precinct, each precinct being the image data of a number of lines for generating one line of image data in a lowest frequency subband.

6. The encoding apparatus according to claim 1, wherein the means for performing performs the analysis filtering operation using a lifting calculation.

7. An encoding method, comprising:
    performing, with a processing unit, an analysis filtering operation on image data in a layer fashion by segmenting a frequency component of the image data into a high-frequency component and a low-frequency component to generate a plurality of subbands composed of coefficient data segmented on a per frequency band basis;
    storing intermediate data generated in a middle of the analysis filtering operation;
    storing, with a memory, the coefficient data, generated in the analysis filtering operation, on different areas on a subband by subband basis, with each subband corresponding to a respective area;
    determining whether the analysis filtering operation has reached a final segmentation level;
    writing the coefficient data onto the memory via a write buffer arranged between the processing unit and the memory, in response to the determining determining that the analysis filtering operation has not reached the final segmentation level; and
    entropy encoding the coefficient data generated by the performing at the final segmentation level without storing the coefficient data onto the memory in response to the determining determining that the analysis filtering operation has reached the final segmentation level.

8. An encoding apparatus, comprising:
    a filter unit that performs an analysis filtering operation on image data in a layer fashion by segmenting a frequency component of the image data into a high-frequency component and a low-frequency component to generate a plurality of subbands composed of coefficient data segmented on a per frequency band basis;
    an intermediate data storage unit that stores intermediate data generated in a middle of the analysis filtering operation of the filter unit;
    a coefficient storage unit that stores the coefficient data generated in the analysis filtering operation of the filter unit on a subband by subband basis, with each subband corresponding to a respective area of the coefficient storage unit;
    a write buffer arranged between the filter unit and the coefficient storage unit, wherein the filter unit writes the coefficient data onto the coefficient storage unit via the write buffer in response to a determination that the analysis filtering operation has not reached a final segmentation level; and
    an entropy encoding unit that entropy encodes the coefficient data, wherein
    the filter unit writes the coefficient data on an area of the coefficient storage unit corresponding to the subband to which the coefficient data belongs, and
    the filter unit supplies the coefficient data generated in the analysis filtering operation at the final segmentation level to the entropy encoding unit without storing the coefficient data into the coefficient storage unit in response to a determination that the analysis filtering operation has reached a final segmentation level.

* * * * *